United States Patent
Li et al.

(10) Patent No.: US 10,959,120 B2
(45) Date of Patent: Mar. 23, 2021

(54) METHODS AND APPARATUS RELATED TO SELECTING CONTROL CHANNEL REPORTING FORMATS

(71) Applicant: QUALCOMM Incorporated, San Diego, CA (US)

(72) Inventors: Junyi Li, Chester, NJ (US); Arnab Das, Bethesda, MD (US); Pablo Alejandro Anigstein, Gillette, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/544,562

(22) Filed: Aug. 19, 2019

(65) Prior Publication Data
US 2019/0373500 A1 Dec. 5, 2019

Related U.S. Application Data

(63) Continuation of application No. 11/581,218, filed on Oct. 13, 2006, now abandoned, which is a
(Continued)

(51) Int. Cl.
    H04B 1/38      (2015.01)
    H04W 24/10     (2009.01)
    (Continued)

(52) U.S. Cl.
    CPC .......... *H04W 24/10* (2013.01); *H04W 16/28* (2013.01); *H04W 88/08* (2013.01); *H04W 88/085* (2013.01)

(58) Field of Classification Search
    CPC ............... H04W 72/042; H04W 24/10; H04W 72/0413; H04W 80/02; H04W 24/08;
    (Continued)

(56) References Cited

U.S. PATENT DOCUMENTS 4,631,720 A  12/1986  Koeck
4,660,196 A   4/1987  Gray et al.
(Continued)

FOREIGN PATENT DOCUMENTS

CL   36032006    5/2010
CN   1159262 A   9/1997
(Continued)

OTHER PUBLICATIONS

Cheng Y., et al., "Physical Layer Design of WCDMA System", Posts and Telecom Press, Mar. 2003, pp. 1-10, 34, 44, and 62-65.
(Continued)

*Primary Examiner* — Khalid W Shaheed
(74) *Attorney, Agent, or Firm* — Patterson & Sheridan, L.L.P

(57) ABSTRACT

Methods and apparatus related to the implementation and selection of alterative control information reporting formats are described. A control information reporting format, corresponding to a connection between a wireless terminal and a base station, e.g., for an uplink dedicated control channel, is selected, as a function of at least one of: an application being executed, device capability information, channel condition information, system loading information, and user quality of service information. Different wireless terminals may use different control information reporting formats at the same time. The same wireless terminal may use a different control information reporting format at different times.

38 Claims, 22 Drawing Sheets

Related U.S. Application Data continuation-in-part of application No. 11/333,792, filed on Jan. 17, 2006, now Pat. No. 9,338,767.

(60) Provisional application No. 60/752,973, filed on Dec. 22, 2005.

(51) Int. Cl.
 *H04W 88/08* (2009.01)
 *H04W 16/28* (2009.01)

(58) Field of Classification Search
 CPC . H04W 72/04; H04W 72/12; H04W 72/0406; H04W 72/0446; H04W 76/15; H04W 80/08; H04W 28/06; H04W 72/087
 See application file for complete search history.

(56) References Cited

U.S. PATENT DOCUMENTS

| | | |
|---|---|---|
| 4,679,244 A | 7/1987 | Kawasaki et al. |
| 4,833,701 A | 5/1989 | Comroe et al. |
| 5,128,938 A | 7/1992 | Borras |
| 5,203,013 A | 4/1993 | Breeden et al. |
| 5,387,905 A | 2/1995 | Grube et al. |
| 5,434,848 A | 7/1995 | Chimento, Jr. et al. |
| 5,461,645 A | 10/1995 | Ishii |
| 5,465,389 A | 11/1995 | Agrawal et al. |
| 5,491,837 A | 2/1996 | Haartsen |
| 5,506,865 A | 4/1996 | Weaver, Jr. |
| 5,537,414 A | 7/1996 | Takiyasu et al. |
| 5,579,307 A | 11/1996 | Richetta et al. |
| 5,732,328 A | 3/1998 | Mitra et al. |
| 5,835,847 A | 11/1998 | Gilmore et al. |
| 5,867,478 A | 2/1999 | Baum et al. |
| 5,898,925 A | 4/1999 | Honkasalo et al. |
| 5,914,950 A | 6/1999 | Tiedemann, Jr. et al. |
| 5,915,221 A | 6/1999 | Sawyer et al. |
| 5,923,650 A | 7/1999 | Chen et al. |
| 5,933,421 A | 8/1999 | Alamouti et al. |
| 5,940,771 A | 8/1999 | Gollnick et al. |
| 5,966,657 A | 10/1999 | Sporre |
| 5,966,662 A | 10/1999 | Murto |
| 5,978,657 A | 11/1999 | Suzuki |
| 5,999,534 A | 12/1999 | Kim |
| 6,002,676 A | 12/1999 | Fleming |
| 6,004,276 A | 12/1999 | Wright et al. |
| 6,026,081 A | 2/2000 | Hamabe |
| 6,028,842 A | 2/2000 | Chapman et al. |
| 6,028,843 A | 2/2000 | Delp et al. |
| 6,035,000 A | 3/2000 | Bingham |
| 6,069,871 A | 5/2000 | Sharma et al. |
| 6,070,072 A | 5/2000 | Dorenbosch et al. |
| 6,073,025 A | 6/2000 | Chheda et al. |
| 6,075,025 A | 6/2000 | Bishop et al. |
| 6,122,270 A | 9/2000 | Whinnett et al. |
| 6,128,506 A | 10/2000 | Knutsson et al. |
| 6,131,016 A | 10/2000 | Greenstein et al. |
| 6,141,565 A | 10/2000 | Feuerstein et al. |
| 6,169,896 B1 | 1/2001 | Sant et al. |
| 6,173,005 B1 | 1/2001 | Kotzin et al. |
| 6,181,948 B1 | 1/2001 | Kondo |
| 6,201,793 B1 | 3/2001 | Chen et al. |
| 6,205,129 B1 | 3/2001 | Esteves et al. |
| 6,215,791 B1 | 4/2001 | Kim |
| 6,236,646 B1 | 5/2001 | Beming et al. |
| 6,256,478 B1 | 7/2001 | Allen et al. |
| 6,259,927 B1 | 7/2001 | Butovitsch et al. |
| 6,263,392 B1 | 7/2001 | McCauley |
| 6,298,233 B1 | 10/2001 | Souissi et al. |
| 6,308,080 B1 | 10/2001 | Burt et al. |
| 6,310,857 B1 | 10/2001 | Duffield et al. |
| 6,311,065 B1 | 10/2001 | Ushiki et al. |
| 6,374,085 B1 | 4/2002 | Saints et al. |
| 6,377,583 B1 | 4/2002 | Lyles et al. |
| 6,377,955 B1 | 4/2002 | Hartmann et al. |
| 6,405,047 B1 | 6/2002 | Moon |
| 6,414,946 B1 | 7/2002 | Satou et al. |
| 6,445,917 B1 | 9/2002 | Bark et al. |
| 6,453,151 B1 | 9/2002 | Kiang et al. |
| 6,493,539 B1 | 12/2002 | Falco et al. |
| 6,526,281 B1 | 2/2003 | Gorsuch et al. |
| 6,538,986 B2 | 3/2003 | Isaksson et al. |
| 6,545,999 B1 | 4/2003 | Sugita |
| 6,549,780 B2 | 4/2003 | Schiff et al. |
| 6,553,336 B1 | 4/2003 | Johnson et al. |
| 6,590,890 B1 | 7/2003 | Stolyar et al. |
| 6,597,914 B1 | 7/2003 | Silventoinen et al. |
| 6,597,922 B1 | 7/2003 | Ling et al. |
| 6,600,903 B1 | 7/2003 | Lilja et al. |
| 6,609,007 B1 | 8/2003 | Eibling et al. |
| 6,621,808 B1 | 9/2003 | Sadri |
| 6,625,133 B1 | 9/2003 | Balachandran et al. |
| 6,628,957 B1 | 9/2003 | Weaver et al. |
| 6,662,024 B2 | 12/2003 | Walton et al. |
| 6,671,512 B2 | 12/2003 | Laakso |
| 6,680,909 B1 | 1/2004 | Bansal et al. |
| 6,697,417 B2 | 2/2004 | Fernandez-Corbaton et al. |
| 6,710,651 B2 | 3/2004 | Forrester |
| 6,728,551 B2 | 4/2004 | Chang |
| 6,742,020 B1 | 5/2004 | Dimitroff et al. |
| 6,745,003 B1 | 6/2004 | Maca et al. |
| 6,745,044 B1 | 6/2004 | Holtzman et al. |
| 6,751,187 B2 | 6/2004 | Walton et al. |
| 6,771,934 B2 | 8/2004 | Demers et al. |
| 6,788,963 B2 | 9/2004 | Laroia et al. |
| 6,798,761 B2 | 9/2004 | Cain et al. |
| 6,804,289 B2 | 10/2004 | Takahashi |
| 6,804,521 B2 | 10/2004 | Tong et al. |
| 6,807,428 B2 | 10/2004 | Casaccia |
| 6,816,476 B2 | 11/2004 | Kim et al. |
| 6,836,673 B1 | 12/2004 | Trott |
| 6,865,168 B1 | 3/2005 | Sekine |
| 6,889,056 B2 | 5/2005 | Shibutani |
| 6,889,257 B1 | 5/2005 | Patel |
| 6,892,071 B2 | 5/2005 | Park et al. |
| 6,895,005 B1 | 5/2005 | Malin et al. |
| 6,895,364 B2 | 5/2005 | Banfer |
| 6,901,268 B2 | 5/2005 | Chang |
| 6,901,270 B1 | 5/2005 | Beach |
| 6,904,016 B2 | 6/2005 | Kuo et al. |
| 6,904,290 B1 | 6/2005 | Palenius |
| 6,912,405 B2 | 6/2005 | Hiramatsu et al. |
| 6,917,607 B1 | 7/2005 | Yeom et al. |
| 6,940,827 B2 | 9/2005 | Li et al. |
| 6,954,643 B2 | 10/2005 | Petrus |
| 6,957,072 B2 | 10/2005 | Kangras et al. |
| 6,967,937 B1 | 11/2005 | Gormley |
| 6,968,156 B2 | 11/2005 | Sugaya et al. |
| 7,006,841 B2 | 2/2006 | Monogioudis et al. |
| 7,024,460 B2 | 4/2006 | Koopmas et al. |
| 7,027,782 B2 | 4/2006 | Moon et al. |
| 7,031,983 B2 | 4/2006 | Israni et al. |
| 7,034,254 B2 | 4/2006 | Grabowski et al. |
| 7,039,029 B2 | 5/2006 | Lee et al. |
| 7,043,254 B2 | 5/2006 | Chawla et al. |
| 7,047,009 B2 | 5/2006 | Laroia et al. |
| 7,054,643 B2 | 5/2006 | Trossen et al. |
| 7,058,035 B2 | 6/2006 | English |
| 7,061,885 B2 | 6/2006 | Kurtz |
| 7,092,672 B1 | 8/2006 | Pekonen et al. |
| 7,120,123 B1 | 10/2006 | Quigley et al. |
| 7,120,448 B2 | 10/2006 | Brouwer |
| 7,123,910 B2 | 10/2006 | Lucidarme et al. |
| 7,130,636 B2 | 10/2006 | Kitazawa et al. |
| 7,139,536 B2 | 11/2006 | Chiu |
| 7,142,548 B2 | 11/2006 | Fong et al. |
| 7,142,864 B2 | 11/2006 | Laroia et al. |
| 7,146,172 B2 | 12/2006 | Li et al. |
| 7,158,796 B2 | 1/2007 | Tiedemann, Jr. et al. |
| 7,161,909 B2 | 1/2007 | Sharma |
| 7,162,203 B1 | 1/2007 | Brunner |
| 7,164,883 B2 | 1/2007 | Rappaport et al. |
| 7,197,025 B2 | 3/2007 | Chuah |
| 7,203,493 B2 | 4/2007 | Fujii et al. |

(56) References Cited

U.S. PATENT DOCUMENTS

| | | |
|---|---|---|
| 7,212,821 B2 | 5/2007 | Laroia et al. |
| 7,215,684 B1 | 5/2007 | Rosen et al. |
| 7,218,948 B2 | 5/2007 | Laroia et al. |
| 7,245,935 B2 | 7/2007 | Lin |
| 7,260,054 B2 | 8/2007 | Olszewski |
| 7,269,406 B2 | 9/2007 | Qi |
| 7,277,709 B2 | 10/2007 | Vadgama |
| 7,277,737 B1 | 10/2007 | Vollmer et al. |
| 7,280,814 B2 | 10/2007 | Austin et al. |
| 7,283,559 B2 | 10/2007 | Cho et al. |
| 7,283,836 B2 | 10/2007 | Hwang et al. |
| 7,299,277 B1 | 11/2007 | Moran et al. |
| 7,317,921 B2 | 1/2008 | Mueckenheim et al. |
| 7,319,680 B2 | 1/2008 | Cho |
| 7,321,563 B2 | 1/2008 | Kim et al. |
| 7,340,267 B2 | 3/2008 | Budka et al. |
| 7,349,667 B2 | 3/2008 | Magee et al. |
| 7,356,635 B2 | 4/2008 | Woodings et al. |
| 7,362,702 B2 | 4/2008 | Terrell et al. |
| 7,382,755 B2 | 6/2008 | Dugad et al. |
| 7,395,058 B1 | 7/2008 | Kalofonos et al. |
| 7,397,803 B2 | 7/2008 | Love et al. |
| 7,400,901 B2 | 7/2008 | Kostic et al. |
| 7,412,265 B2 | 8/2008 | Chen et al. |
| 7,418,260 B2 | 8/2008 | Lucidarme |
| 7,420,939 B2 | 9/2008 | Laroia et al. |
| 7,430,206 B2 | 9/2008 | Terry et al. |
| 7,430,207 B2 | 9/2008 | Wu et al. |
| 7,430,420 B2 | 9/2008 | Derakhshan et al. |
| 7,447,148 B2 | 11/2008 | Gao et al. |
| 7,463,577 B2 | 12/2008 | Sudo et al. |
| 7,486,620 B2 | 2/2009 | Seol |
| 7,486,638 B2 | 2/2009 | Ofuji et al. |
| 7,502,614 B2 | 3/2009 | Uchida et al. |
| 7,508,792 B2 | 3/2009 | Petrovic et al. |
| 7,510,828 B2 | 3/2009 | Lynn et al. |
| 7,512,076 B2 | 3/2009 | Kwon et al. |
| 7,512,185 B2 | 3/2009 | Sharon et al. |
| 7,519,013 B2 | 4/2009 | Destino et al. |
| 7,519,033 B2 | 4/2009 | Soomro |
| 7,522,544 B2 | 4/2009 | Cheng et al. |
| 7,525,971 B2 | 4/2009 | Carroll et al. |
| 7,526,091 B2 | 4/2009 | Jeong et al. |
| 7,539,475 B2 | 5/2009 | Laroia et al. |
| 7,558,235 B2 | 7/2009 | Lester et al. |
| 7,558,572 B2 | 7/2009 | Anigstein |
| 7,561,893 B2 | 7/2009 | Moulsley et al. |
| 7,668,573 B2 | 2/2010 | Laroia et al. |
| 7,734,262 B2 | 6/2010 | Akbar et al. |
| 7,743,284 B1 | 6/2010 | Taylor et al. |
| 7,965,789 B2 | 6/2011 | Khandekar et al. |
| 7,986,660 B2 | 7/2011 | Ramos et al. |
| 7,986,672 B2 | 7/2011 | Tiedemann, Jr. et al. |
| 8,005,454 B1 | 8/2011 | Lavelle et al. |
| 8,040,831 B2 | 10/2011 | Kurtz et al. |
| 8,190,163 B2 | 5/2012 | Laroia et al. |
| 8,233,462 B2 | 7/2012 | Walton et al. |
| RE43,593 E | 8/2012 | Kayama et al. |
| 8,284,752 B2 | 10/2012 | Ketchum et al. |
| 8,325,621 B2 | 12/2012 | Simonsson et al. |
| 8,437,251 B2 | 5/2013 | Das et al. |
| 8,503,938 B2 | 8/2013 | Laroia et al. |
| 8,509,799 B2 | 8/2013 | Park et al. |
| 8,514,692 B2 | 8/2013 | Laroia et al. |
| 8,514,771 B2 | 8/2013 | Das et al. |
| 8,560,026 B2 | 10/2013 | Chanterac et al. |
| 8,599,945 B2 | 12/2013 | Sampath |
| 8,694,042 B2 | 4/2014 | Li et al. |
| 8,811,348 B2 | 8/2014 | Rangan et al. |
| 8,830,827 B2 | 9/2014 | Das et al. |
| 8,965,413 B2 | 2/2015 | Edge |
| 8,989,084 B2 | 3/2015 | Hande et al. |
| 9,119,220 B2 | 8/2015 | Das et al. |
| 9,125,092 B2 | 9/2015 | Das et al. |
| 9,125,093 B2 | 9/2015 | Li et al. |
| 9,137,072 B2 | 9/2015 | Richardson et al. |
| 9,148,795 B2 | 9/2015 | Das |
| 9,154,211 B2 | 10/2015 | Sampath et al. |
| 9,161,313 B2 | 10/2015 | Das et al. |
| 9,184,870 B2 | 11/2015 | Sampath et al. |
| 9,191,840 B2 | 11/2015 | Laroia et al. |
| 9,338,767 B2 | 5/2016 | Parizhsky et al. |
| 9,338,795 B2 | 5/2016 | Das et al. |
| 9,451,491 B2 | 9/2016 | Das et al. |
| 9,462,604 B2 | 10/2016 | Das et al. |
| 9,473,265 B2 | 10/2016 | Das et al. |
| 9,544,860 B2 | 1/2017 | Laroia et al. |
| 9,572,179 B2 | 2/2017 | Das et al. |
| 9,578,654 B2 | 2/2017 | Das et al. |
| 9,603,102 B2 | 3/2017 | Laroia et al. |
| 9,661,519 B2 | 5/2017 | Das et al. |
| 9,893,917 B2 | 2/2018 | Richardson et al. |
| 10,159,006 B2 | 12/2018 | Das |
| 10,645,693 B2 | 5/2020 | Parizhsky |
| 2001/0036181 A1 | 11/2001 | Rogers |
| 2001/0055293 A1 | 12/2001 | Parsa et al. |
| 2002/0031105 A1 | 3/2002 | Zeira et al. |
| 2002/0075835 A1 | 6/2002 | Krishnakumar et al. |
| 2002/0077141 A1 | 6/2002 | Hwang et al. |
| 2002/0080967 A1 | 6/2002 | Abdo et al. |
| 2002/0082013 A1 | 6/2002 | Lee et al. |
| 2002/0085516 A1 | 7/2002 | Bridgelall |
| 2002/0093953 A1 | 7/2002 | Naim et al. |
| 2002/0107028 A1 | 8/2002 | Rantalainen et al. |
| 2002/0143858 A1 | 10/2002 | Teague et al. |
| 2002/0177452 A1 | 11/2002 | Ruutu et al. |
| 2002/0186678 A1 | 12/2002 | Averbuch et al. |
| 2002/0188723 A1 | 12/2002 | Choi et al. |
| 2003/0007498 A1 | 1/2003 | Angle et al. |
| 2003/0012212 A1 | 1/2003 | Earnshaw et al. |
| 2003/0016641 A1 | 1/2003 | Terry et al. |
| 2003/0027587 A1 | 2/2003 | Proctor |
| 2003/0032463 A1 | 2/2003 | Cannon et al. |
| 2003/0050012 A1 | 3/2003 | Black et al. |
| 2003/0063587 A1 | 4/2003 | Cho et al. |
| 2003/0064737 A1 | 4/2003 | Eriksson et al. |
| 2003/0100269 A1 | 5/2003 | Lehtinen et al. |
| 2003/0114180 A1 | 6/2003 | Black et al. |
| 2003/0123396 A1 | 7/2003 | Seo et al. |
| 2003/0123410 A1 | 7/2003 | Youm |
| 2003/0123425 A1 | 7/2003 | Walton et al. |
| 2003/0123559 A1 | 7/2003 | Classon et al. |
| 2003/0144042 A1 | 7/2003 | Weinfield et al. |
| 2003/0147371 A1 | 8/2003 | Choi et al. |
| 2003/0165190 A1 | 9/2003 | Sindhushayana et al. |
| 2003/0169705 A1 | 9/2003 | Knisely et al. |
| 2003/0185224 A1 | 10/2003 | Ramanan et al. |
| 2003/0185285 A1 | 10/2003 | Talwar |
| 2003/0198204 A1 | 10/2003 | Taneja et al. |
| 2003/0202563 A1 | 10/2003 | Das et al. |
| 2003/0206541 A1 | 11/2003 | Yun et al. |
| 2003/0207691 A1 | 11/2003 | Chen |
| 2003/0207693 A1 | 11/2003 | Roderique |
| 2003/0210686 A1 | 11/2003 | Terrell et al. |
| 2003/0214906 A1 | 11/2003 | Hu et al. |
| 2004/0001429 A1 | 1/2004 | Ma et al. |
| 2004/0008726 A1 | 1/2004 | Kelly et al. |
| 2004/0013103 A1 | 1/2004 | Zhang et al. |
| 2004/0062206 A1 | 4/2004 | Soong et al. |
| 2004/0081089 A1 | 4/2004 | Ayyagari et al. |
| 2004/0082344 A1 | 4/2004 | Moilanen et al. |
| 2004/0085936 A1 | 5/2004 | Gopalakrishnan et al. |
| 2004/0091026 A1 | 5/2004 | Nakayama |
| 2004/0111640 A1 | 6/2004 | Baum |
| 2004/0120289 A1 | 6/2004 | Hamalainen et al. |
| 2004/0120411 A1 | 6/2004 | Walton et al. |
| 2004/0125776 A1 | 7/2004 | Haugli et al. |
| 2004/0127266 A1 | 7/2004 | Aagaard et al. |
| 2004/0131007 A1 | 7/2004 | Smee et al. |
| 2004/0147276 A1 | 7/2004 | Gholmieh et al. |
| 2004/0160922 A1 | 8/2004 | Nanda et al. |
| 2004/0162097 A1 | 8/2004 | Vijayan et al. |
| 2004/0166869 A1 | 8/2004 | Laroia et al. |
| 2004/0171401 A1 | 9/2004 | Balachandran et al. |

(56) References Cited

U.S. PATENT DOCUMENTS

| | | |
|---|---|---|
| 2004/0179469 A1 | 9/2004 | Attar et al. |
| 2004/0179493 A1 | 9/2004 | Khan |
| 2004/0184410 A1 | 9/2004 | Park |
| 2004/0192371 A1 | 9/2004 | Zhao et al. |
| 2004/0196802 A1 | 10/2004 | Bae et al. |
| 2004/0203717 A1 | 10/2004 | Wingrowicz et al. |
| 2004/0213326 A1 | 10/2004 | Parizhsky et al. |
| 2004/0218559 A1 | 11/2004 | Kim et al. |
| 2004/0218617 A1 | 11/2004 | Sagfors |
| 2004/0219920 A1 | 11/2004 | Love et al. |
| 2004/0224677 A1 | 11/2004 | Kuchibhotla et al. |
| 2004/0228313 A1 | 11/2004 | Cheng et al. |
| 2004/0235447 A1 | 11/2004 | Gronberg et al. |
| 2004/0235501 A1 | 11/2004 | Sato |
| 2004/0235510 A1 | 11/2004 | Elicegui et al. |
| 2004/0248518 A1 | 12/2004 | Kashiwase |
| 2004/0252647 A1 | 12/2004 | Chang et al. |
| 2004/0258040 A1 | 12/2004 | Joshi et al. |
| 2004/0259546 A1 | 12/2004 | Balachandran et al. |
| 2004/0264414 A1 | 12/2004 | Dorenbosch |
| 2005/0003768 A1 | 1/2005 | Laroia et al. |
| 2005/0008892 A1 | 1/2005 | Yamamoto et al. |
| 2005/0037775 A1 | 2/2005 | Moeglein et al. |
| 2005/0041589 A1 | 2/2005 | Kwon et al. |
| 2005/0047393 A1 | 3/2005 | Liu |
| 2005/0047416 A1 | 3/2005 | Heo et al. |
| 2005/0053099 A1 | 3/2005 | Spear et al. |
| 2005/0063330 A1 | 3/2005 | Lee et al. |
| 2005/0064821 A1 | 3/2005 | Hedberg et al. |
| 2005/0068922 A1 | 3/2005 | Jalali |
| 2005/0085197 A1 | 4/2005 | Laroia et al. |
| 2005/0111361 A1 | 5/2005 | Hosein |
| 2005/0111397 A1 | 5/2005 | Attar et al. |
| 2005/0111462 A1 | 5/2005 | Walton et al. |
| 2005/0118981 A1 | 6/2005 | Laroia et al. |
| 2005/0118993 A1 | 6/2005 | Roux et al. |
| 2005/0122900 A1 | 6/2005 | Tuulos et al. |
| 2005/0124372 A1 | 6/2005 | Lundby et al. |
| 2005/0135284 A1 | 6/2005 | Nanda et al. |
| 2005/0135291 A1 | 6/2005 | Ketchum et al. |
| 2005/0135320 A1 | 6/2005 | Tiedemann et al. |
| 2005/0136937 A1 | 6/2005 | Qian et al. |
| 2005/0143083 A1 | 6/2005 | Kwon et al. |
| 2005/0143084 A1 | 6/2005 | Cheng et al. |
| 2005/0152320 A1 | 7/2005 | Marinier et al. |
| 2005/0157803 A1 | 7/2005 | Kim et al. |
| 2005/0164741 A1 | 7/2005 | Rajkotia et al. |
| 2005/0170782 A1 | 8/2005 | Rong et al. |
| 2005/0181732 A1 | 8/2005 | Kang et al. |
| 2005/0185632 A1 | 8/2005 | Draves et al. |
| 2005/0201331 A1 | 9/2005 | Gaal et al. |
| 2005/0201353 A1 | 9/2005 | Lee et al. |
| 2005/0207335 A1 | 9/2005 | Schmidl et al. |
| 2005/0207359 A1 | 9/2005 | Hwang et al. |
| 2005/0207373 A1 | 9/2005 | Roy et al. |
| 2005/0220052 A1 | 10/2005 | Uehara et al. |
| 2005/0232154 A1 | 10/2005 | Bang et al. |
| 2005/0243938 A1 | 11/2005 | Armstrong et al. |
| 2005/0249118 A1 | 11/2005 | Terry et al. |
| 2005/0250509 A1 | 11/2005 | Choksi |
| 2005/0250510 A1 | 11/2005 | Kaikkonen et al. |
| 2005/0250529 A1 | 11/2005 | Funnell et al. |
| 2005/0255873 A1 | 11/2005 | Zhang et al. |
| 2005/0259662 A1 | 11/2005 | Kim et al. |
| 2005/0265301 A1 | 12/2005 | Heo et al. |
| 2005/0281232 A1 | 12/2005 | Kim et al. |
| 2005/0281278 A1 | 12/2005 | Black et al. |
| 2005/0289256 A1 | 12/2005 | Cudak et al. |
| 2006/0003767 A1 | 1/2006 | Kim et al. |
| 2006/0008020 A1 | 1/2006 | Blankenship et al. |
| 2006/0015357 A1 | 1/2006 | Cagan |
| 2006/0018284 A1 | 1/2006 | Rudolf et al. |
| 2006/0019694 A1 | 1/2006 | Sutivong et al. |
| 2006/0025160 A1 | 2/2006 | Kodali et al. |
| 2006/0034174 A1 | 2/2006 | Nishibayashi et al. |
| 2006/0045013 A1 | 3/2006 | Vannithamby et al. |
| 2006/0056346 A1 | 3/2006 | Vadgama et al. |
| 2006/0057965 A1 | 3/2006 | Braun et al. |
| 2006/0062193 A1 | 3/2006 | Choi et al. |
| 2006/0073836 A1 | 4/2006 | Laroia et al. |
| 2006/0079257 A1 | 4/2006 | Iochi et al. |
| 2006/0079267 A1 | 4/2006 | Kim et al. |
| 2006/0085742 A1 | 4/2006 | Harold et al. |
| 2006/0089104 A1 | 4/2006 | Kaikkonen et al. |
| 2006/0092881 A1 | 5/2006 | Laroia et al. |
| 2006/0094366 A1 | 5/2006 | Cho et al. |
| 2006/0104240 A1 | 5/2006 | Sebire et al. |
| 2006/0120470 A1 | 6/2006 | Hwang et al. |
| 2006/0126497 A1 | 6/2006 | Na et al. |
| 2006/0128410 A1 | 6/2006 | Derryberry et al. |
| 2006/0128412 A1 | 6/2006 | Mantha et al. |
| 2006/0133346 A1 | 6/2006 | Chheda et al. |
| 2006/0133521 A1 | 6/2006 | Sampath et al. |
| 2006/0135193 A1 | 6/2006 | Ratasuk et al. |
| 2006/0140154 A1 | 6/2006 | Kwak et al. |
| 2006/0148411 A1 | 7/2006 | Cho et al. |
| 2006/0164981 A1 | 7/2006 | Olsson et al. |
| 2006/0165029 A1 | 7/2006 | Melpignano et al. |
| 2006/0182022 A1 | 8/2006 | Abedi |
| 2006/0193298 A1 | 8/2006 | Kishigami et al. |
| 2006/0203765 A1 | 9/2006 | Laroia et al. |
| 2006/0205356 A1 | 9/2006 | Laroia et al. |
| 2006/0205396 A1 | 9/2006 | Laroia et al. |
| 2006/0209896 A1 | 9/2006 | Choi et al. |
| 2006/0215604 A1 | 9/2006 | Mueckenheim et al. |
| 2006/0234722 A1 | 10/2006 | Hanebeck |
| 2006/0245452 A1 | 11/2006 | Frederiksen et al. |
| 2006/0250963 A1 | 11/2006 | Jin et al. |
| 2006/0251156 A1 | 11/2006 | Grant et al. |
| 2006/0256747 A1 | 11/2006 | Jaakkola |
| 2006/0285481 A1 | 12/2006 | Lane et al. |
| 2006/0287743 A1 | 12/2006 | Sampath et al. |
| 2007/0002757 A1 | 1/2007 | Soomro et al. |
| 2007/0004437 A1 | 1/2007 | Harada et al. |
| 2007/0015541 A1 | 1/2007 | Dominique et al. |
| 2007/0026803 A1 | 2/2007 | Malm |
| 2007/0026808 A1 | 2/2007 | Love et al. |
| 2007/0026810 A1 | 2/2007 | Love et al. |
| 2007/0030828 A1 | 2/2007 | Vimpari et al. |
| 2007/0036116 A1 | 2/2007 | Eiger et al. |
| 2007/0054624 A1 | 3/2007 | Kashiwagi |
| 2007/0057952 A1 | 3/2007 | Swedberg et al. |
| 2007/0066273 A1 | 3/2007 | Laroia et al. |
| 2007/0070894 A1 | 3/2007 | Wang et al. |
| 2007/0081498 A1 | 4/2007 | Niwano |
| 2007/0104128 A1 | 5/2007 | Laroia et al. |
| 2007/0109999 A1 | 5/2007 | Brunner |
| 2007/0133412 A1 | 6/2007 | Hutter et al. |
| 2007/0140179 A1 | 6/2007 | Zhang et al. |
| 2007/0141994 A1 | 6/2007 | Cheng |
| 2007/0147283 A1 | 6/2007 | Laroia et al. |
| 2007/0147377 A1 | 6/2007 | Laroia et al. |
| 2007/0149132 A1 | 6/2007 | Li et al. |
| 2007/0169326 A1 | 7/2007 | Smith |
| 2007/0173208 A1 | 7/2007 | Nishio et al. |
| 2007/0177510 A1 | 8/2007 | Natarajan et al. |
| 2007/0183308 A1 | 8/2007 | Korobkov et al. |
| 2007/0243882 A1 | 10/2007 | Edge |
| 2007/0249287 A1 | 10/2007 | Das et al. |
| 2007/0249360 A1 | 10/2007 | Das et al. |
| 2007/0253449 A1 | 11/2007 | Das et al. |
| 2007/0254595 A1 | 11/2007 | Yoon et al. |
| 2007/0298728 A1 | 12/2007 | Imamura et al. |
| 2008/0031368 A1 | 2/2008 | Lindoff et al. |
| 2008/0037474 A1 | 2/2008 | Niwano |
| 2008/0051086 A2 | 2/2008 | Etemad et al. |
| 2008/0057969 A1 | 3/2008 | Agami et al. |
| 2008/0076462 A1 | 3/2008 | Iochi et al. |
| 2008/0144521 A1 | 6/2008 | Soomro et al. |
| 2008/0159235 A1 | 7/2008 | Son et al. |
| 2008/0167047 A1 | 7/2008 | Abedi |
| 2008/0212524 A1 | 9/2008 | Niwano |
| 2009/0004983 A1 | 1/2009 | Darabi |
| 2009/0034455 A1 | 2/2009 | Lee et al. |

(56) References Cited

U.S. PATENT DOCUMENTS

| | | | |
|---|---|---|---|
| 2009/0103507 A1 | 4/2009 | Gu et al. |
| 2009/0106507 A1 | 4/2009 | Skerlj et al. |
| 2009/0252122 A1 | 10/2009 | Leinonen et al. |
| 2009/0298496 A1 | 12/2009 | Pettersson et al. |
| 2009/0303900 A1 | 12/2009 | Cho et al. |
| 2010/0093386 A1 | 4/2010 | Damnjanovic et al. |
| 2010/0177731 A1 | 7/2010 | Ananthaiyer et al. |
| 2011/0090812 A1 | 4/2011 | Aoyama |
| 2012/0140756 A1 | 6/2012 | Rudolf et al. |
| 2015/0043374 A1 | 2/2015 | Hande et al. |
| 2016/0255633 A1 | 9/2016 | Parizhsky |

FOREIGN PATENT DOCUMENTS

| | | |
|---|---|---|
| CN | 1159262 A | 9/1997 |
| CN | 1159286 A | 9/1997 |
| CN | 1159286 A | 9/1997 |
| CN | 1265792 | 9/2000 |
| CN | 1277761 A | 12/2000 |
| CN | 1277761 A | 12/2000 |
| CN | 1286006 A | 2/2001 |
| CN | 1286006 A | 2/2001 |
| CN | 1286821 A | 3/2001 |
| CN | 1286821 A | 3/2001 |
| CN | 1286832 A | 3/2001 |
| CN | 1286832 A | 3/2001 |
| CN | 1316140 | 10/2001 |
| CN | 1321026 A | 11/2001 |
| CN | 1321026 A | 11/2001 |
| CN | 1326655 A | 12/2001 |
| CN | 1326655 A | 12/2001 |
| CN | 1335036 A | 2/2002 |
| CN | 1335036 A | 2/2002 |
| CN | 1338877 A | 3/2002 |
| CN | 1338877 A | 3/2002 |
| CN | 1338878 A | 3/2002 |
| CN | 1338878 A | 3/2002 |
| CN | 1497885 A | 5/2004 |
| CN | 1497885 A | 5/2004 |
| CN | 1507708 | 6/2004 |
| CN | 1545252 A | 11/2004 |
| CN | 1545252 A | 11/2004 |
| CN | 1604685 A | 4/2005 |
| CN | 1604685 A | 4/2005 |
| CN | 1614956 A | 5/2005 |
| CN | 1614956 A | 5/2005 |
| CN | 1630379 A | 6/2005 |
| CN | 1630379 A | 6/2005 |
| CN | 1662009 A | 8/2005 |
| CN | 1662009 A | 8/2005 |
| CN | 1663213 A | 8/2005 |
| CN | 1663213 A | 8/2005 |
| CN | 1684457 A | 10/2005 |
| CN | 1684457 A | 10/2005 |
| CN | 1706141 A | 12/2005 |
| CN | 1706141 A | 12/2005 |
| DE | 10162564 A1 | 7/2003 |
| DE | 10162564 A1 | 7/2003 |
| EP | 1037419 A2 | 9/2000 |
| EP | 1037419 A2 | 9/2000 |
| EP | 1037491 A1 | 9/2000 |
| EP | 1037491 A1 | 9/2000 |
| EP | 1054518 A1 | 11/2000 |
| EP | 1054518 A1 | 11/2000 |
| EP | 1089500 A2 | 4/2001 |
| EP | 1089500 A2 | 4/2001 |
| EP | 1179962 A2 | 2/2002 |
| EP | 1179962 A2 | 2/2002 |
| EP | 1180881 A1 | 2/2002 |
| EP | 1180881 A1 | 2/2002 |
| EP | 1180907 A2 | 2/2002 |
| EP | 1180907 A2 | 2/2002 |
| EP | 1207645 A1 | 5/2002 |
| EP | 1207645 A1 | 5/2002 |
| EP | 1221273 A1 | 7/2002 |
| EP | 1221273 A1 | 7/2002 |
| EP | 1233637 A1 | 8/2002 |
| EP | 1233637 A1 | 8/2002 |
| EP | 1341318 A2 | 9/2003 |
| EP | 1341318 A2 | 9/2003 |
| EP | 1493284 A1 | 1/2005 |
| EP | 1493284 A1 | 1/2005 |
| EP | 1511245 A2 | 3/2005 |
| EP | 1511245 A2 | 3/2005 |
| EP | 1564953 A2 | 8/2005 |
| EP | 1564953 A2 | 8/2005 |
| EP | 1571762 A1 | 9/2005 |
| EP | 1571762 A1 | 9/2005 |
| EP | 1594260 A1 | 11/2005 |
| EP | 1594260 A1 | 11/2005 |
| EP | 1646163 A2 | 4/2006 |
| EP | 1646163 A2 | 4/2006 |
| EP | 1646170 A1 | 4/2006 |
| EP | 1646170 A1 | 4/2006 |
| EP | 1653646 A1 | 5/2006 |
| EP | 1653646 A1 | 5/2006 |
| EP | 1679924 A2 | 7/2006 |
| EP | 1679924 A2 | 7/2006 |
| EP | 1377100 A2 | 1/2007 |
| EP | 1377100 A2 | 1/2007 |
| EP | 1758276 A1 | 2/2007 |
| EP | 1758276 A1 | 2/2007 |
| EP | 1770889 A2 | 4/2007 |
| EP | 1770889 A2 | 4/2007 |
| EP | 1841259 A2 | 10/2007 |
| EP | 1841259 A2 | 10/2007 |
| EP | 1875639 A1 | 1/2008 |
| EP | 1875639 A1 | 1/2008 |
| EP | 1876785 A2 | 1/2008 |
| EP | 1876785 A2 | 1/2008 |
| EP | 1901573 A1 | 3/2008 |
| EP | 1901573 A1 | 3/2008 |
| EP | 1928114 A1 | 6/2008 |
| EP | 1928114 A1 | 6/2008 |
| EP | 1949556 A2 | 7/2008 |
| EP | 1949556 A2 | 7/2008 |
| EP | 1460789 B1 | 8/2008 |
| EP | 1460789 B1 | 8/2008 |
| EP | 1542490 B1 | 9/2008 |
| EP | 1542490 B1 | 9/2008 |
| EP | 2034764 A1 | 3/2009 |
| EP | 2034764 A1 | 3/2009 |
| EP | 2046070 A1 | 4/2009 |
| EP | 2046070 A1 | 4/2009 |
| EP | 2058957 A1 | 5/2009 |
| EP | 2058957 A1 | 5/2009 |
| EP | 2136595 A2 | 12/2009 |
| EP | 2136595 A2 | 12/2009 |
| EP | 1865645 B1 | 1/2010 |
| EP | 1865645 B1 | 1/2010 |
| EP | 1876854 B1 | 9/2010 |
| EP | 1876854 B1 | 9/2010 |
| EP | 1901496 B1 | 9/2010 |
| EP | 1901496 B1 | 9/2010 |
| EP | 1981191 A4 | 1/2011 |
| EP | 1981191 A4 | 1/2011 |
| EP | 1833203 B1 | 6/2011 |
| EP | 1833203 B1 | 6/2011 |
| EP | 1608197 B1 | 6/2012 |
| EP | 1608197 B1 | 6/2012 |
| EP | 2461638 A1 | 6/2012 |
| EP | 2461638 A1 | 6/2012 |
| EP | 1931096 B1 | 7/2012 |
| EP | 1931096 B1 | 7/2012 |
| EP | 1811701 B1 | 10/2012 |
| EP | 1811701 B1 | 10/2012 |
| EP | 2214325 B1 | 2/2013 |
| EP | 2214325 B1 | 2/2013 |
| EP | 2033354 B1 | 4/2013 |
| EP | 2033354 B1 | 4/2013 |
| EP | 1811799 B1 | 5/2013 |
| EP | 1811799 B1 | 5/2013 |
| EP | 1708536 B1 | 11/2013 |
| EP | 1708536 B1 | 11/2013 |

(56) References Cited

FOREIGN PATENT DOCUMENTS

| | | |
|---|---|---|
| EP | 1906569 B1 | 11/2013 |
| EP | 1906569 B1 | 11/2013 |
| EP | 1769593 B1 | 4/2014 |
| EP | 1769593 B1 | 4/2014 |
| EP | 2427011 B1 | 8/2014 |
| EP | 2427011 B1 | 8/2014 |
| EP | 1997245 B1 | 9/2014 |
| EP | 1997245 B1 | 9/2014 |
| EP | 1672949 B1 | 3/2015 |
| EP | 1672949 B1 | 3/2015 |
| EP | 2019559 B1 | 4/2015 |
| EP | 2019559 B1 | 4/2015 |
| EP | 2088693 B1 | 5/2015 |
| EP | 2088693 B1 | 5/2015 |
| EP | 1995899 B1 | 7/2015 |
| EP | 1995899 B1 | 7/2015 |
| EP | 2793410 B1 | 12/2015 |
| EP | 2793410 B1 | 12/2015 |
| EP | 1832075 B1 | 3/2016 |
| EP | 1832075 B1 | 3/2016 |
| EP | 2077056 B1 | 3/2016 |
| EP | 2077056 B1 | 3/2016 |
| EP | 2027740 B1 | 12/2016 |
| EP | 2027740 B1 | 12/2016 |
| EP | 2080308 B1 | 4/2017 |
| EP | 2080308 B1 | 4/2017 |
| EP | 1919119 B1 | 8/2017 |
| EP | 1919119 B1 | 8/2017 |
| EP | 3203654 A1 | 8/2017 |
| EP | 3203654 A1 | 8/2017 |
| EP | 1892854 B1 | 10/2017 |
| EP | 1892854 B1 | 10/2017 |
| EP | 1961141 B1 | 10/2017 |
| EP | 1961141 B1 | 10/2017 |
| EP | 2521301 B1 | 10/2017 |
| EP | 2521301 B1 | 10/2017 |
| EP | 1766806 B1 | 11/2017 |
| EP | 1766806 B1 | 11/2017 |
| EP | 2036216 B1 | 3/2018 |
| EP | 2036216 B1 | 3/2018 |
| EP | 2197226 B1 | 3/2018 |
| EP | 2197226 B1 | 3/2018 |
| EP | 1766789 B1 | 2/2019 |
| EP | 1766789 B1 | 2/2019 |
| EP | 1612980 B1 | 6/2019 |
| EP | 1612980 B1 | 6/2019 |
| EP | 2259497 B1 | 6/2019 |
| EP | 2259497 B1 | 6/2019 |
| EP | 1936851 B1 | 8/2019 |
| EP | 1936851 B1 | 8/2019 |
| GB | 2340693 A | 2/2000 |
| GB | 2340693 A | 2/2000 |
| JP | 06268574 | 9/1994 |
| JP | 08008806 | 1/1996 |
| JP | 8503591 | 4/1996 |
| JP | 9275582 A | 10/1997 |
| JP | 9275582 A | 10/1997 |
| JP | 09307939 | 11/1997 |
| JP | 10022975 A | 1/1998 |
| JP | 10022975 A | 1/1998 |
| JP | 10173585 | 6/1998 |
| JP | 11122167 A | 4/1999 |
| JP | 11122167 A | 4/1999 |
| JP | 2000049689 A | 2/2000 |
| JP | 2000049689 A | 2/2000 |
| JP | 2001007761 | 1/2001 |
| JP | 2001016152 | 1/2001 |
| JP | 2001512921 T | 8/2001 |
| JP | 2001512921 T | 8/2001 |
| JP | 2001251680 A | 9/2001 |
| JP | 2001251680 A | 9/2001 |
| JP | 2001523901 T | 11/2001 |
| JP | 2001523901 T | 11/2001 |
| JP | 2001525135 T | 12/2001 |
| JP | 2001525135 T | 12/2001 |
| JP | 2002077992 | 3/2002 |
| JP | 2002111627 | 4/2002 |
| JP | 2002262330 A | 9/2002 |
| JP | 2002262330 A | 9/2002 |
| JP | 2003018641 A | 1/2003 |
| JP | 2003018641 A | 1/2003 |
| JP | 2003509983 A | 3/2003 |
| JP | 2003509983 A | 3/2003 |
| JP | 2003510887 | 3/2003 |
| JP | 2003520153 A | 7/2003 |
| JP | 2003520153 A | 7/2003 |
| JP | 2003244161 | 8/2003 |
| JP | 2004153585 | 5/2004 |
| JP | 2004297284 A | 10/2004 |
| JP | 2004297284 A | 10/2004 |
| JP | 2004533731 | 11/2004 |
| JP | 2004350052 | 12/2004 |
| JP | 2005073276 | 3/2005 |
| JP | 2005130482 | 5/2005 |
| JP | 2005136773 A | 5/2005 |
| JP | 2005136773 A | 5/2005 |
| JP | 2005142965 A | 6/2005 |
| JP | 2005142965 A | 6/2005 |
| JP | 2005333671 A | 12/2005 |
| JP | 2005333671 A | 12/2005 |
| JP | 2006514735 A | 5/2006 |
| JP | 2006514735 A | 5/2006 |
| JP | 2006526323 A | 11/2006 |
| JP | 2006526323 A | 11/2006 |
| JP | 2007503156 A | 2/2007 |
| JP | 2007503156 A | 2/2007 |
| JP | 2007514364 A | 5/2007 |
| JP | 2007514364 A | 5/2007 |
| KR | 1019990084525 | 12/1999 |
| KR | 20010014223 | 2/2001 |
| KR | 20040053859 A | 6/2004 |
| KR | 20040053859 A | 6/2004 |
| KR | 20040084599 A | 10/2004 |
| KR | 20040084599 A | 10/2004 |
| KR | 20040110044 A | 12/2004 |
| KR | 20040110044 A | 12/2004 |
| KR | 20050021083 A | 3/2005 |
| KR | 20050021083 A | 3/2005 |
| KR | 20050023187 A | 3/2005 |
| KR | 20050023187 A | 3/2005 |
| KR | 20050039376 A | 4/2005 |
| KR | 20050039376 A | 4/2005 |
| KR | 20050044219 A | 5/2005 |
| KR | 20050044219 A | 5/2005 |
| KR | 20050074222 A | 7/2005 |
| KR | 20050074222 A | 7/2005 |
| KR | 20050078635 A | 8/2005 |
| KR | 20050078635 A | 8/2005 |
| KR | 20050078640 A | 8/2005 |
| KR | 20050078640 A | 8/2005 |
| KR | 1020050121274 | 12/2005 |
| KR | 20060012282 A | 2/2006 |
| KR | 20060012282 A | 2/2006 |
| KR | 20060054652 A | 5/2006 |
| KR | 20060054652 A | 5/2006 |
| RU | 2149518 | 5/2000 |
| RU | 2181529 | 4/2002 |
| RU | 2188506 C2 | 8/2002 |
| RU | 2188506 C2 | 8/2002 |
| RU | 2202154 C2 | 4/2003 |
| RU | 2202154 C2 | 4/2003 |
| TW | 200423642 | 11/2004 |
| WO | 9408432 | 4/1994 |
| WO | WO-9408432 | 4/1994 |
| WO | 1996023371 | 8/1996 |
| WO | WO-1996023371 | 8/1996 |
| WO | 1997037438 | 10/1997 |
| WO | WO-1997037438 | 10/1997 |
| WO | 9845967 A2 | 10/1998 |
| WO | WO-9845967 A2 | 10/1998 |
| WO | 9857512 A1 | 12/1998 |
| WO | 98056120 | 12/1998 |
| WO | WO-9857512 A1 | 12/1998 |
| WO | WO-98056120 | 12/1998 |

(56) References Cited

FOREIGN PATENT DOCUMENTS

| | | |
|---|---|---|
| WO | 1999004593 | 1/1999 |
| WO | WO-1999004593 | 1/1999 |
| WO | 9907090 A1 | 2/1999 |
| WO | 1999009779 | 2/1999 |
| WO | WO-9907090 A1 | 2/1999 |
| WO | WO-1999009779 | 2/1999 |
| WO | 9913600 A1 | 3/1999 |
| WO | WO-9913600 A1 | 3/1999 |
| WO | 9959254 A2 | 11/1999 |
| WO | WO-9959254 A2 | 11/1999 |
| WO | 0001188 A1 | 1/2000 |
| WO | WO-0001188 A1 | 1/2000 |
| WO | 2000070902 | 11/2000 |
| WO | WO-2000070902 | 11/2000 |
| WO | 2001001610 | 1/2001 |
| WO | WO-2001001610 | 1/2001 |
| WO | 0122759 A1 | 3/2001 |
| WO | WO-0122759 A1 | 3/2001 |
| WO | 0135548 A1 | 5/2001 |
| WO | WO-0135548 A1 | 5/2001 |
| WO | 0142047 A2 | 6/2001 |
| WO | 0147146 A1 | 6/2001 |
| WO | WO-0142047 A2 | 6/2001 |
| WO | WO-0147146 A1 | 6/2001 |
| WO | 0182504 | 11/2001 |
| WO | WO-0182504 | 11/2001 |
| WO | 0199291 A2 | 12/2001 |
| WO | WO-0199291 A2 | 12/2001 |
| WO | 0225898 A2 | 3/2002 |
| WO | WO-0225898 A2 | 3/2002 |
| WO | 0233841 A1 | 4/2002 |
| WO | 02032183 | 4/2002 |
| WO | WO-0233841 A1 | 4/2002 |
| WO | WO-02032183 | 4/2002 |
| WO | 0239760 A2 | 5/2002 |
| WO | WO-0239760 A2 | 5/2002 |
| WO | 0249305 A2 | 6/2002 |
| WO | WO-0249305 A2 | 6/2002 |
| WO | 02073831 A1 | 9/2002 |
| WO | WO-02073831 A1 | 9/2002 |
| WO | 02101941 A2 | 12/2002 |
| WO | 02104058 A1 | 12/2002 |
| WO | WO-02101941 A2 | 12/2002 |
| WO | WO-02104058 A1 | 12/2002 |
| WO | 2003003761 | 1/2003 |
| WO | WO-2003003761 | 1/2003 |
| WO | 03013178 A1 | 2/2003 |
| WO | 03017604 | 2/2003 |
| WO | WO-03013178 A1 | 2/2003 |
| WO | WO-03017604 | 2/2003 |
| WO | 2003045076 | 5/2003 |
| WO | WO-2003045076 | 5/2003 |
| WO | 03069807 A1 | 8/2003 |
| WO | WO-03069807 A1 | 8/2003 |
| WO | 03073644 A1 | 9/2003 |
| WO | WO-03073644 A1 | 9/2003 |
| WO | 03094544 A1 | 11/2003 |
| WO | WO-03094544 A1 | 11/2003 |
| WO | 03105498 A1 | 12/2003 |
| WO | WO-03105498 A1 | 12/2003 |
| WO | 2004031918 A2 | 4/2004 |
| WO | WO-2004031918 A2 | 4/2004 |
| WO | 04084452 | 9/2004 |
| WO | 04084503 A2 | 9/2004 |
| WO | 2004077685 A2 | 9/2004 |
| WO | 2004077728 A2 | 9/2004 |
| WO | 2004084575 A2 | 9/2004 |
| WO | WO-04084452 | 9/2004 |
| WO | WO-04084503 A2 | 9/2004 |
| WO | WO-2004077685 A2 | 9/2004 |
| WO | WO-2004077728 A2 | 9/2004 |
| WO | WO-2004084575 A2 | 9/2004 |
| WO | 04100450 A1 | 11/2004 |
| WO | 2004095851 A2 | 11/2004 |
| WO | 2004098072 A2 | 11/2004 |
| WO | 2004100565 A2 | 11/2004 |
| WO | WO-04100450 A1 | 11/2004 |
| WO | WO-2004095851 A2 | 11/2004 |
| WO | WO-2004098072 A2 | 11/2004 |
| WO | WO-2004100565 A2 | 11/2004 |
| WO | 2004105420 A1 | 12/2004 |
| WO | 2004110081 A1 | 12/2004 |
| WO | WO-2004105420 A1 | 12/2004 |
| WO | WO-2004110081 A1 | 12/2004 |
| WO | 2005018115 A1 | 2/2005 |
| WO | 2005018187 A2 | 2/2005 |
| WO | WO-2005018115 A1 | 2/2005 |
| WO | WO-2005018187 A2 | 2/2005 |
| WO | 2005020490 | 3/2005 |
| WO | WO-2005020490 | 3/2005 |
| WO | 2005034438 A1 | 4/2005 |
| WO | 2005039105 A1 | 4/2005 |
| WO | 2005039119 A1 | 4/2005 |
| WO | 2005039128 A1 | 4/2005 |
| WO | WO-2005034438 A1 | 4/2005 |
| WO | WO-2005039105 A1 | 4/2005 |
| WO | WO-2005039119 A1 | 4/2005 |
| WO | WO-2005039128 A1 | 4/2005 |
| WO | 05055533 | 6/2005 |
| WO | 05060132 A1 | 6/2005 |
| WO | 2005055527 A1 | 6/2005 |
| WO | 2005056251 A1 | 6/2005 |
| WO | 2005057812 A1 | 6/2005 |
| WO | 2005060271 A1 | 6/2005 |
| WO | 2005060277 | 6/2005 |
| WO | WO-05055533 | 6/2005 |
| WO | WO-05060132 A1 | 6/2005 |
| WO | WO-2005055527 A1 | 6/2005 |
| WO | WO-2005056251 A1 | 6/2005 |
| WO | WO-2005057812 A1 | 6/2005 |
| WO | WO-2005060271 A1 | 6/2005 |
| WO | WO-2005060277 | 6/2005 |
| WO | 2005062497 A1 | 7/2005 |
| WO | 2005065056 A2 | 7/2005 |
| WO | 2005069519 A1 | 7/2005 |
| WO | WO-2005062497 A1 | 7/2005 |
| WO | WO-2005065056 A2 | 7/2005 |
| WO | WO-2005069519 A1 | 7/2005 |
| WO | 2005072073 A2 | 8/2005 |
| WO | WO-2005072073 A2 | 8/2005 |
| WO | 2005107311 A1 | 11/2005 |
| WO | WO-2005107311 A1 | 11/2005 |
| WO | 2005125020 | 12/2005 |
| WO | 2005125049 | 12/2005 |
| WO | WO-2005125020 A1 | 12/2005 |
| WO | WO-2005125049 | 12/2005 |
| WO | 2006043773 A2 | 4/2006 |
| WO | 2006044718 A2 | 4/2006 |
| WO | WO-2006043773 A2 | 4/2006 |
| WO | WO-2006044718 A2 | 4/2006 |
| WO | 2006071052 A1 | 7/2006 |
| WO | 2006075293 A1 | 7/2006 |
| WO | WO-2006071052 A1 | 7/2006 |
| WO | WO-2006075293 A1 | 7/2006 |
| WO | 2006096789 A1 | 9/2006 |
| WO | 2006102639 A1 | 9/2006 |
| WO | WO-2006096789 A1 | 9/2006 |
| WO | WO-2006102639 A1 | 9/2006 |
| WO | 2006107835 | 10/2006 |
| WO | WO-2006107835 | 10/2006 |
| WO | 2006116704 A2 | 11/2006 |
| WO | 2006126080 A1 | 11/2006 |
| WO | WO-2006116704 A2 | 11/2006 |
| WO | WO-2006126080 A1 | 11/2006 |
| WO | 2006138337 A1 | 12/2006 |
| WO | WO-2006138337 A1 | 12/2006 |
| WO | 2007011984 A2 | 1/2007 |
| WO | WO-2007011984 A2 | 1/2007 |
| WO | 2007024931 A2 | 3/2007 |
| WO | 2007031956 A2 | 3/2007 |
| WO | 2007035796 A1 | 3/2007 |
| WO | WO-2007024931 A2 | 3/2007 |
| WO | WO-2007031956 A2 | 3/2007 |
| WO | WO-2007035796 A1 | 3/2007 |

(56) References Cited

FOREIGN PATENT DOCUMENTS

| WO | 2007073121 A1 | 6/2007 |
|---|---|---|
| WO | 2007073487 A2 | 6/2007 |
| WO | WO-2007073121 A1 | 6/2007 |
| WO | WO-2007073487 A2 | 6/2007 |
| WO | 07075671 | 7/2007 |
| WO | 2007075955 A1 | 7/2007 |
| WO | WO-07075671 | 7/2007 |
| WO | WO-2007075955 A1 | 7/2007 |
| WO | 2008018711 A2 | 2/2008 |
| WO | 2008024578 A2 | 2/2008 |
| WO | WO-2008018711 A2 | 2/2008 |
| WO | WO-2008024578 A2 | 2/2008 |
| WO | 2008055235 | 5/2008 |
| WO | WO-2008055235 | 5/2008 |
| WO | 2008100242 A2 | 8/2008 |
| WO | WO-2008100242 A2 | 8/2008 |
| WO | 2008139249 A2 | 11/2008 |
| WO | WO-2008139249 A2 | 11/2008 |

OTHER PUBLICATIONS

3GPP TSG RAN2#45bis. "EDCH Buffer Status Reporting," R2-050026, Sophia Antipolis, France, Jan. 10-14, 2005, URL: http://www.3gpp.org/ftp/tsg_ran/WG2_RL2/TSGR2_45bis/Dcs/R2-050026.zip.

3GPP TSG-RAN WG2 meeting #48. "Scheduling Information Contents," R2-051957, London, United Kingdom, Aug. 29, 2005, URL: http://3gpp.org/ftp/tsg_ran/WG2_RL2/TSGR2_48/Docments/R2-095517.zip.

3GPP: ETSI TS 125 331 V6.3.0: Radio Resource Control (RRC) protocol specification (3GPP TS 25.331 version 6.3.0 Release 6), Sep. 1, 2004, pp. 49, 202-209, 220,221,406,579-585, 589, 930.

Chang, Cheng-Ta: "Downlink Transmit Power Issues in a WCDMA Cellular System," Dec. 14, 2004, p. 3, Fig. 1, Retrieved online: http://wintech.ee.nctu.edu.tw/handoff/MediaTek/Material/Wintech/1214/Downlink%20Transmit%20Power%20Issues%20in%20a%20WCDMA%20Cellular%20System.pdf.

Ericsson: Discussion on SIR Measurement, TSG-RAN Working Group 4 (Radio) meeting #18, R4-010895, Berlin, Germany, 3GPP TS 25.101 V3.7.0, Jul. 9, 2001, URL: http://www.3gpp.org/ftp/tsg_ran/WG4_Radio/TSGR4_18/Docs/R4-010895.zip.

European Search Report—EP11165273—Search Authority—Munich—dated Jun. 9, 2011.

European Search Report—EP14184191—Search Authority—Munich—dated Nov. 18, 2014.

European Search Report—EP15160490—Search Authority—Berlin—dated Jul. 21, 2015.

Gunnarson, F., et al.: "Uplink Admission Control in WCDMA Based on Relative Load Estimates", IEEE International Conference on Communications, vol. 1, pp. 3091-3095, IEEE, New York, NY USA (Apr. 28, 2002).

Gunnarsson, G. et al.,"Location Trial System for Mobile Phones," Global Telecommunications Conference, 1998. Globecom 98. The Bridge to Global Integration. IEEE, vol. 4, pp. 2211-2216, Nov. 8-12, 1998.

Hobfeld, T. et al., "Supporting Vertical Handover by Using a Pastry Peer-to-Peer Overlay Network," Fourth Annual IEEE International Conference on Pervasive Computing and Communications Workshops, 2006. Percom Workshops 2006. Mar. 13-17, 2006, pp. 163-167, p. 164, paragraph III, IEEE, Piscataway, NJ, USA, XP010910514, ISBN: 0-7695-2520-2.

Hosein, et al., "Optimal Assignment of Mobile Station Serving Sector for the Forward Link of a Time-Shared Wireless Packet Data Channel," Fifth IEE International Conference on 3G Mobile Communication Technologies (3G 2004), Oct. 18-Oct. 20, 2004, pp. 654-658.

IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 1-356, Sep. 2004.

International Search Report—PCT/US06/049083, International Search Authority—European Patent Office, dated Mar. 27, 2008.

Kapoor S., et al., "Initial Contribution on a System Meeting MBWA Characteristics", IEEE 802.20 Working Group on Mobile Broadband Wireless Access, IEEE C802.20-03/16, IEEE 802.20 Session#1, XP002461101, Mar. 6, 2003, 49 Pages.

Kwon, et al., "Quasi-Dedicated Access Scheme for Uplink Realtime Services in Future Wireless Communication Systems," Vehicular Technology Conference, 2005. VTC 2005—Spring. 2005 IEEE 61st Stockholm, Sweden, Apr. 20-May 1, 2005, Piscataway, NJ, USA, May 30, 2005, pp. 3117-3121.

LG Electronics Inc., "Relative Buffer Status Reporting," 3GPP TSG-RAN WG2 meeting #46bis, R2-050852, Apr. 4, 2005, pp. 1-3, URL, http://www.3gpp.org/ftp/tsg_ran/WG2_RL2/TSGR2_46bis/Documents/R2-050852.zip.

Majmundar, "Impact of Mobile-Originated Short Message Service on the Digital Control Channel of TDMA Systems," Vehicular Technology Conference, 2000. IEEE VTS Fall VTC 2000. 52nd Sep. 24-28, 2000, Piscataway, NJ, USA, IEEE, Sep. 24, 2000, pp. 1550-1555.

Samsung: "Uplink control signaling structure (Revision of R1-041086)," 3GPP TSG-RAN WG1 Meeting #38bis, Tdoc R1-041222, 3GPP, Sep. 20, 2004, URL: http://www.3gpp.org/ftp/tsg_ran/WG1_RL1/TSGR1_38bis/Dcs/R1-041222.zip.

Taiwan Search Report—TW095148230—TIPO—dated Oct. 25, 2013.

Taiwan Search Report—TW095148230—TIPO—dated Jun. 29, 2014.

Taiwan Search Report—TW103136196—TIPO—dated Aug. 19, 2015.

TIM/TILAB, Blu, Mobilkom Austria, One2one,Telefonica: "Re-introduction of SIR measurement," 3GPP TSG-RAN4 Meeting #17, R4-010647, 3GPP, Goteborg, Sweden, May 21, 2001, URL: http://www.3gpp.org/ftp/tsg_ran/WG4_Radio/TSGR4_17/Docs/R4-010647.Zip.

Wada, "A Study of OFDM Cellular System Using Single Band" Proceedings 1 of the 2002 Communications Society Conference, Japan, the Institute of Electronics, Information and Communication Engineers, Aug. 20, 2002, p. 355, B-5-58.

Written Opinion—PCT/US06/049083, International Search Authority—European Patent Office, dated Mar. 27, 2008.

Zhang H., et al., "Clean up for Closed-Loop MIMO in H-ARQ MAP IE", IEEE P802.16e/D7 Broadband Wireless Access Working Group< http://ieee802.org/16>, Mar. 10, 2010, pp. 1-6.

Zhang H., et al., "Clean up for Closed-Loop MIMO in H-ARQ MAP IE", IEEE P802.16e/D7 Broadband Wireless Access Working Group , Mar. 10, 2010, pp. 1-6.

3GPP TSG RAN WG4 (Radio): "CRs (Rel-6) to 25.101 & 25.133 for the WI "FDD Enhanced Uplink, RF"", RP-050207, 3GPP TSG RAN Meeting #28, Quebec, Canada, Jun. 1-3, 2005, Agenda Item 8.6.1, 11 Pages.

3rd Generation Partnership Project 2 "3GPP2": Medium Access Control (MAC) Standard for cdma2000 Spread Spectrum Systems, Release D; 3GPP2 C.S0003-D Version 2.0, Sep. 2005 (Sep. 2005), pp. 1-230, XP002429116.

"3rd Generation Partnership Project; Technical Specification Group Radio Access Network; Medium Access Control (MAC) protocol specification (Release 6)", 3GPP TS 25.321 V6.7.0 Dec. 2005, 91 Pages.

Alcatel: "Scheduling Information Report for E-UTRAN," R2-062963,3GPP TSG RAN WG2 #55, Seoul, Korea, Oct. 9-13, 2006, Agenda item: 16, 4pages.

Basyouni A., et al., "On Rate Assignment Schemes for the Reverse Packet Data Channel in cdma2000 1xEV-DV", IEEE Vehicular Technology Conference, Sep. 2006, 5 pages.

Benq Mobile: "Dynamic control of CQI reporting," R2-062448, 3GPP TSG RAN WG2 #54 Tallinn, Estonia, Aug. 28 to Sep. 1, 2006, Agenda Item: 11.8.3, 5 pages.

Bhushan, et al. : "CDMA2000 1XEV-DO Revision A: A physical layer and MAC layer overview," IEEE Communications Magazine, IEEE Service Center, Piscataway, NJ, US, vol. 44, No. 2, Feb. 1, 2006, pp. 75-87, ISSN: 0163-6804.

(56) References Cited

OTHER PUBLICATIONS

Chion M., et al., "Fix Problems in Feedback Polling IE", IEEE 802.16 Broadband Wireless Access Working Group, IEEE C802.16e-05/222r1, May 4, 2005, 5 pages.
Comstock D., et al., "Reverse Link High-Speed Packet Data Support in Cdma2000 1/Spl Times/Ev-Dv: Upper Layer Protocols", IEEE Communications Magazine, vol. 43, Issue. 4, Apr. 2005, pp. 48-56.
Ericsson: "GERAN evolution—Fast Ack/Nack reporting in UL and DL," Tdoc: GP-060755, 3GPP TSG GERAN #29, San Jose, Del Cabo, Mexico, Apr. 24-28, 2006, 14 pages.
Ericsson: "Requirements for UE Power Headroom", 3GPP TSG RAN WG4 (Radio) Meeting #37, R4-051125, Seoul, Korea. Nov. 7-11, 2005, 4 pages.
Ericsson: "UE Power Headroom Measurement", 3GPP TSG RAN WG1 Meeting #42, 3GPP Draft; R1-050755, 3rd Generation Partnership Project (3GPP), Mobile Competence Centre; 650, Route Des Lucioles; F-06921 Sophia-Antipolis Cedex; France, vol. RAN WG1, No. London, UK; Aug. 23, 2005 (Aug. 23, 2005), XP050100394, Aug. 29, 2005-Sep. 2, 2005, [retrieved on Aug. 23, 2005], 8 Pages.
Ericsson: "UE TX Power Headroom Requirements", 3GPP TSG RAN WG4 (Radio) Meeting #36, 3GPP Draft; R4-050645, 3rd Generation Partnership Project (3GPP), Mobile Competence Centre; 650, Route Des Lucioles; F-06921 Sophia-Antipolis Cedex; France, vol. RAN WG4, No. London, UK; Aug. 29, 2005-Sep. 2, 2005, Sep. 3, 2005 (Sep. 3, 2005), XP05174228, Sep. 1, 2005, [retrieved on Sep. 3, 2005] 4 Pages.
ETRI: "CQI Reporting for Downlink Scheduling," R2-062877, 3GPP TSG RAN WG2 #55, Seoul, Korea, Oct. 9-13, 2006, Agenda Item: 13.2, 2 pages.
ETRI: "CQI Reporting Procedure for Downlink Scheduling", Discussion and Decision, 3GPP TSG RAN WG2 #56, R2-063276, Agenda Item:11.9, Riga, Latvia, Nov. 6-10, 2006, 3 Pages.
Gu J., et al., "Radio Link Protocol Based SCH Power Control in cdma2000", IEEE 17th International Symposium on Personal, Indoor and Mobile Radio Communications, Sep. 2006, 4 pages.
Hosein, et al.: "Dynamic Power Headroom Threshold for Mobile Rate Determination in a CDMA Network", Vehicular Technology Conference, 2004, VTC 2004—Spring, 2004 IEEE 59th Milan, Italy, May 17-19, 2004, Piscataway, NJ, USA, IEEE, May 17, 2004, pp. 2404-2408.
Hou J., et al., "Implementing Interference Cancellation to Increase the EV-DO Rev a Reverse Link Capacity", IEEE Communications Magazine, vol. 44, issue. 2, Feb. 2006, 7 pages.
Huawei: "Sensitivity of DL/UL Performance to CQI-Compression with Text Proposal", Discussion and Decision, TSG RAN WG1 ad hoc meeting on LTE, R1-060228, Helsinki, Jan. 23-25, 2006, 7 Pages.
IP Wireless et al., "RACH Reporting", 3GPP TSG-RAN-WG2 Meeting #56, R2-063337, Riga, Latvia, Nov. 6-10, 2006, Agenda Item: 19, 2 Pages.
Jain A., et al., "Reverse-link Control Mechanisms in CDMA2000 Revision-D: Performance Evaluation", IEEE 15th International Symposium on Personal, Indoor and Mobile Radio Communications (IEEE Cat. No. 04TH8754), 2004, pp. 2040-2045.
LG Electronics Inc: "MAC-e PDU Format for Scheduling Information", R2-051425, 3GPP TSG-RAN WG2 meeting #47, May 9-13, 2005, Athens, Greece, Agenda item: 12.3.2, 3 Pages.
Lott, et al.: "Reverse Traffic Channel MAC Design of cdma2000 1xEV-DO Revision a System," Vehicular Technology Conference, 2005, XP-010855656, pp. 1416-1421, May 2005.
Motorola et al., "Scheduling Information Reporting at E-DCH Cell Change", 3GPP TSG-RAN-WG2 Meeting #48, R2-051885, London, UK, Aug. 29-Sep. 2, 2005, CR-Form-v7.1; Change Request, 3 Pages.
Motorola: "UE Measurement Reporting," TSGR1-02-0025, TSG-RAN-WG1 HSDPA Ad-Hoc, Espoo, Finland, Jan. 8-11, 2002, Agenda Item: HSDPA, 14 pages.
NEC: "Compressed CQI Reporting Scheme," R2-062490, 3GPP TSG RAN WG2 Meeting #54, Tallinn, Estonia, Aug. 28 to Sep. 1, 2006, Agenda Item: 11.8.3, 11 pages.
Nokia: "Buffer Reporting for E-UTRAN", 3GPP TSG-RAN WG2 Meeting #52, 3rd Generation Partnership Project (3GPP), Technical Specification Group (TSG) Radio Access Network (RAN), Working Group 2 (WG2), vol. R2-060829, Agenda item:6.5, Mar. 27, 2006 (Mar. 27, 2006), pp. 1-5, XP003013941.
Nokia et al., "RACH Reporting", 3GPP TSG-RAN-WG2 Meeting #54, R2-062358, Tallinn, Estonia, Sep. 1-28, 2006, Agenda Item: 12, 2 Pages.
Nokia: "TF and TFC Set Definition", 3GPP TSG-RAN WG2 Meeting #23, R2-011843, Helsinki, Finland, Jul. 27-31, 2001, 3 Pages.
Panasonic: "Mobility-related Measurement Information", 3GPP TSG RAN WG2 #56, R2-063150, Nov. 6-10, 2006, Riga, Latvia, Agenda Item: 11.6.1, 4 Pages.
Panasonic: "Rate Request Scheme", R2-050426, 3GPP TSG-RAN WG2#46 meeting, Feb. 14-18, 2005, Scottsdale, USA, Agenda Item: 11.3.2, 4 Pages.
Qualcomm Europe: "Definition of HS-DPCCH Coding for FDD MIMO Operation in Rel-7", Discussion and Decision, 3GPP TSG-RAN WG1 #47, R1-063422, Riga, Latvia, Nov. 6-10, 2006, 16 Pages.
Qualcomm: "PA Backoff in Power Headroom Reporting", R2-050453, 3GPP TSG-RAN WG2 meeting #46, Feb. 14-18, 2005, Scottsdale, USA, Agenda item: 11.2, 6 Pages.
RAN4: "Draft Reply LS to RAN2 on Management of Power Limitation for EUL" 3GPP TSG-RAN Working Group 4 Meeting #35, R4-050298, Athens, Greece, May 9-13, 2005, 2 pages.
Soriaga J.B., et al., "WLC04-4: Network Performance of the EV-DO CDMA Reverse Link with Interference Cancellation", IEEE Globecom 2006, 5 pages.
Stewart K., "Re: AH32, AH33 Re: UE capability vs. CQI," Sep. 17, 2002, 4 pages.
T-Mobile et al., "Deferred SIB11/12 reading and acting," R2-062348, 3GPP TSG-WG2 Meeting #54, Talinn, Estonia, Aug. 28 to Sep. 1, 2006, 55 pages.
Zhang H., et al., "Text Clarification and Clean-up for theMAC Header," IEEE C802.16e-05/210r2, May 4, 2005, 25 pages.
Zhou Q., et al., "A Novel Rate and Channel Control Scheme Based on Data Extraction Rate for LoRa Networks", IEEE Wireless Communications and Networking Conference (WCNC), Apr. 2019.
Ericsson: "UE TX Power Headroom Requirements", 3GPP TSG RAN WG4 (Radio) Meeting #36, 3GPP Draft; R4-050645, 3rd Generation Partnership Project (3GPP), Mobile Competence Centre; 650, Route Des Lucioles; F-06921 Sophia-Antipolis Cedex; France, vol. RAN WG4, No. London, UK; Aug. 29, 2005-Sep. 2, 2005, Sep. 3, 2005 (Sep. 3, 2005), XP050174228, Sep. 1, 2005, [retrieved on Sep. 3, 2005] 4 Pages.

| FORMAT OF DLSNR5 REPORT | |
|---|---|
| Bits (MSb:LSb) | REPORTED WT MEASURED DOWNLINK PILOT CH SNR |
| 0b00000 | -12dB |
| 0b00001 | -11dB |
| 0b00010 | -10dB |
| 0b00011 | -9dB |
| 0b00100 | -8dB |
| 0b00101 | -7dB |
| 0b00110 | -6dB |
| 0b00111 | -5dB |
| 0b01000 | -4dB |
| 0b01001 | -3dB |
| 0b01010 | -2dB |
| 0b01011 | -1dB |
| 0b01100 | 0dB |
| 0b01101 | 1dB |
| 0b01110 | 2dB |
| 0b01111 | 3dB |
| 0b10000 | 4dB |
| 0b10001 | 5dB |
| 0b10010 | 6dB |
| 0b10011 | 7dB |
| 0b10100 | 9dB |
| 0b10101 | 11dB |
| 0b10110 | 13dB |
| 0b10111 | 15dB |
| 0b11000 | 17dB |
| 0b11001 | 19dB |
| 0b11010 | 21dB |
| 0b11011 | 23dB |
| 0b11100 | 25dB |
| 0b11101 | 27dB |
| 0b11110 | 29dB |
| 0b11111 | RESERVED |

FIGURE 19

METHODS AND APPARATUS RELATED TO SELECTING CONTROL CHANNEL REPORTING FORMATS

RELATED APPLICATIONS

The present application is a continuation of U.S. patent application Ser. No. 11/581,218, filed on Oct. 13, 2006, titled "METHODS AND APPARATUS RELATED TO SELECTING CONTROL CHANNEL REPORTING FORMATS" which is a continuation in part of U.S. Utility patent application Ser. No. 11/333,792, filed on Jan. 17, 2006, titled "METHODS AND APPARATUS OF IMPLEMENTING AND/OR USING A DEDICATED CONTROL CHANNEL" which claims the benefit of U.S. Provisional Patent Application Ser. No. 60/752,973, filed on Dec. 22, 2005, titled "COMMUNICATIONS METHODS AND APPARATUS", and each of which is hereby expressly incorporated by reference.

FIELD OF THE INVENTION

The present invention relates to wireless communications methods and apparatus and, more particularly, to methods and apparatus for implementing and using control channels.

BACKGROUND

In multiple access wireless communications systems, multiple wireless terminals are typically in competition for limited air link resources. A wireless terminal, operating in a state supporting uplink and downlink user data traffic signaling, typically tries to routinely communicate control information to a base station attachment point. In some systems control information may be communicated in the form of control information reports which allow the base station attachment point to obtain information about the wireless terminal status and effectively allocate resources. As the popularity and variety of wireless communication services has increased, the need to support ever larger numbers of concurrent users has grown. In addition, events and/or time of day can drive peak concurrent user demand.

Changes in the number of concurrent users can affect the demand for control information communication resources. However, it should also be appreciated that different wireless terminals can have different needs at different times and that the demand for resources in many cases is not simply a matter of the total number of terminals in the system that have the ability to communicate user data to the base station.

Different wireless terminals using the same base station attachment point often have different reporting needs and priorities. For example, a first wireless terminal operating from a current stationary position, with no or minimal obstructions between itself and the base station attachment point, and needing to communicate small amounts of user data infrequently may have very different control information reporting needs than another, e.g., second, wireless terminal, e.g., a mobile node in a moving automobile, experiencing rapidly changing channel conditions and/or needing to communicate large amounts of data frequently. Using a universal single control information reporting format to report control information to a base station although simple to implement can result in inefficiencies due to tradeoffs made to accommodate the wide variety of different types of anticipated concurrent users with reasonable degree of effectiveness.

In view of the above, it should be appreciated that there is a need for methods and apparatus which provide flexibility with regard to control information reporting, e.g., flexibility in terms of supported report formats. Improved methods and/or apparatus which tend to match a wireless terminal's current needs and/or conditions to a well suited control information report format would tend to increase efficiency and be beneficial, e.g., in terms of increasing traffic throughput capability. The ability to change control information reporting formats, if it could be supported, could also be useful in some cases.

SUMMARY

Various embodiments are directed to methods and apparatus related to control information reporting over wireless communication channels including control information reporting format alternatives. Selection between various control reporting format alternatives is performed, in some embodiments, by a wireless terminal and/or a base station.

In some exemplary embodiments, a method of operating a first communications device, e.g., a wireless terminal, to interact with a second communications device, e.g., a base station, includes: determining a set of control information reports to be transmitted, e.g., selecting between a plurality of predetermined reporting formats where said set of control information reports corresponds to a reporting format; generating the determined set of control information reports; and communicating said generated set of control information reports. In some such embodiments, the control information reporting format is selected as a function of an application being executed, e.g., a voice application vs a data application. In some embodiments, the control information reporting format is selected as a function of at least one of: device capability information, channel conditions, system loading, and user quality of service information. In some embodiments, the control information reporting format is selected as a function of at least one of a received command signal and a received request signal. An exemplary communications device, e.g., wireless terminal, in accordance with some but not necessarily all embodiments, includes a report format selection module for selecting a reporting format. The reporting format is one of a plurality of supported reporting formats. The reporting format specifies a set of report definitions, e.g., one or more report definitions. In some embodiments, the report format also specifies a reporting schedule as part of the report format. In some implementations, the communications device further includes a report generation module for generating a sequence of reports in accordance with a reporting schedule which is part of a particular selected reporting format and at least one definition in the set of report definitions. The communications device may also include a transmitter for transmitting the generated sequence of reports.

A method of operating a first communications device, e.g., a base station, to interact with a second communications device, e.g., a wireless terminal, in accordance with various embodiments, includes: determining a set of control information reports, e.g., one or more reports, to be transmitted. The set of control information reports in some embodiments corresponds to a reporting format. Determining a set of control information reports to be transmitted may include selecting between a plurality of predetermined reporting formats. Interacting with the second communications device may further include generating the determined set of control information reports; and communicating the generated set of control information reports, e.g., by transmitting them over a wireless communications link to the second communications device The transmission may, but need not be, in a control channel dedicated to use by the first communications device. An exemplary communications device, e.g., base station, in accordance with various exemplary embodiments, includes: a report format selection module for selecting a reporting format where the selected reporting format is one of a plurality of supported reporting formats. The reporting format indicates a set of report definitions and, in some but not necessarily all embodiments, also indicates a reporting schedule. The base station may also include a report recovery module for recovering report information from a sequence of received reports in accordance with the selected reporting schedule and at least some definitions in the set of report definitions. In addition, the base station may include a receiver for receiving said sequence of reports. In some but not necessarily all embodiments, the control information reporting format is selected as a function of an application being executed, e.g., a voice application vs a data application. In some embodiments, the control information reporting format is selected as a function of at least one of: device capability information, channel conditions, system loading, and user quality of service information. In some embodiments, the control information reporting format is selected as a function of at least one of a received command signal and a received request signal.

BRIEF DESCRIPTION OF THE FIGURES

FIG. 19 is a table describing the exemplary format of exemplary 5 bit absolute report of downlink signal to noise ratio (DLSNR5).

DETAILED DESCRIPTION

Figure 1:
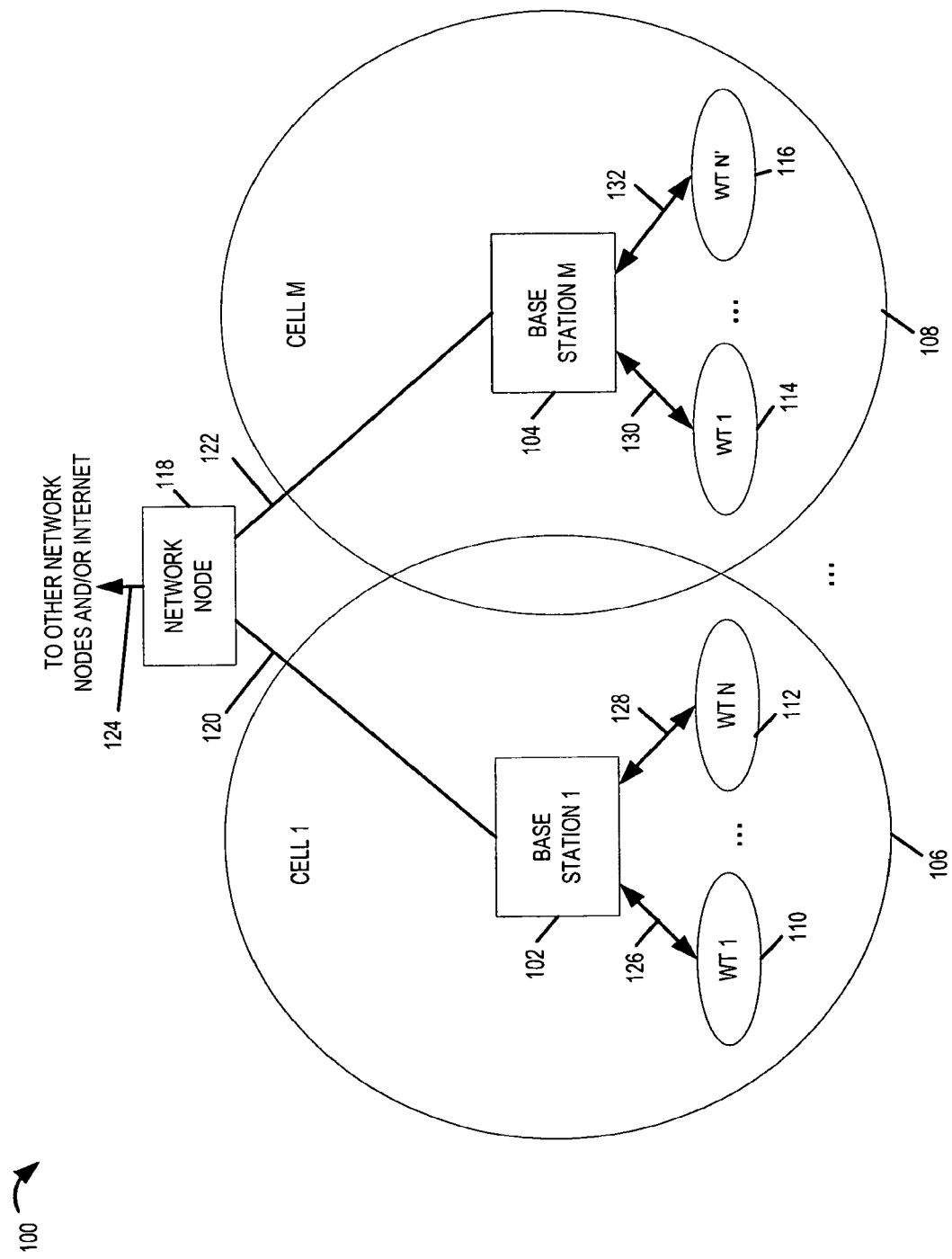
FIG. 1 is drawing of an exemplary wireless communications system implemented in accordance with various embodiments.

FIG. 1 is drawing of an exemplary wireless communications system 100 implemented in accordance with various embodiments. Exemplary wireless communications system 100 is, e.g., an orthogonal frequency division multiplexing (OFDM) multiple access wireless communications system. Exemplary wireless communications system 100 supports a plurality of different reporting formats for communicating control information reports, e.g., a plurality of different dedicated control channel reporting formats for uplink control information signaling. The particular control information reporting format used by a particular wireless terminal at a particular time can be and sometimes is matched to the wireless terminal, e.g., to achieve efficient use of air resources.

Exemplary wireless communications system 100 includes a plurality of base stations (base station 1 102, . . . , base station M 104). Each base station (102, 104) has a corresponding wireless coverage area (cell 1 106, cell M 108), respectively. System 100 also includes network node 118 which is coupled to base stations (102, 104) via network links (120, 122), respectively. Network node 118 is also coupled to other network nodes and/or the Internet via link 124. Network links (120, 122, 124) are, e.g., fiber optic links. System 100 may also include cells with multiple sectors and/or cells using multiple carriers.

System 100 also includes a plurality of wireless terminals. At least some of the wireless terminals are mobile node which may move throughout the communication system. In FIG. 1, wireless terminals (WT 1 110, WT N 112) are located in cell 1 106 and coupled to base station 1 102 via wireless links (126, 128), respectively. In FIG. 1, wireless terminals (WT 1" 114, WT N" 116) are located in cell M 108 and coupled to base station M 104 via wireless links (130, 132), respectively.

Figure 2:
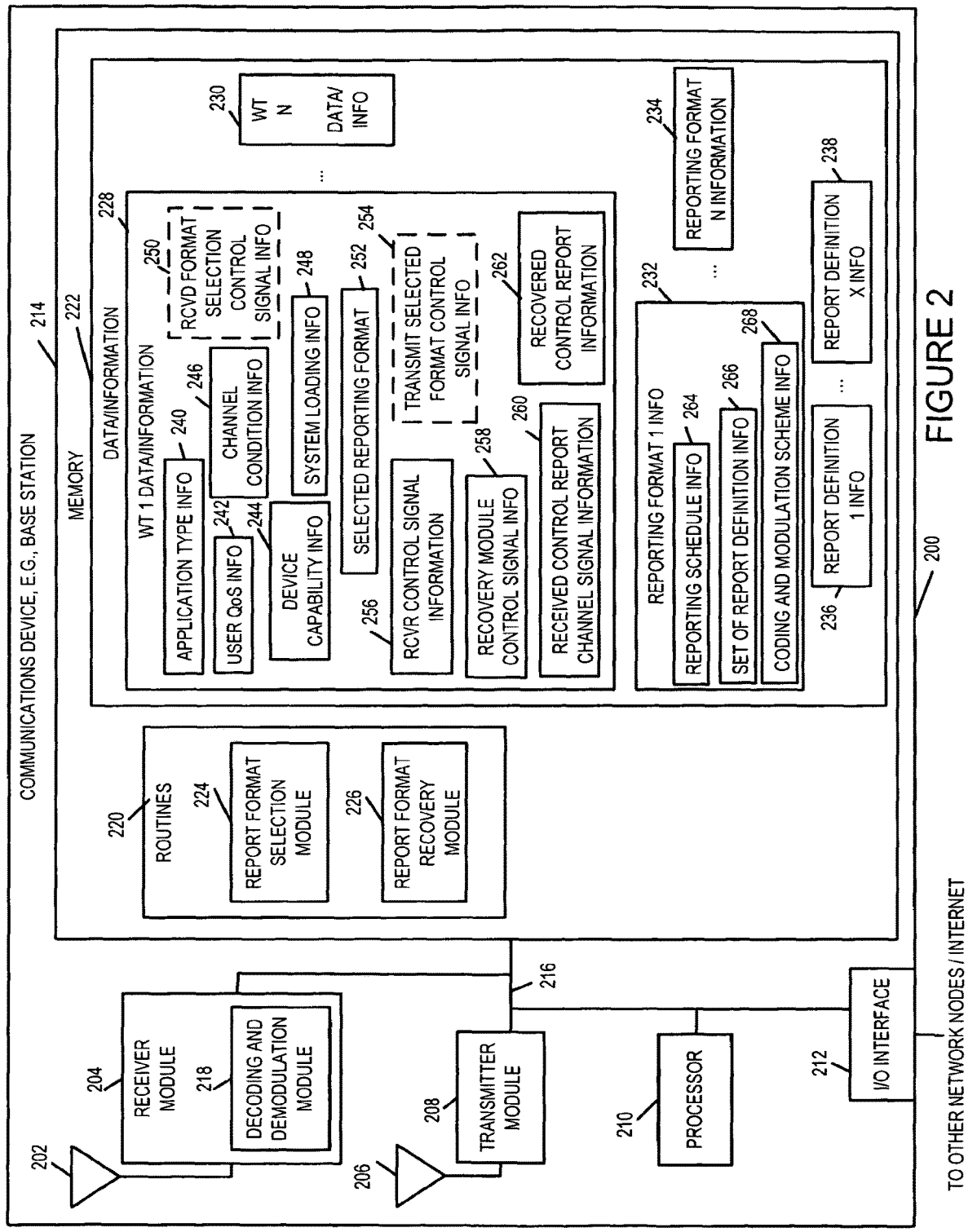
FIG. 2 is a drawing of an exemplary communications device, e.g., base station, implemented in accordance with various embodiments.

FIG. 2 is a drawing of an exemplary communications device 200, e.g., base station implemented in accordance with various embodiments. Exemplary communications device 200 may be any of the base stations (102, 104) in FIG. 1. Exemplary communications device 200 includes a receiver module 204, a transmitter module 208, a processor 210, an I/O interface 212 and a memory 214 coupled together via a bus 216 over which the various elements communicate data and information.

Receiver module 204, e.g., an OFDM receiver, is coupled to receive antenna 202 via which the communications device 200 receives uplink signals from a plurality of wireless terminals. Received uplink signals include control channel signals, e.g., dedicated control channel signals, conveying control information reports, e.g., uplink traffic channel request reports, power reports, SNR reports, interference reports, noise reports, latency reports, etc. In some embodiments, the received uplink signals include information conveying a wireless terminal's format selection for control information reports to be transmitted by the wireless terminal. Receiver module 204 includes a decoding and demodulation module 218 for implementing decoding and demodulation operations on received control channel signals in accordance with the reporting format being used by the wireless terminal.

Transmitter module 208, e.g., an OFDM transmitter, is coupled to transmit antenna 206 via which the communications device transmits downlink signals to wireless terminals. In some embodiments, the downlink signals include signals conveying, on a per wireless terminal basis, a selected reporting format to be used by a particular wireless terminal for uplink control information reports, e.g., uplink dedicated control channel reports.

Memory 214 includes routines 220 and data/information 222. The processor 210, e.g., a CPU, executes the routines 220 and uses the data/information 222 in memory 214 to control the operation of the communications device and implement methods. I/O interface 212 couples the communications device 200 to other network nodes, e.g., other base stations, routers, AAA nodes, Home Agent nodes, central control nodes, etc., and/or the Internet.

Routines 220 include a report format selection module 224 and a report format recovery module 226. The report format selection module 224 selects, on a per wireless terminal basis, a reporting format to be used for control information reports, e.g., uplink dedicated control information reports. The report format selection module 224 selects a reporting format from a plurality of different reporting formats (reporting format 1 info 232, . . . reporting format N information 234) as a function of at least one of: received format selection control signal information 250, application type information 240, user quality of service information 242, device capability information 244, channel condition information 246 and system loading information 248. Selected reporting format 252 is an output of report format selection module 224 and identifies one of (reporting format 1 information 232, . . . , reporting format N information 234). In some embodiments, e.g., an embodiment where the communication device 200 decides upon the reporting format selection as a function of at least one of application type information 240, user QoS information 242, device capability information 244, channel condition information 246, and system loading information 248, the communications device 200 generates transmit signal information to convey the selected reporting format 254 to convey the selected format, and transmits the selection information to the wireless terminal. In some embodiments, a wireless terminal evaluates and decides upon a reporting format to use and conveys that information to communications device 200, which is received as received format selection control signal information 250. In some such embodiments, communications device 200 does not include transmit selected format control signal information 254.

Report format selection module 224 generates receiver control signal information 256 and recovery module control signal information 258. The decoding and demodulation module 218 of receiver module 204 uses the receiver control signal information 256 to identify and implement the appropriate coding and modulation scheme corresponding to the selected reporting format 252. Report format recovery module 226, operating on a per wireless terminal basis, uses the recovery module control signal information 258 to identify and implement the appropriate reporting schedule information, e.g., info 264, set of report definition information, e.g., info 266, and particular reporting definitions, e.g. some of info (236, . . . 238) being used for the sequence of uplink control information reports being communicated from the wireless terminal. Received control report channel signal information 260 includes information input to and output from decoding and demodulation module 218. Recovered control report information 262 includes information output from report format recover module 226.

Data/information 222 includes a plurality of sets of wireless terminal data/information (WT 1 data/information 228, . . . WT N data/information 230), a plurality of sets of reporting format information (reporting format 1 information 232, . . . , reporting format N information 234), and a plurality of sets of report definition information (report definition 1 information 236, . . . , report definition X information 238). WT 1 data/information 228 includes application type information 240, user quality of service information 242, device capability information 244, channel condition information 246, system loading information 248, selected reporting format 252, receiver control signal information 256, recovery module control signal information 258, received control report channel signal information 260, and recovered control report information 262. In some embodiments, WT 1 data/information includes at least one of a received format selection control signal information 250 and a transmit selected format control signal information 254. Reporting format 1 information 232 includes reporting schedule information 264, set of report definition information 266, and coding and modulation scheme information 268.

Figure 3:
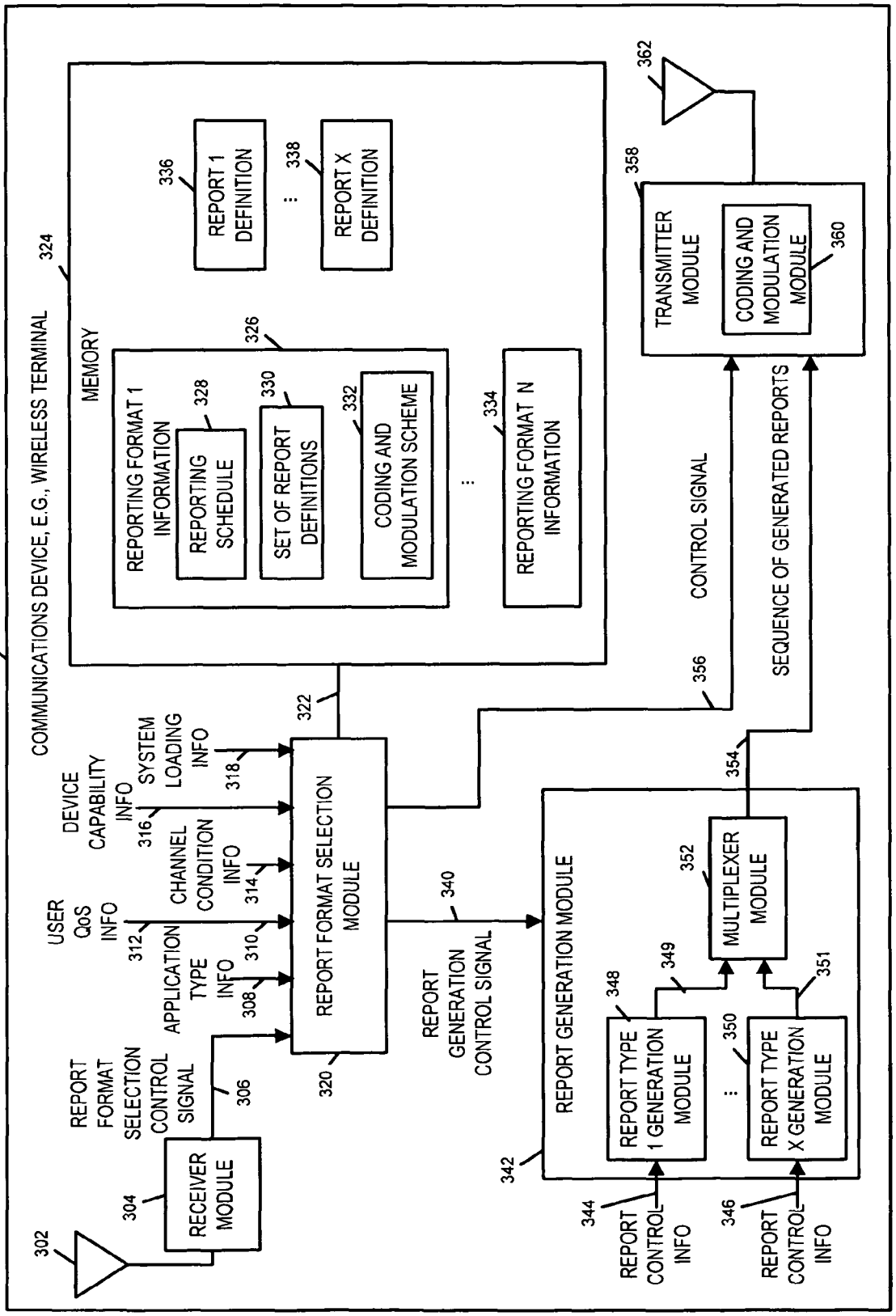
FIG. 3 is a drawing of an exemplary communications device, e.g., wireless terminal such as a mobile node, implemented in accordance with various embodiments.

FIG. 3 is a drawing of an exemplary communications device 300, e.g., wireless terminal such as a mobile node, implemented in accordance with various embodiments. Exemplary communications device 300 may be any of the exemplary wireless terminals (110, 112, 114, 116) in FIG. 1. Exemplary communications device 300 includes a receiver module 304, a report format selection module 320, a report generation module 342, a transmitter module 358 and a memory 324 coupled together.

The report format selection module 320 selects a reporting format, said reporting format being one of a plurality of supported reporting formats, said reporting format indicating a reporting schedule and a set of report definitions. The report format selection module 320 includes: an input for receiving application type information 308, an input for receiving user quality of service information 312, an input for receiving channel condition information 314, an input for receiving device capability information 316, an input for receiving system loading information 318, and an input for receiving a report format selection control signal 306.

In some embodiments, report format selection module 320 selects a reporting format as a function of an application being executed by one of said communications device and another communications device. In some such embodiments, said application is one of a voice and a data application. In some embodiments, the reporting format stored in memory that is selected in response to a voice application includes a latency report. In some embodiments, the reporting format stored in memory that is selected in response to a data application includes less frequent uplink request reports than the format selected in response to a voice application but more bits per uplink request on average than used for reports selected in response to a voice application. For example, a reporting format used for a voice application may use 1 bit uplink request reports and a 1 bit uplink request report may be included in each successive dedicated control channel segment, while a reporting format used for a data application may use 4 bit uplink request reports, and a 4 bit uplink request report may be included in once for every 4 successive dedicated control channel segments.

In various embodiments, the report format selection module 320 selects a reporting format as a function of at least one of device capability information, user quality of service information, channel condition information 314, and system loading information 318. Device capability information includes, e.g., number of antennas; number of antennas per channel; device classification information, e.g., strong receiver, weak receiver, voice capable, data capable, voice and data capable, stationary device, low velocity mobile device, high velocity mobile device; rate capability information; power capability information; remaining battery power information, etc.

Receiver module 304 is coupled to receive antenna 302 via which the communication devices receives signals. In some embodiments, received signals include a report format selection control signal 306, e.g., a command from a base station to switch to a particular reporting format. The received signal 306 is conveyed to the report format selection module 306 which selects the format as a function received signal 306.

The report format selection module 320 is coupled to memory 324 via bus 322. Memory 324 includes a plurality of predetermined reporting format information sets (reporting format 1 information 326, . . . , reporting format N information 334) and report definition information (report definition 1 information 336, . . . , report definition X information 338). Report definition information, e.g., report definition 1 information 336, specifies a type of control information and control information to bit mapping information to be communicated in a report, e.g., an SNR report format, a traffic request report format, a power information report format, an interference request format. Report format 1 information 326 includes a reporting schedule 328, a set of report definitions 330, and a coding and modulation scheme 332. The set of report definitions 330 identifies a subset of report definitions (336, . . . , 338) used when the wireless terminal is operating in reporting format 1. The reporting schedule 328 includes information identifying a sequence of reports to be communicated within a reporting structure, e.g., a predetermined recurring reporting structure, when using reporting format 1. Coding and modulation scheme 332 identifies a coding and modulation scheme to be used to communicate control information reports when using reporting format 1, e.g., BPSK or QPSK, a number of information bits per segment, a number of coded bits per segment, and a mapping between coded bits and modulation symbols.

Report generation module 342 generates a sequence of reports 354 in accordance with the selected reporting schedule and at least some definitions in the set of report definitions. Report generation module 342 includes a plurality of different report type generation modules (report type 1 generation module 348, . . . , report type X generation module 350) and a multiplexer module 352. Report type 1 generation module 348 implements the report definition 1 336 mapping report control information 344 to generate a set of control information report bits 349. For example, consider that report type 1 is a 4 bit uplink traffic channel request report which communicates backlog information about queued frames of information waiting to be communicated. In one such case module 348 maps a count of frames to a quantization level represented by one of the sixteen potential 4 bit pattern which can be communicated by the report. Similarly report type X generation module 350 implements the report definition X 338 mapping report control information 346 to generate a set of control information report bits 351. For example, consider that report type X is a 5 bit SNR report. In one such case module 350 maps a determined SNR level to a quantization level represented by one of the thirty-two potential 5 bit patterns which can be communicated by the report.

Report format selection module 320 sends report generation control signal 340 to report generation module 342 to control which reports are to be generated and the sequencing of the reporting in accordance with the selected reporting format to be implemented. For example, control signal 340 enables a sub-set of report generation modules corresponding to the set of report definition corresponding to the selected reporting format. Report format selection module 320 also sends a control signal 356 to the transmitter module 358 to control the coding and modulation scheme to be implemented by coding and modulation module 360 corresponding to the selected reporting format. Coding and modulation module 360 performs a coding and modulation operation on the generated sequence of reports using a predetermined coding and modulation scheme corresponding to selected reporting format. For example, in one exemplary embodiment for one particular reporting format, a first coding and modulation scheme is used where the sequences of reports are grouped into sets of 6 information bits and the six information bits are coded into 21 QPSK modulation symbols. In the same exemplary embodiment, for another particular reporting format, a second coding and modulation scheme is used where the sequence of reports are grouped into sets of 8 information bits, and the eight information bits are coded into 21 QPSK modulation symbols. In some embodiments, different reporting formats may correspond to different modulation constellations, e.g., a BPSK modulation constellation and a QPSK modulation constellation. Transmitter module 358, e.g., an OFDM transmitter, transmits OFDM signals including the sequence of generated reports via transmit antenna 362. The generated sequence of reports, in some embodiments, corresponds to dedicated control channel reports.

Figure 4:
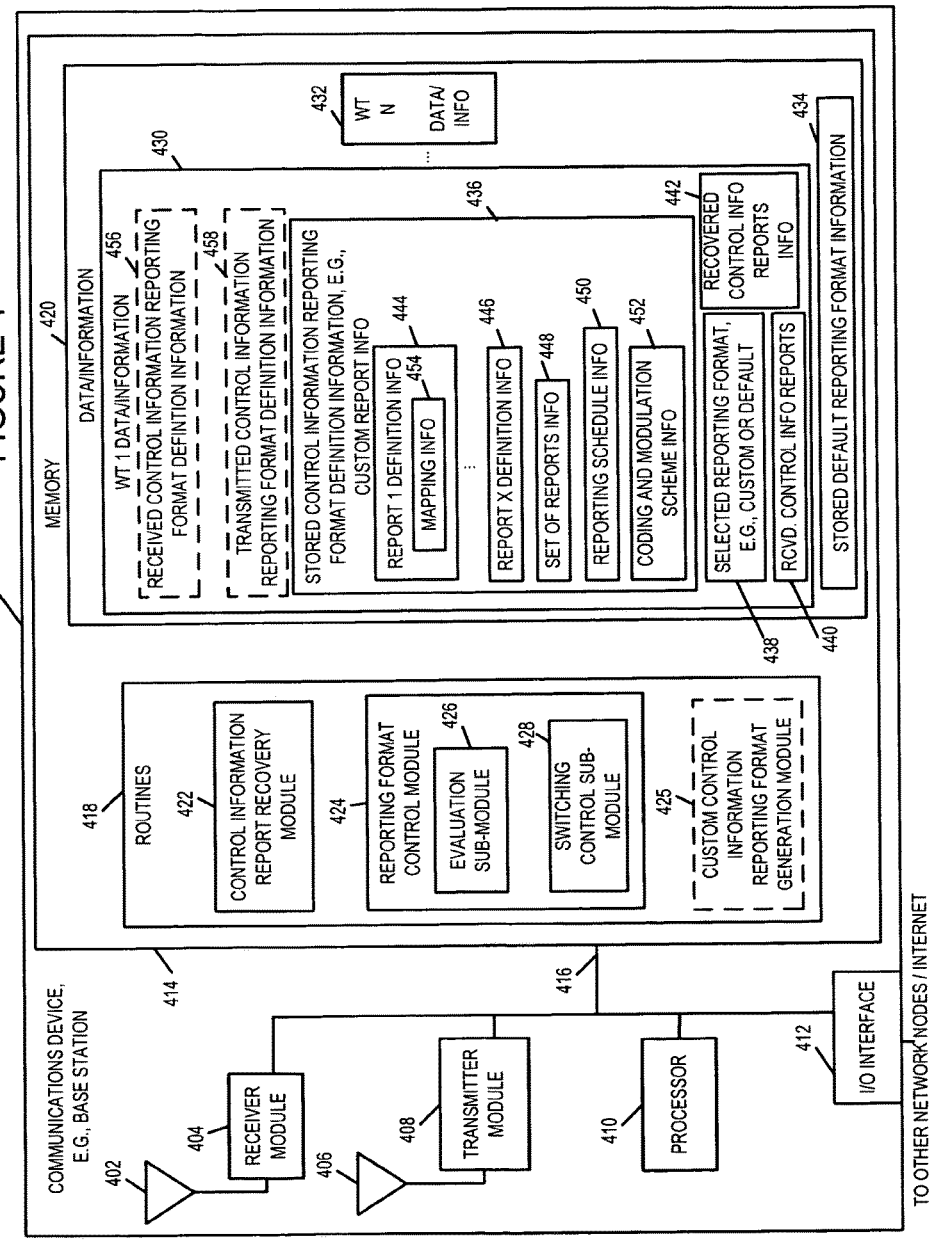
FIG. 4 is a drawing of an exemplary communications device, e.g., base station, implemented in accordance with various embodiments.

FIG. 4 is a drawing of an exemplary communications device 400, e.g., base station, implemented in accordance with various embodiments. Exemplary communications device 400 may be any of the exemplary base station (102, 104) in FIG. 1. Exemplary communications device 400 includes a receiver module 404, a transmitter module 408, a processor 410, an I/O interface 412, and a memory 414 coupled together via bus 416 over which the various elements interchange data and information. Memory 414 includes routines 418 and data/information 420. The processor 410, e.g., a CPU, executes the routines 418 and uses the data/information 420 in memory 414 to control the operation of the communications device 400 and implement methods.

Receiver module 404, e.g., an OFDM receiver, is coupled to receive antenna 402 via which the communications device 400 receives uplink signals from a plurality of wireless terminals. The received uplink signals include control channel signals, e.g., dedicated control channel signals conveying dedicated control channel reports. In some embodiments, the received uplink signals also include control channel information reporting format definition information, e.g., control channel format information corresponding to a custom reporting format determined by a wireless terminal.

Transmitter module 408, e.g., an OFDM transmitter, is coupled to transmit antenna 406 via which the communications device 400 transmits downlink signals to a plurality of wireless terminals. In some embodiments, the transmitted downlink signals include control channel information reporting format definition information, e.g., control channel format information corresponding to a custom reporting format determined by communications device 400, e.g., base station 400.

In accordance with various embodiments, different wireless terminals, using communications device 400, e.g., base station 400, as their point of network attachment can, and sometimes do, use different custom reporting formats for reporting uplink control information reports, e.g., different dedicated control channel reporting formats. For example, each of the customized reporting formats may be tailored to the current attributes, needs, and/or conditions of the particular wireless terminal and/or the environment in which the wireless terminal is currently operating.

I/O interface module 412 couples the communications device 400 to other network nodes and/or the Internet. Thus I/O interface 412 couples communications device 400 to a backhaul network facilitating a WT using base station 400 as its point of network attachment to participate in a communications session with a peer node using another base station as its point of network attachment.

Routines 418 include a control information report recovery module 422 and a reporting format control module 424. In some embodiments, routines 418 include a custom control information reporting format generation module. The control information report recovery module 422 is used to process received control information signals and recover control information report information. The control information report recovery module 422, which operates on a per wireless terminal basis, uses the selected reporting format information corresponding to the wireless terminal to identify which particular set of stored format information should be utilized to process the control information report signals from the wireless terminal. For example, consider that report recovery module 422 is processing received control information reports signals 440 from WT 1, if selected reporting format information 438 identifies the custom reporting format, stored control information reporting format definition information 436 is utilized; however, if selected reporting format information 438 identifies the default format, then, stored default reporting format information 434 is utilized.

Reporting format control module 424 checks at least one of device capability information, channel condition information, application information, quality of service information, system loading information and a command control signal; and the reporting format control module 424 controls switching between different possible formats as a function of the result of the checking. Reporting format control module 424 includes an evaluation sub-module 426 and a switching control sub-module 428. Evaluation sub-module 426 checks at least one of device capability information, channel condition information, application information, quality of service information and system loading information, e.g., against predetermined criteria, and/or checks for the presence of a command control signal. In some embodiments, a plurality of sets of stored control information reporting format definition information 436 have been stored, e.g., corresponding to a plurality of possible custom reporting formats and evaluation sub-module 428 is used to select between said plurality of alternative formats. Switching control sub-module 428 is responsive to determinations by evaluation sub-module 426, e.g., implementing a control information reporting format switch from a default reporting format to a first custom reporting format, from a first custom reporting format to a second custom reporting format, and/or from a custom reporting format back to a default reporting format. Custom control information reporting format generation module 425 generates for a wireless terminal a custom control information reporting format, e.g., a control information reporting format for its dedicated control channel signaling tailored to accommodate the wireless terminal's current application(s), needs, requirements, conditions, capabilities, and/or environment.

Data/information 420 includes a plurality of sets of wireless terminal data/information (WT 1 data/information 430, . . . , WT N data/information 432), and stored default reporting format information 434. WT 1 data/information includes stored control information reporting format information 436, selected reporting format information 438, received control information reports information 440 and recovered control information reports information 442. WT 1 data/information 430 includes at least one of received control information reporting format information 456, e.g., e.g., a customized control information reporting format determined by WT 1 for uplink control information reports, and transmitted control information reporting format information 458, e.g., a customized control information reporting format determined by BS 400 to be used by WT 1 for uplink control information reports. At least some of the stored control information reporting format information 436 corresponds to one of information 456 and information 458.

Stored control information reporting format definition information 436, e.g., custom reporting format definition information, includes a plurality of report definition information (report 1 definition information 444, report X definition information 446, set of reports information 448, reporting schedule information 450, e.g., information indicating a sequence in which reports are to be transmitted by WT 1, and coding and modulation scheme information 452, e.g., information specifying a coding and modulation scheme to be applied to the set of control information reports being communicated. Report 1 definition information 444 includes mapping information 454. Mapping-information 454 defines a mapping between information communicated in said report and possible report values. Selected reporting format 438, e.g., indicates whether WT 1 is using custom reporting format definition information 436 or stored default reporting format information 434. Selected reporting format information 438 represents a control input used by control information report recovery module 422 when processing received control information reports 440 to determined recovered control information reports information 442.

In some embodiments, a wireless terminal generates control information reporting format information, e.g., a custom control information reporting format, and communicates the information to a base station, which will be receiving the control information reports in accordance with the custom reporting format. In some embodiments, the base generates control information reporting format information, e.g., a custom control information reporting format, and communicates the information to a wireless terminal, which will be generating control information reports in accordance with the custom reporting format. Thus, in accordance with various embodiments, a base station may be, and sometimes is receiving control information reports, e.g., dedicated control channel information reports, from a plurality of different wireless terminals, with at least some of the plurality of different wireless terminals using different custom reporting formats. In addition, the same wireless terminal may, and sometimes does, use different custom reporting formats at different times, e.g., with the particular report being tailored to accommodate current device capability information, system loading conditions, needs, applications, quality of service information and/or channel conditions.

Figure 5:
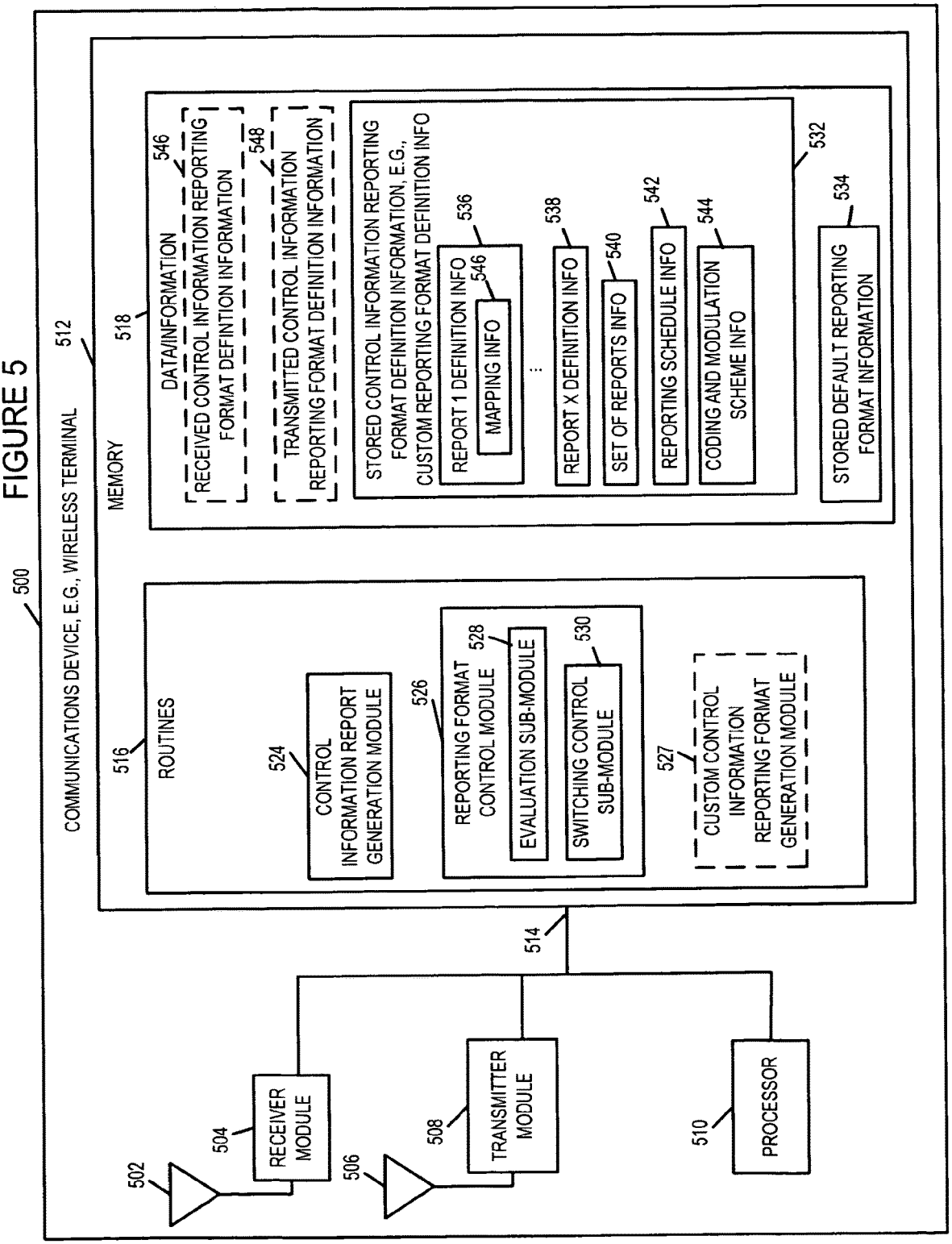
FIG. 5 is a drawing of an exemplary communications device, e.g., a wireless terminal such as a mobile node, in accordance with various embodiments.

FIG. 5 is a drawing of an exemplary communications device, e.g., a wireless terminal such as a mobile node, in accordance with various embodiments. Exemplary communications device 500 may be any of the exemplary wireless terminals (110, 112, 114, 116) of FIG. 1. In this exemplary embodiment, the wireless terminal supports a default control information reporting format and at times supports addition reporting format(s), e.g., one or more custom control reporting formats. For example a custom reporting format may be determined by a base station and downloaded to communications device 500 for subsequent use and/or a custom control information reporting format may be determined by communications device 500 and transmitted to a base station such that the base station can use the information for interpretation of subsequent control information reports. In various embodiments, the control information reporting format applies to uplink dedicated control channel reports. Exemplary communications device 500 includes a receiver module 504, a transmitter module 508, a processor 510, and a memory 512 coupled together via a bus 514 over which the various elements interchange data and information. Memory 512 includes routines 516 and data/information 518. The processor 510, e.g., a CPU, executes the routines 516 and uses the data/information 518 in memory 512 to control the operation of the communications device and implement methods.

Receiver module 504, e.g., an OFDM receiver, is coupled to receive antenna 502, via which the communications device receives signals, e.g., downlink signals from a base station. In some embodiments, the received signals include received control information reporting format definition information. Transmitter module 508, e.g., an OFDM transmitter, is coupled to transmit antenna 506 via which the communications device 500 transmits signals, e.g., uplink signals to a base station. In some embodiments, the transmitted signals include control channel reports, e.g., dedicated control channel reports, in accordance with a stored reporting format. For example, the stored reporting format is, at times, a default reporting format; while at other times the reporting format is a custom reporting format. In some embodiments, another node, e.g., a base station determines a custom reporting format for the communications device 500 to use and transmits control information reporting format definition information to communications device 500 which is received via receiver module 504 as received control information reporting format definition information 546. In some embodiments, communications device 500 determines a custom reporting format for the communications device 500 to use and transmits control information reporting format definition information 548 to another node, e.g., a base station. In this way the communications device 500 and the other node, e.g., base station, both can apply the same custom control information reporting format definition to control information reports being communicated, e.g., dedicated control channel reports.

Routines 516 include a control information report generation module 524 and a reporting format control module 526. In some embodiments, routines 516 include a custom control information reporting format generation module 527. The reporting format control module 526 includes an evaluation sub-module 528 and a switching control sub-module 530. Control information report generation module 524 generates a control information report in accordance with at least one of i) received reporting format definition information and ii) transmitted reporting format definition information.

Data/information 518 includes stored control information reporting format definition information 532 and stored default reporting format information 534. Data/information 518 includes at least one of received control information reporting format definition information 546 and transmitted control information reporting format definition information 548. Information 546 and/or information 548 corresponds to at least some of the information in stored control information reporting format definition information 532. Stored control information reporting format definition information 532, e.g., a custom reporting format to be used by wireless terminal 500, includes a plurality of report definition information (report 1 definition information 536, . . . , report X definition information 538), a set of reports information 540, reporting schedule information 542, and coding and modulation information 544.

Report 1 definition information 536 includes information corresponding to a particular type of report with a particular information bit size, e.g., a 4 bit uplink request report, a 5 bit SNR report, a 5 bit delay information report, etc. Report 1 definition information 536 includes mapping information 546 which maps a particular type of control information to one of a plurality of information bit patterns. Thus mapping information 546 defines a mapping between information to be included in a generated report and possible report values. Set of reports information 540 includes information identifying the different types of reports used for the custom reporting format. Reporting schedule information 542 includes information indicating a sequence in which reports of different types are to be transmitted. For example, the reporting schedule information 542 may identify an ordered sequence of report types in a predetermined reporting schedule. Alternatively, or in addition, the reporting schedule information may include information identifying time intervals for reports to be communicated, e.g., which OFDM symbol transmission time intervals are to be used to carry the sequence of control information reports to be transmitted. Coding and modulation scheme information 544 includes information identifying coding rates, modulation schemes, and/or modulation constellations used. Coding and modulation scheme information 544 includes information specifying a coding and modulation scheme to be applied to the defined set of reports to be communicated when using this reporting format.

Stored default reporting format information 534 includes a similar set of information to information 532. The default reporting formation information 534 is, in some embodiments, to be used, when communicating with another communications device, e.g., another base station, prior to receiving control information reporting format information from said another device or transmitting control information reporting format definition information to said another device. In some such embodiments, the stored default report format information 534 is used for an initial communication with said another communications device.

Reporting format control module 526 is used for checking at least one of device capability information, channel condition information, application information, quality of service information, system loading information and a command control signal and for controlling switching to another format as a result of said checking, e.g., switching to a custom reporting format, defined by information 532, which has been received or transmitted. Evaluation sub-module 528 checks at least one of device capability information, channel condition information, application information, quality of service information and system loading information, e.g., against predetermined criteria, and/or checks for the presence of a command control signal. In some embodiments, a plurality of sets of stored control information reporting format definition information 532 have been stored, e.g., corresponding to a plurality of possible custom reporting formats and evaluation sub-module 528 is used to select between said plurality of alternative formats. Switching control sub-module 530 is response to determinations by evaluation sub-module 530, e.g., implementing a control information reporting format switch from a default reporting format to a first custom reporting format, from a first custom reporting format to a second custom reporting format, and from a custom reporting format back to a default reporting format.

Custom control information reporting format generation module 527 generates for wireless terminal 500 a custom control information reporting format, e.g., a control information reporting format to be used subsequently for its dedicated control channel signaling, the generated custom control information reporting format tailored to accommodate the wireless terminal's current application(s), needs, requirements, conditions, capabilities, and/or environment.

Figure 6:
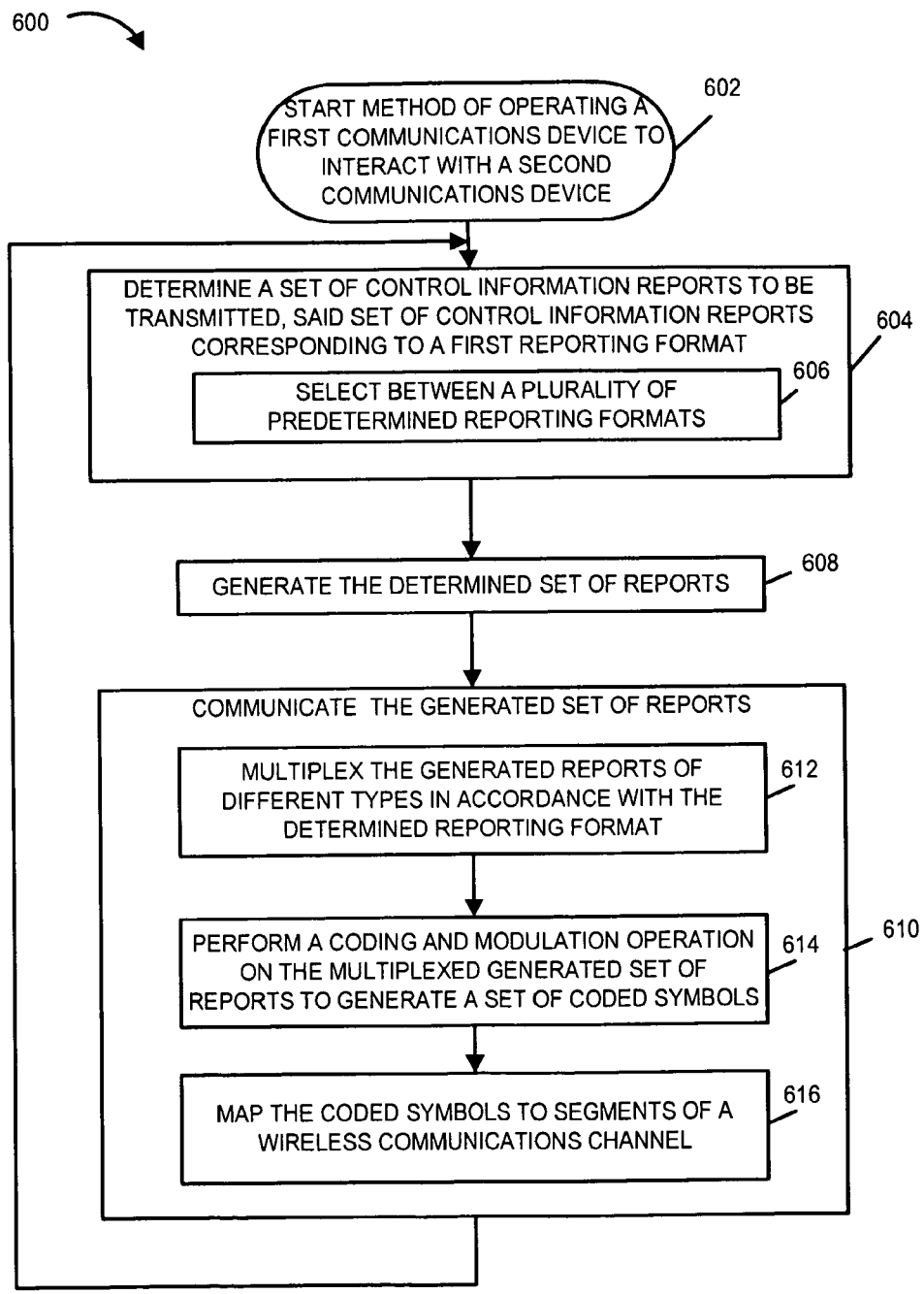
FIG. 6 is a flowchart of an exemplary method of operating a first communications device, e.g., a wireless terminal, to interact with a second communications device, e.g., a base station.

FIG. 6 is a flowchart 600 of an exemplary method of operating a first communications device to interact with a second communications device. For example, the first communications device may be a wireless terminal and the second communications device may be a base station, said first and second communication devices being included in a multiple access wireless communications system, e.g., an OFDM multiple access wireless communications system.

Operation starts in step 602, where the first communications device is powered on and initialized. Operation proceeds from start step 602 to step 604. In step 604, the first communication device determines a set of control information reports to be transmitted, said set of control information reports corresponding to a first reporting format. Step 604 includes sub-step 606, in which the first communications device selects between a plurality of predetermined reporting formats. In some embodiments, each of said plurality of predetermined reporting formats specifies a plurality of different types of reports and an ordering of said different types of reports. In various embodiments, the different report types includes at least two of a SNR report, a traffic request report, a power information report and an interference report. In some such embodiments, the reporting format further specifies the control information to be communicated in said different types of reports, e.g., report parameter, report parameter units, quantization level information, and/or bit mapping information. Operation proceeds from step 604 to step 608.

In step 608, the first communications device generates the determined set of reports, and then in step 610, the first communications device communicates the generated set of reports. Step 610 includes sub-steps 612, 614 and 616. In sub-step 612, the first communications device multiplexes the generated reports of different types in accordance with the determined reporting format. Operation proceeds from sub-step 612 to sub-step 614. In sub-step 614, the first communications device performs a coding and modulation operation on the multiplexed generated set of reports to generate a set of coded symbols. In some embodiments, the step of coding and modulation includes using a predetermined coding and modulation scheme corresponding to the determined reporting format, with different coding and modulation schemes being used for at least some of said plurality of reporting formats. Then, in sub-step 616, the first communications device maps the coded symbols to segments of a wireless communications channel. For example, a set of ordered coded modulation symbols such as BPSK or QPSK modulation symbols are mapped to an ordered sequence of dedicated control channel segments. Operation proceeds from step 610 to step 604, where the first communications device determines another set of control information reports to be transmitted.

Figure 7:
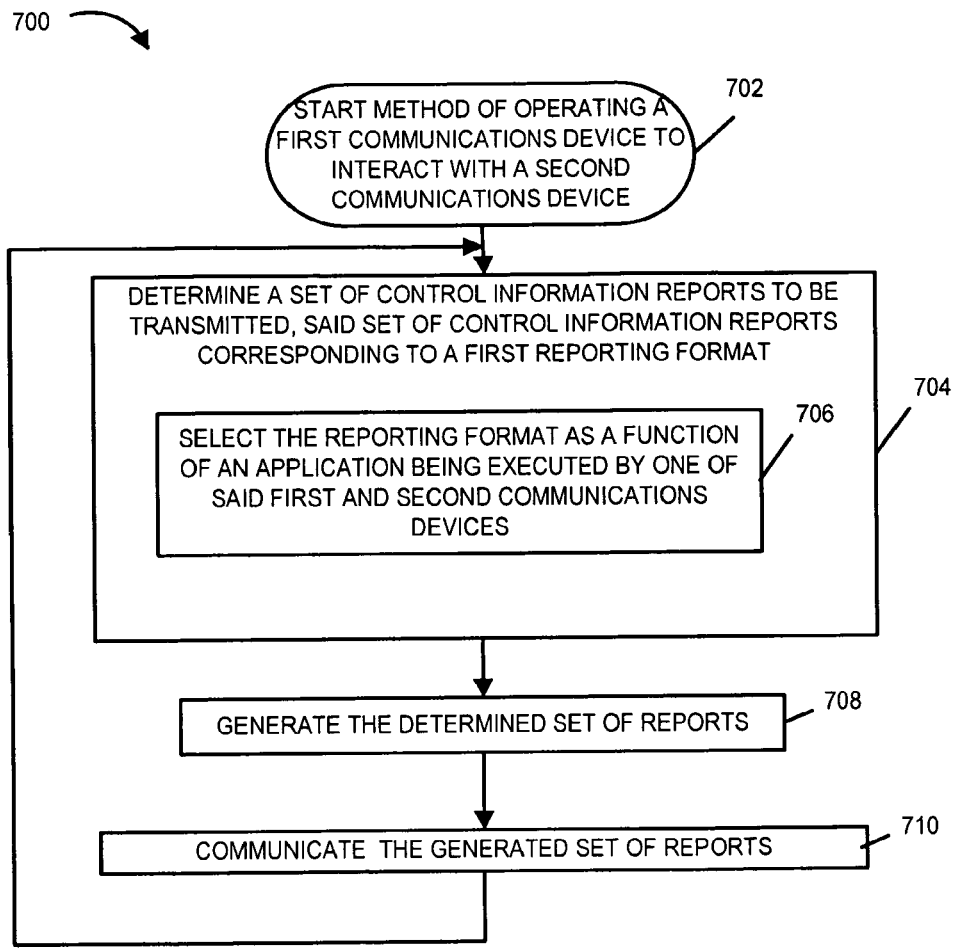
FIG. 7 is a flowchart of an exemplary method of operating a first communications device, e.g., a wireless terminal, to interact with a second communications device, e.g., a base station.

FIG. 7 is a flowchart 700 of an exemplary method of operating a first communications device to interact with a second communications device. For example, the first communications device may be a wireless terminal and the second communications device may be a base station, said first and second communication devices being included in a multiple access wireless communications system, e.g., an OFDM multiple access wireless communications system.

Operation starts in step 702, where the first communications device is powered on and initialized. Operation proceeds from start step 702 to step 704. In step 704, the first communication device determines a set of control information reports to be transmitted, said set of control information reports corresponding to a first reporting format. Step 704 includes sub-step 706, in which the first communications device selects the reporting format as a function of an application being executed by one of said first and second communications devices.

In some embodiments, the application is one of a voice and data application. In some such embodiments, a reporting format selected in response to a voice application includes a latency report and a reporting format selected in response to a data application includes less frequency uplink request reports than a format used for voice but more bits per uplink request on average than used for voice.

In some embodiments, each of said plurality of predetermined reporting formats specifies a plurality of different types of reports and an ordering of said different types of reports. In various embodiments, the different report types includes at least two of a SNR report, a traffic request report, a power information report, an interference report, and a delay report. In some such embodiments, the reporting format further specifies the control information to be communicated in said different types of reports, e.g., report parameter, report parameter units, quantization level information, and/or bit mapping information. Operation proceeds from step 704 to step 708.

In step 708, the first communications device generates the determined set of reports, and then in step 710, the first communications device communicates the generated set of reports. Operation proceeds from step 710 to step 704, where the first communications device determines another set of control information reports to be transmitted.

Figure 8:
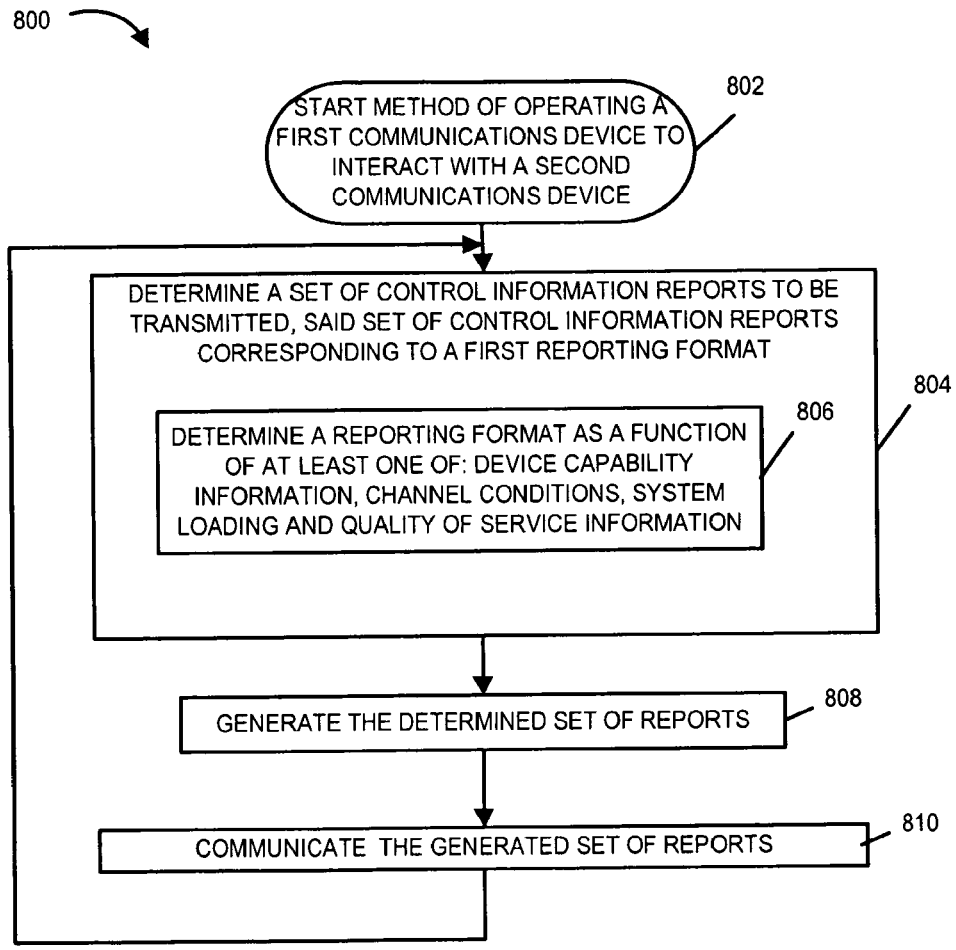
FIG. 8 is a flowchart of an exemplary method of operating a first communications device, e.g., a wireless terminal, to interact with a second communications device, e.g., a base station.

FIG. 8 is a flowchart 800 of an exemplary method of operating a first communications device to interact with a second communications device. For example, the first communications device may be a wireless terminal and the second communications device may be a base station, said first and second communication devices being included in a multiple access wireless communications system, e.g., an OFDM multiple access wireless communications system.

Operation starts in step 802, where the first communications device is powered on and initialized. Operation proceeds from start step 802 to step 804. In step 804, the first communication device determines a set of control information reports to be transmitted, said set of control information reports corresponding to a first reporting format. Step 804 includes sub-step 806, in which the first communications device determines a reporting format as a function of at least one of: device capability information, channel conditions, system loading, and quality of service information. Device capability information includes, e.g., information regarding number of antennas, information regarding number of receiver chains, power information, data rates supported, modulation schemes supported, receiver sensitivity, self noise information, and application support. For example, wireless terminals may be classified in sub-groups as a function of device capability, e.g., voice capable cellphones, voice and data capable cell phones, data terminals, voice and data terminals. Another exemplary classification may be in terms of mobility capability. Some wireless terminals may be suitable for stationary operation but not intended for dynamic operations, others may be suitable for mobile operation at up to a first rate of motion, and still others may be suitable for mobile operations at upto a second rate of motion, said second rate being higher than said first rate. Power information is also used in some embodiments to determine a reporting format to be used. Power information may include, power source information, e.g., battery vs external source, different power modes, e.g., a normal communications mode and a power saving mode, remaining battery power information, transmission power level information, rate of usage of battery power, etc.

In some embodiments, each of said plurality of predetermined reporting formats specifies a plurality of different types of reports and an ordering of said different types of reports. In various embodiments, the different report types includes at least two of a SNR report, a traffic request report, a power information report format, an interference report, and a delay report. In some such embodiments, the reporting format further specifies the control information to be communicated in said different types of reports, e.g., report parameter, report parameter units, quantization level information, and/or bit mapping information. Operation proceeds from step 804 to step 808.

In step 808, the first communications device generates the determined set of reports, and then in step 810, the first communications device communicates the generated set of reports. Operation proceeds from step 810 to step 804, where the first communications device determines another set of control information reports to be transmitted.

Figure 9:
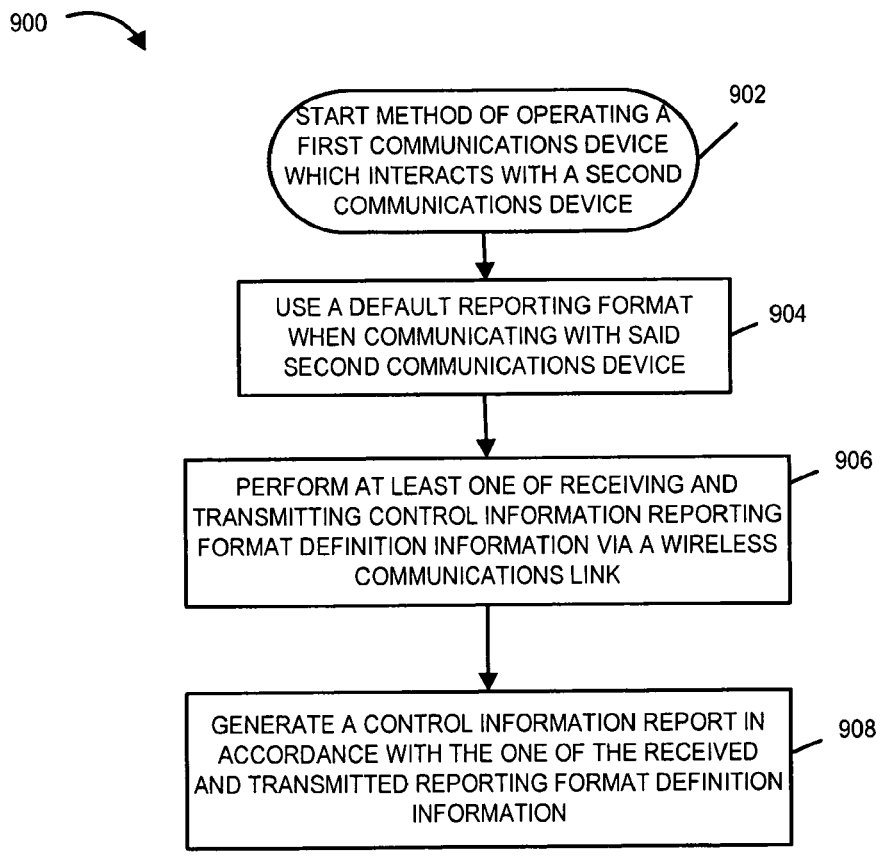
FIG. 9 is a flowchart of an exemplary method of operating a first communications device, e.g., a wireless terminal, which interacts with a second communications device, e.g., a base station.

FIG. 9 is a flowchart 900 of an exemplary method of operating a first communications device which interacts with a second communications device. For example, the first communications device may be a wireless terminal and the second communications device may be a base station, said first and second communication devices being included in a multiple access wireless communications system, e.g., an OFDM multiple access wireless communications system.

Operation starts in step 902, where the first communications device is powered on and initialized. Operation proceeds from start step 902 to step 904. In step 904, the first communication device uses a default reporting format when communicating with said second communications device. Then, in step 906, the first communications device performs at least one of receiving and transmitting control information reporting format definition information via a wireless communications link. The reporting format definition information communicated over the wireless communications link, in some embodiments, is sufficient to define the reporting format. For example, the reporting format definition information communicated over the wireless link may include individual report format information corresponding to a plurality of different types of reports and reporting sequence information. The reporting format definition information communicated over the wireless communications link, in some embodiments, is used in combination with pre-stored information to define the reporting format. For example, the first and second communication devices may have pre-stored a plurality of individual report format definitions corresponding to a plurality of different types of reports, and the reporting format definition information communicated over the wireless link may include information identifying a subset of those different types of reports and an ordered sequence of reports corresponding to members of the identified subset Operation proceeds from step 906 to step 908. In step 908, the first communications device generates a control information report in accordance with one of the received and transmitted reporting format definition information.

In some embodiments, the reporting format provides a definition mapping information to be included in a control information report to possible report values, e.g., for a plurality of different reports. For example, the reporting format may include a report definition for a 5 bit SNR report, a report definition for a 1 bit uplink traffic channel request report, a report definition for a 3 bit uplink traffic channel request report, a report definition for a 4 bit power report, etc. In various embodiments, the reporting format defines a reporting schedule according to which reports are to be transmitted. In some embodiments, the reporting format defines a set of reports which are to be transmitted in accordance with the defined reporting schedule. A reporting format may, and sometime does, specify a coding and modulation scheme to be applied to a set of reports.

Figure 10:
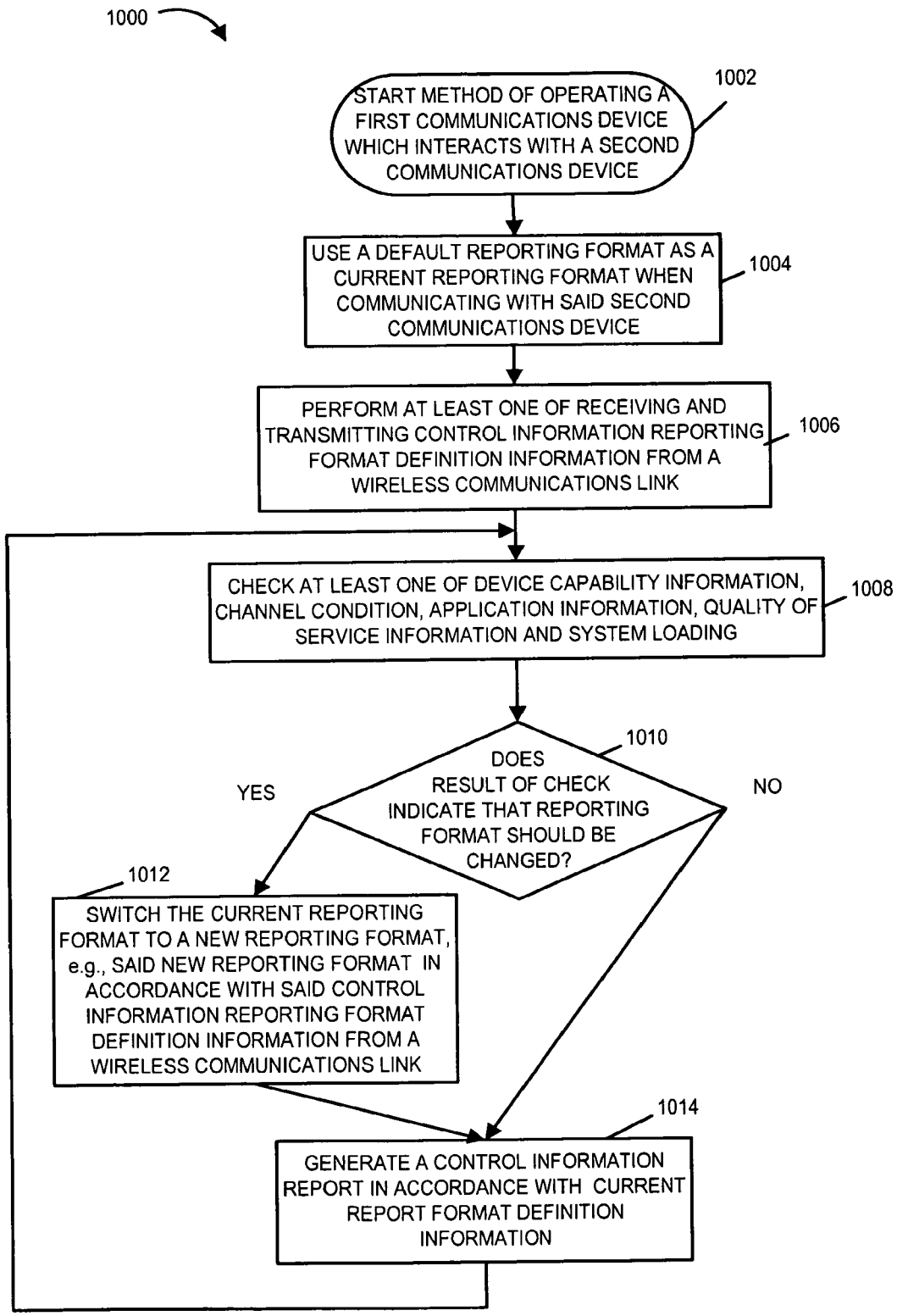
FIG. 10 is a flowchart of an exemplary method of operating a first communications device, e.g., a wireless terminal, which interacts with a second communications device, e.g., a base station.

FIG. 10 is a flowchart 1000 of an exemplary method of operating a first communications device which interacts with a second communications device. For example, the first communications device may be a wireless terminal and the second communications device may be a base station, said first and second communication devices being included in a multiple access wireless communications system, e.g., an OFDM multiple access wireless communications system.

Operation starts in step 1002, where the first communications device is powered on and initialized. Operation proceeds from start step 1002 to step 1004. In step 1004, the first communication device uses a default report format as a current reporting format when communicating with said second communications device. Then, in step 1006, the first communications device performs at least one of receiving and transmitting control information reporting format definition information from a wireless communications link. In some embodiments, the reporting format definition information is received from a base station, e.g., the base station which the first communications device is using as its current attachment point. In some embodiments, the reporting format definition information is received from a centralized server. Operation proceeds from step 1006 to step 1008.

In step 1008, the first communications device checks at least one of device capability information, channel conditions, application information, quality of service information and system loading. Then, in step 1010, the first communications device determines if the result of the check of step 1008 indicates that the reporting format should be changed. If the determination of step 1010 is that the reporting format should be changed, then operation proceeds to step 1012; otherwise, operation proceeds to step 1014. In step 1012, the first wireless terminal switches the current reporting format to a new reporting format, e.g., said new reporting format in accordance with said control information reporting format definition information from a wireless communications link. Operation proceeds from step 1012 to step 1014. In step 1014, the first communications device generates a control information report in accordance with the current report format definition information. Operation proceeds from step 1014 to step 1008, where the first communication device performs another check of at least one of device capability information, channel condition, application information, quality of service information and system loading.

In some embodiments, the reporting format provides a definition mapping information to be included in said report to possible report values. In various embodiments, the reporting format further defines a reporting schedule according to which reports are to be transmitted. In some embodiments, the reporting format defines a set of reports which are to be transmitted in accordance with the defined reporting schedule. A reporting format may, and sometime does, specify a coding and modulation scheme to be applied to a set of reports.

Figure 11:
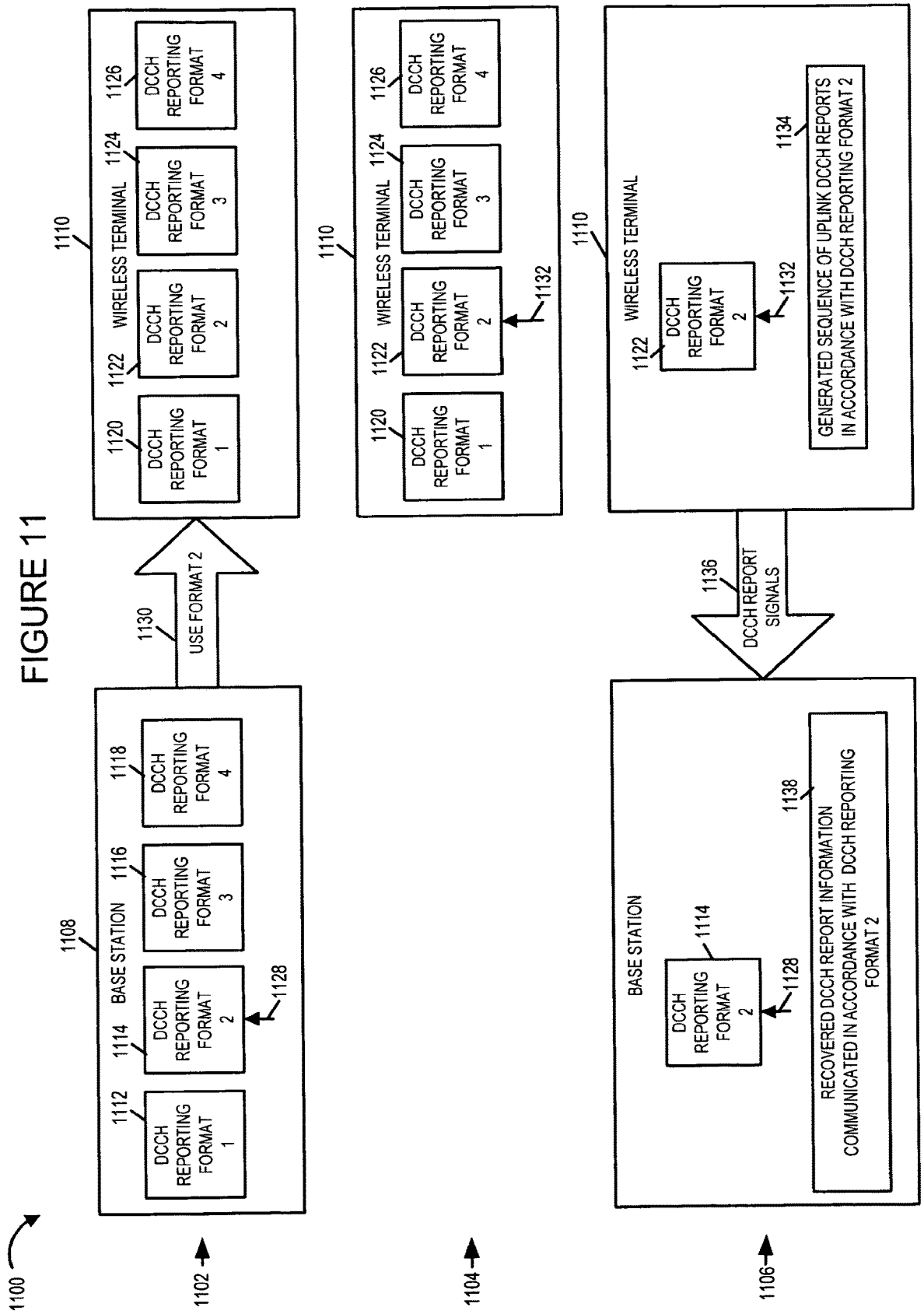
FIG. 11 is a drawing illustrating features in accordance with some embodiments in which a base station selects a control information reporting format for a wireless terminal.

FIG. 11 is a drawing 1100 illustrating features in accordance with some embodiments. First, second, and third rows (1102, 1104, 1106) illustrate exemplary base station 1108 and exemplary wireless terminal 1110 in a time sequential manner. Exemplary base station 1108 may be exemplary base station 200 of FIG. 2, while exemplary wireless terminal 1110 may be exemplary wireless terminal 300 of FIG. 3. Row 1102 will now be described. Exemplary base station 1108 includes dedicated control channel reporting format information corresponding to a plurality of predetermined formats (DCCH reporting format 1 information 1112, DCCH reporting format 2 information 1114, DCCH reporting format 3 information 1116, DCCH reporting format 4 information 1118) and exemplary wireless terminal 1110 includes dedicated control channel reporting format information corresponding to a plurality of predetermined formats (DCCH reporting format 1 information 1120, DCCH reporting format 2 information 1122, DCCH reporting format 3 information 1124, DCCH reporting format 4 information 1126). In this exemplary embodiment, the base station 1108 selects a reporting format from among potential reporting formats as a function of at least one of: application information, e.g., voice or data, device capability information, user quality of service information, channel condition information, system loading information, and system environment information. In this example, base station 1108 selects DCCH reporting format 2 as indicated by arrow 1128. Then the base station 1108 sends a format selection control signal 1130 to wireless terminal 1110 commanding the wireless terminal to use DCCH reporting format 2, which wireless terminal 1110 receives.

Second row 1104 will now be described. Wireless terminal 1110 processes control command signal 1130 and selects to use DCCH reporting format 2 as indicated by arrow 1132.

Third row 1106 will now be described. Wireless terminal 1110 generates a sequence of uplink DCCH reports in accordance with DCCH reporting format 2 as indicated by generated information 1134. Wireless terminal transmits DCCH report signals 1136 to base station 1108. The base station 1108 receives and processes the DCCH report signals using DCCH reporting format 2 information 1114 obtaining recovered DCCH report information 1138.

Figure 12:
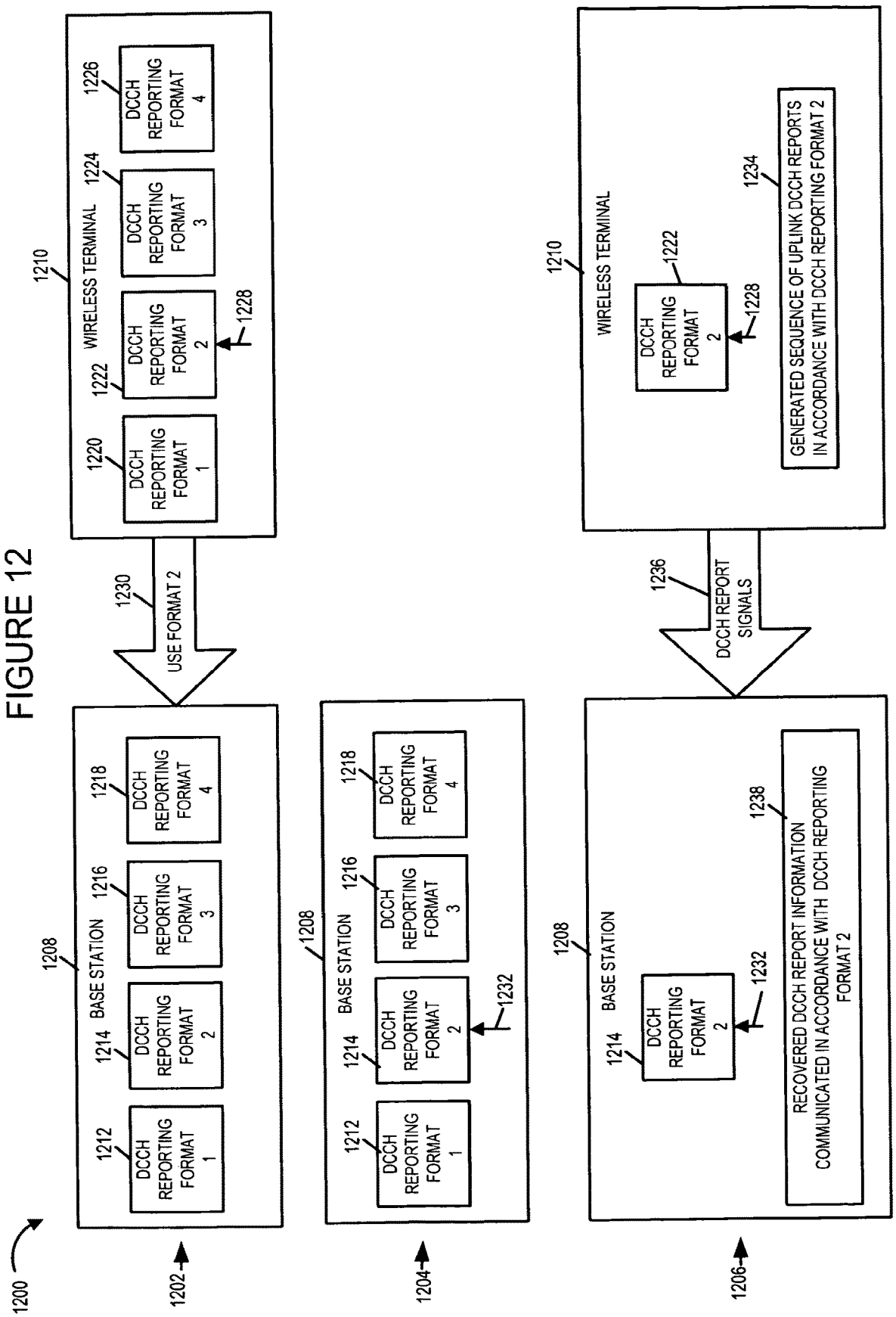
FIG. 12 is a drawing illustrating features in accordance with some embodiments, in which a wireless terminal selects a control information reporting format.

FIG. 12 is a drawing 1200 illustrating features in accordance with some embodiments. First, second, and third rows (1202, 1204, 1206) illustrate exemplary base station 1208 and exemplary wireless terminal 1210 in a time sequential manner. Exemplary base station 1208 may be exemplary base station 200 of FIG. 2, while exemplary wireless terminal 1110 may be exemplary wireless terminal 300 of FIG. 3. Row 1202 will now be described. Exemplary base station 1208 includes dedicated control channel reporting format information corresponding to a plurality of predetermined formats (DCCH reporting format 1 information 1212, DCCH reporting format 2 information 1214, DCCH reporting format 3 information 1216, DCCH reporting format 4 information 1218), and exemplary wireless terminal 1210 includes dedicated control channel reporting format information corresponding to a plurality of predetermined formats (DCCH reporting format 1 information 1220, DCCH reporting format 2 information 1222, DCCH reporting format 3 information 1224, DCCH reporting format 4 information 1226). In this exemplary embodiment, the wireless terminal 1208 selects a reporting format from among potential reporting formats as a function of at least one of: application information, e.g., voice or data, device capability information, user quality of service information, channel condition information, system loading information, and system environment information. In this example, wireless terminal 1208 selects DCCH reporting format 2 as indicated by arrow 1228. Then the wireless terminal 1210 sends a format selection control signal 1230 to base station 1208 commanding the base station to use DCCH reporting format 2, which base station 1208 receives.

Second row 1204 will now be described. Base station 1208 processes control command signal 1230 and selects to use DCCH reporting format 2 as indicated by arrow 1232.

Third row 1206 will now be described. Wireless terminal 1210 generates a sequence of uplink DCCH reports in accordance with DCCH reporting format 2 as indicated by generated information 1234. Wireless terminal 1210 transmits DCCH report signals 1236 to base station 1208. The base station 1208 receives and processes the DCCH report signals using DCCH reporting format 2 information 1214 obtaining recovered DCCH report information 1238.

Figure 13:
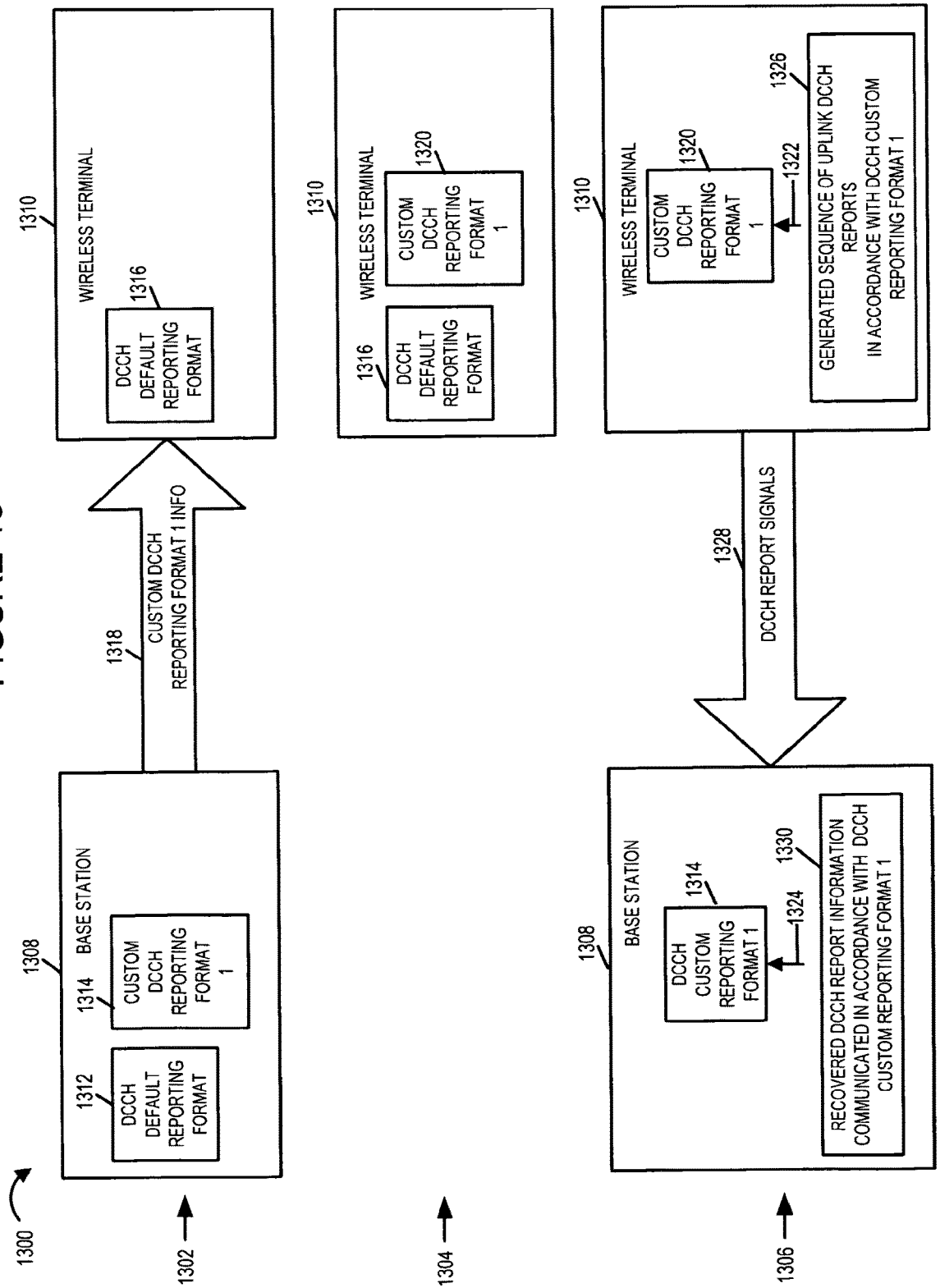
FIG. 13 is a drawing illustrating features in accordance with some embodiments, in which a base station communicates a custom control information reporting format to a wireless terminal.

FIG. 13 is a drawing 1300 illustrating features in accordance with some embodiments. First, second, and third rows (1302, 1304, 1306) illustrate exemplary base station 1308 and exemplary wireless terminal 1310 in a time sequential manner. Exemplary base station 1308 may be exemplary base station 400 of FIG. 4, while exemplary wireless terminal 1310 may be exemplary wireless terminal 500 of FIG.

5. Row 1302 will now be described. Exemplary base station 1308 includes dedicated control channel (DCCH) default reporting format information 1312 and custom DCCH reporting format 1 information 1314, and exemplary wireless terminal 1310 includes DCCH default reporting format information 1316. Custom DCCH reporting format 1 is, e.g., a reporting format which has been tailored for wireless terminal 1310, e.g., tailored to accommodate WT 1310 current conditions, needs, situation, etc. For example, custom reporting format 1 is in some embodiments, structured as a function of at least one of: application information, e.g., voice or data, device capability information, user quality of service information, channel condition information, system loading information, and system environment information. Custom reporting format 1, is in some embodiments generated by base station 1308. Alternatively or in addition, custom DCCH reporting format 1 is, e.g., a new release format to be conveyed to wireless terminal 1310, e.g., as part of an upgrade. Then the base station 1308 transmits over a wireless communications channel custom DCCH reporting format 1 information signals 1318 to wireless terminal 1310, which receives signals 1318. Signals 1318 conveys, e.g., a set of information defining the custom DCCH reporting format, e.g., a plurality of individual report definition information, information identifying a sequence of the plurality of individual reports, information identifying a coding and modulation scheme, and information defining a recurring time interval. Alternatively, signals 1318 convey, e.g., some of the information defining the custom DCCH reporting format 1, and the set of custom DCCH reporting format 1 information can be constructed from signals 1318 and some pre-stored information. For example, the wireless terminal 1310 may have pre-stored report definition information corresponding to a plurality of alternative reports, and signals 1318 convey a definition for an ordered sequence of reports to be communicated in a recurring structure.

Second row 1304 will now be described. Wireless terminal 1310 processes received signals 1318 conveying custom DCCH reporting format 1 information and stores custom DCCH reporting format 1 information 1320.

Third row 1306 will now be described. Arrow 1322 pointing to custom DCCH reporting format 1 information 1320 in wireless terminal 1310 and arrow 1324 pointing to DCCH custom reporting format 1 information 1414 in base station 1308 indicate that at this time both WT 1310 and base station 1308 are using DCCH custom reporting format 1. Wireless terminal 1310 generates a sequence of uplink DCCH reports in accordance with custom DCCH reporting format 1 as indicated by information 1326. Wireless terminal 1310 transmits DCCH report signals 1328 to base station 1308. The base station 1308 receives and processes the DCCH report signals using custom DCCH reporting format 1 information 1314 obtaining recovered DCCH report information 1330.

Figure 14:
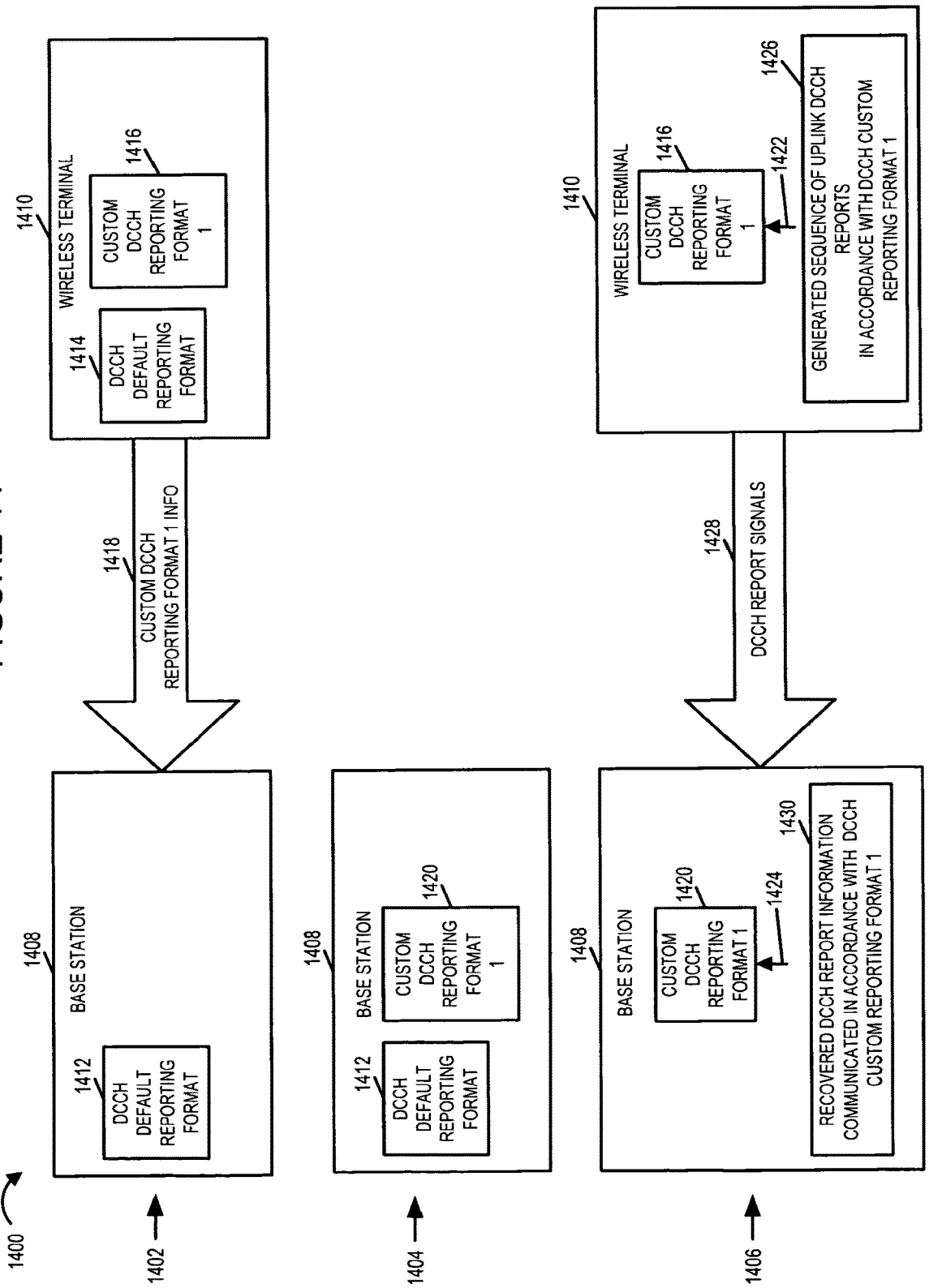
FIG. 14 is a drawing illustrating features in accordance with some embodiments, in which a wireless terminal communicates a custom control information reporting format to a base station.

FIG. 14 is a drawing 1400 illustrating features in accordance with some embodiments. First, second, and third rows (1402, 1404, 1406) illustrate exemplary base station 1408 and exemplary wireless terminal 1410 in a time sequential manner. Exemplary base station 1408 may be exemplary base station 400 of FIG. 4, while exemplary wireless terminal 1410 may be exemplary wireless terminal 500 of FIG. 5. Row 1402 will now be described. Exemplary base station 1408 includes dedicated control channel (DCCH) default reporting format information 1412, and exemplary wireless terminal 1410 includes DCCH default reporting format information 1414 and custom DCCH reporting format 1 information 1416. Custom DCCH reporting format 1 is, e.g., a reporting format which has been tailored by wireless terminal 1410 for wireless terminal 1410, e.g., tailored to accommodate WT 1410 current conditions, needs, situation, etc. For example, custom reporting format 1 is in some embodiments, structured as a function of at least one of: application information, e.g., voice or data, device capability information, user quality of service information, channel condition information, system loading information, and system environment information. Then wireless terminal 1410 transmits over a wireless communications channel custom DCCH reporting format 1 information signals 1418 to base station 1408, which receives signals 1418. Signals 1418 convey, e.g., a set of information defining the custom DCCH reporting format 1, e.g., a plurality of individual report definition information, information identifying a sequence of the plurality of individual reports, information identifying a coding and modulation scheme, and information defining a recurring time interval. Alternatively, signals 1418 convey, e.g., some of the information defining the custom DCCH reporting format 1, and the set of custom DCCH reporting format 1 information can be constructed from signals 1418 and some pre-stored information. For example, the base station 1410 may have pre-stored report definition information corresponding to a plurality of alternative reports, and signals 1418 convey a definition for an ordered sequence of reports to be communicated, e.g., in a recurring structure.

Second row 1404 will now be described. Base station 1408 processes received signals 1418 conveying custom DCCH reporting format 1 information and stores custom DCCH reporting format 1 information 1420.

Third row 1406 will now be described. Arrow 1422 pointing to custom DCCH reporting format 1 information 1416 in wireless terminal 1410 and arrow 1424 pointing to DCCH custom reporting format 1 information 1420 in base station 1408 indicate that at this time both WT 1410 and base station 1408 are using DCCH custom reporting format 1. Wireless terminal 1410 generates a sequence of uplink DCCH reports in accordance with custom DCCH reporting format 1 as indicated by information 1426. Wireless terminal 1410 transmits DCCH report signals 1428 to base station 1408. The base station 1408 receives and processes the DCCH report signals using custom DCCH reporting format 1 information 1420 obtaining recovered DCCH report information 1430.

Figure 15:
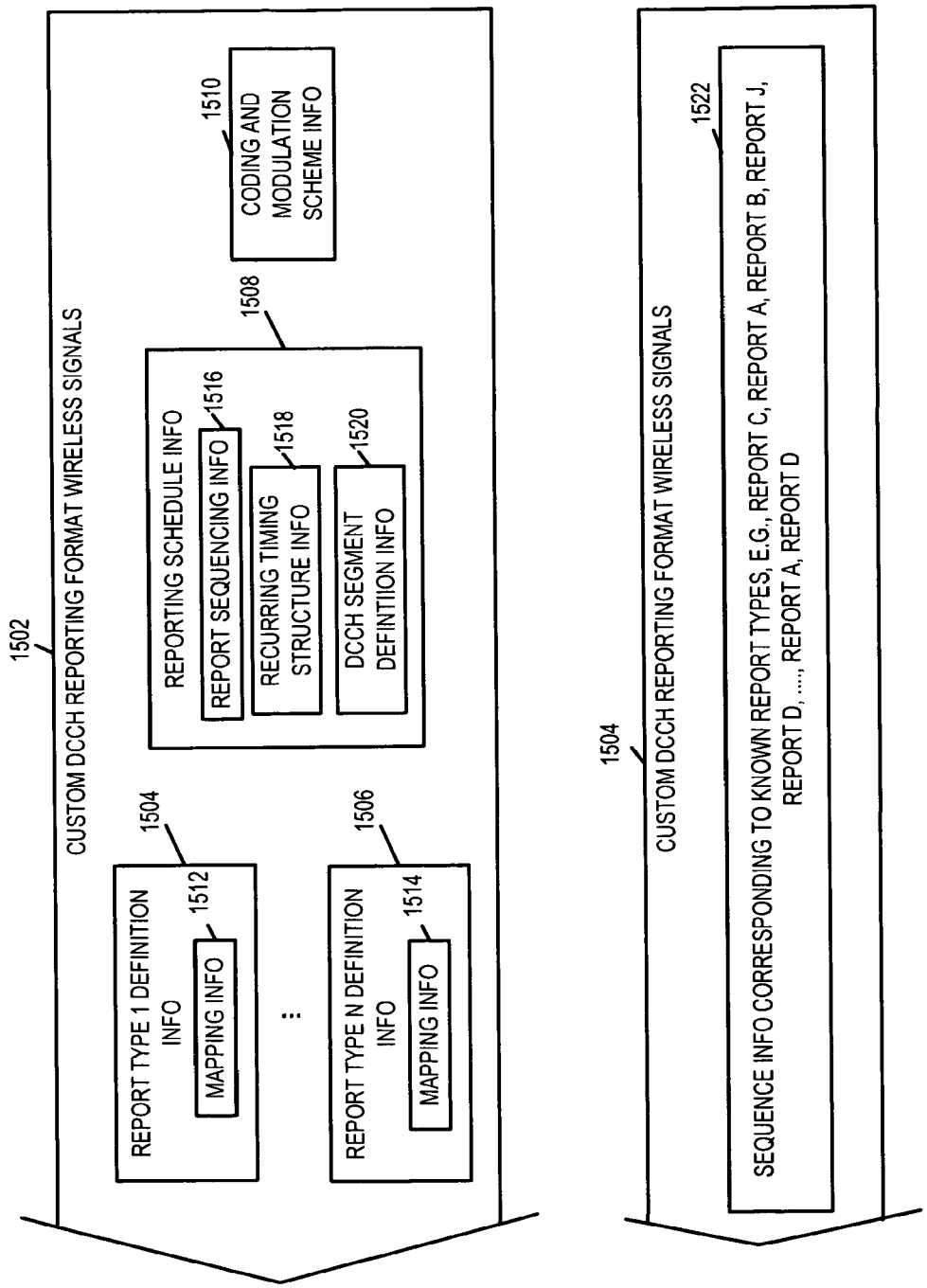
FIG. 15 is a drawing illustrating exemplary custom dedicated control channel reporting format wireless signals.

FIG. 15 is a drawing illustrating exemplary custom dedicated control channel reporting format wireless signals 1502, 1504. An exemplary custom dedicated control channel reporting format wireless signals representation, e.g., 1502 or 1504, may be any of custom DCCH reporting format 1 information signals 1318 or FIG. 13 or 1418 or FIG. 14.

Exemplary DCCH custom reporting format wireless signals 1502 includes a plurality of report type definition information (report type 1 definition information 1504, . . . , report type N definition information 1506), reporting schedule information 1508, and coding and modulation information 1510. Each report type definition information (1504, 1506) includes mapping information (1512, 1514), respectively, which defines mapping of control information to potential information bit patterns used by the report. Reporting schedule information 1508 includes report sequencing information 1516, recurring timing structure information 1518, and DCCH segment definition information 1520.

Exemplary DCCH custom reporting format wireless signals 1504 includes sequence information corresponding to known report types, e.g., a sequence indicating report C, report A, report B, report J, report D, . . . , report A, report D. In some embodiments, a recurring DCCH reporting structure is known, e.g., 40 indexed DCCH segments in a beaconslot, and the reporting sequence communicated in signals 1504 is such to identify the report types used for the segments. In some embodiments, the number and/or type of reports communicated in the reporting sequence in signals 1504 is used to identify the number of reports to be communicated and/or the size of a recurring reporting structure.

Figure 16:
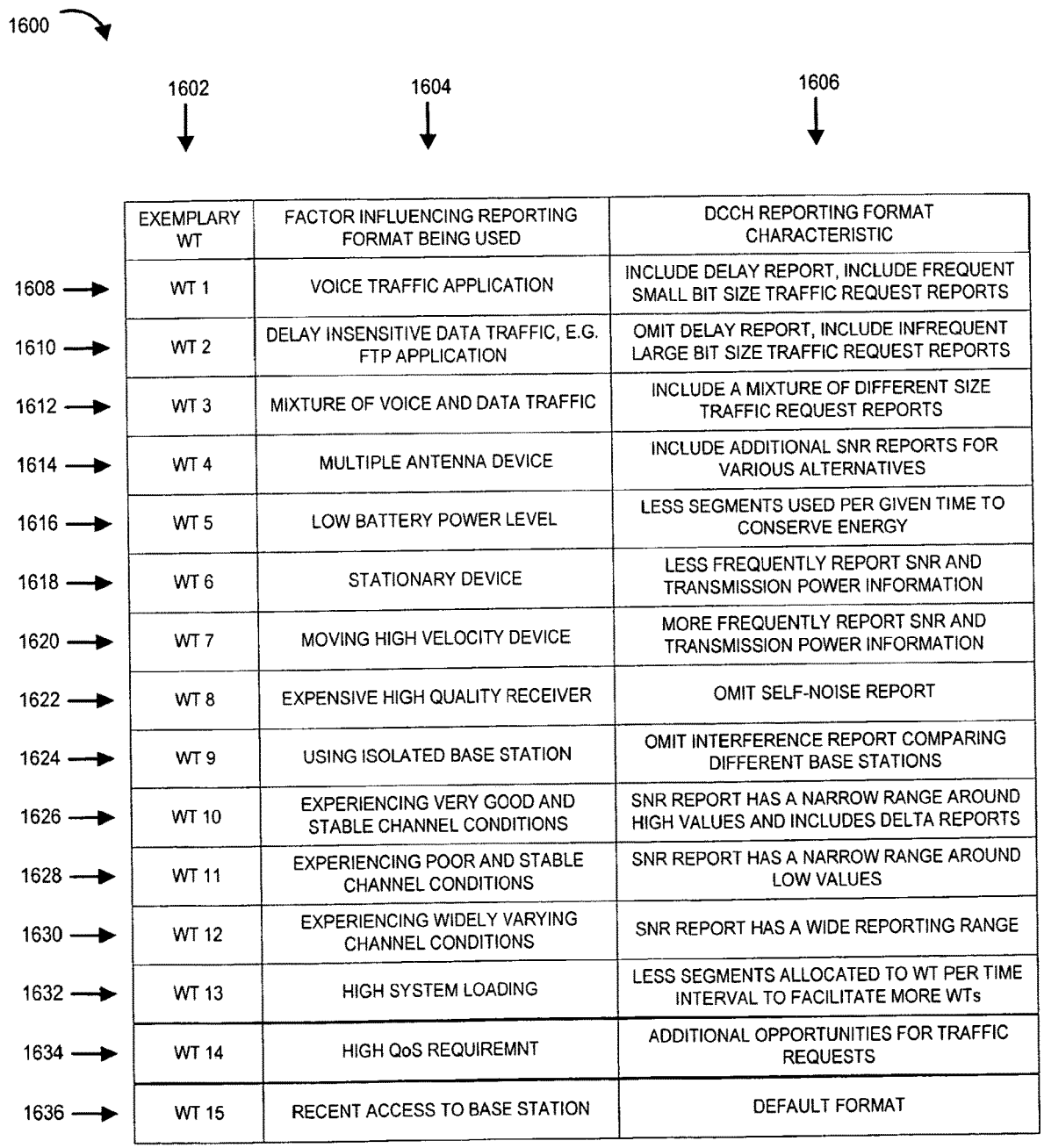
FIG. 16 is a drawing of a table illustrating exemplary wireless terminals, exemplary factors influencing a reporting format being used, and exemplary corresponding dedicated control channel reporting format characteristics.

FIG. 16 is a drawing of a table 1600 illustrating exemplary wireless terminal terminals, exemplary factors influencing a reporting format being used, and exemplary corresponding dedicated control channel reporting format characteristics. First column 1602 lists fifteen exemplary wireless terminals (WT 1, . . . , WT 15). Second column 1604 lists a factor influencing the reporting format being used for a corresponding WT. Third column 1606 lists a DCCH reporting format characteristic corresponding to the WT.

First row 1608 indicates that exemplary WT 1 is using a voice traffic application, and the DCCH reporting format being used includes a delay report and frequent small bit size traffic request reports, e.g., frequent single bit uplink traffic channel request reports. Second row 1610 indicates that exemplary WT 2 is using a delay insensitive data traffic application, e.g., a file transfer protocol (FTP) application, and the DCCH reporting format being used does not include delay reports, but does include infrequent large bit size traffic request reports, e.g., infrequent 4 bit uplink traffic channel request reports. Third row 1612 indicates that exemplary WT 3 has a need to communicate a mixture of voice and data traffic, e.g., WT 3 is running a voice application an Internet gaming application, and the DCCH reporting format being used includes a mixture of different size traffic request reports, e.g., a 1 bit uplink traffic channel request report, a 3 bit traffic channel request report, and a 4 bit traffic channel request report. Fourth row 1614 indicates that exemplary WT 4 is a multiple antenna device, and the DCCH reporting format being used includes additional SNR reports for reporting various alternatives. Fifth row 1616 indicates that exemplary WT 5 is experiencing low battery power level, and the DCCH reporting format being used has less segments per unit time to conserve energy. Sixth row 1618 indicates that exemplary WT 6 is a stationary device, and the DCCH reporting format being used less frequently reports SNR and transmission power information, e.g., transmission power backoff information. Seventh row 1620 indicates that exemplary WT 7 is a moving high velocity device, and the DCCH reporting format being used more frequently reports SNR and transmission power information, e.g., transmission power backoff information. Eighth row 1622 indicates that exemplary WT 8 includes an expensive high quality receiver, and the DCCH reporting format being used omits self-noise reports. Ninth row 1624 indicates that exemplary WT 9 is using an isolated base station, and the DCCH reporting format being used omits interference reports comparing signals from different base stations, e.g., beacon ratio reports are not included. Tenth row 1626 indicates that exemplary WT 10 is experiencing very good and stable channel conditions, and the DCCH reporting format being used includes an SNR report that has a narrow range around relatively high values, and the DCCH reporting format being used includes at least some differential reports, e.g., delta reports with respect to previously communicated DCCH reports. Eleventh row 1628 indicates that exemplary WT 11 is experiencing poor but stable channel conditions, and the DCCH reporting format being used includes an SNR report that has a narrow range around relatively low values. Twelfth row 1630 indicates that exemplary WT 12 is experiencing widely varying channel conditions, and the DCCH reporting format being used include an SNR report that has a wide reporting range. Thirteenth row 1632 indicates that exemplary WT 13 is using a base station experiencing high system loading, and the DCCH reporting format being used has less segments allocated to WT per time interval to free up resources for the other wireless terminals. Fourteenth row 1634 indicates that exemplary WT 14 has high QoS requirements, and the DCCH reporting format being used provides for additional opportunities for traffic requests. Fifteenth row 1636 indicates that exemplary WT 15 has just recently accessed the base station, and the DCCH reporting format being used is a default format.

Figure 17:
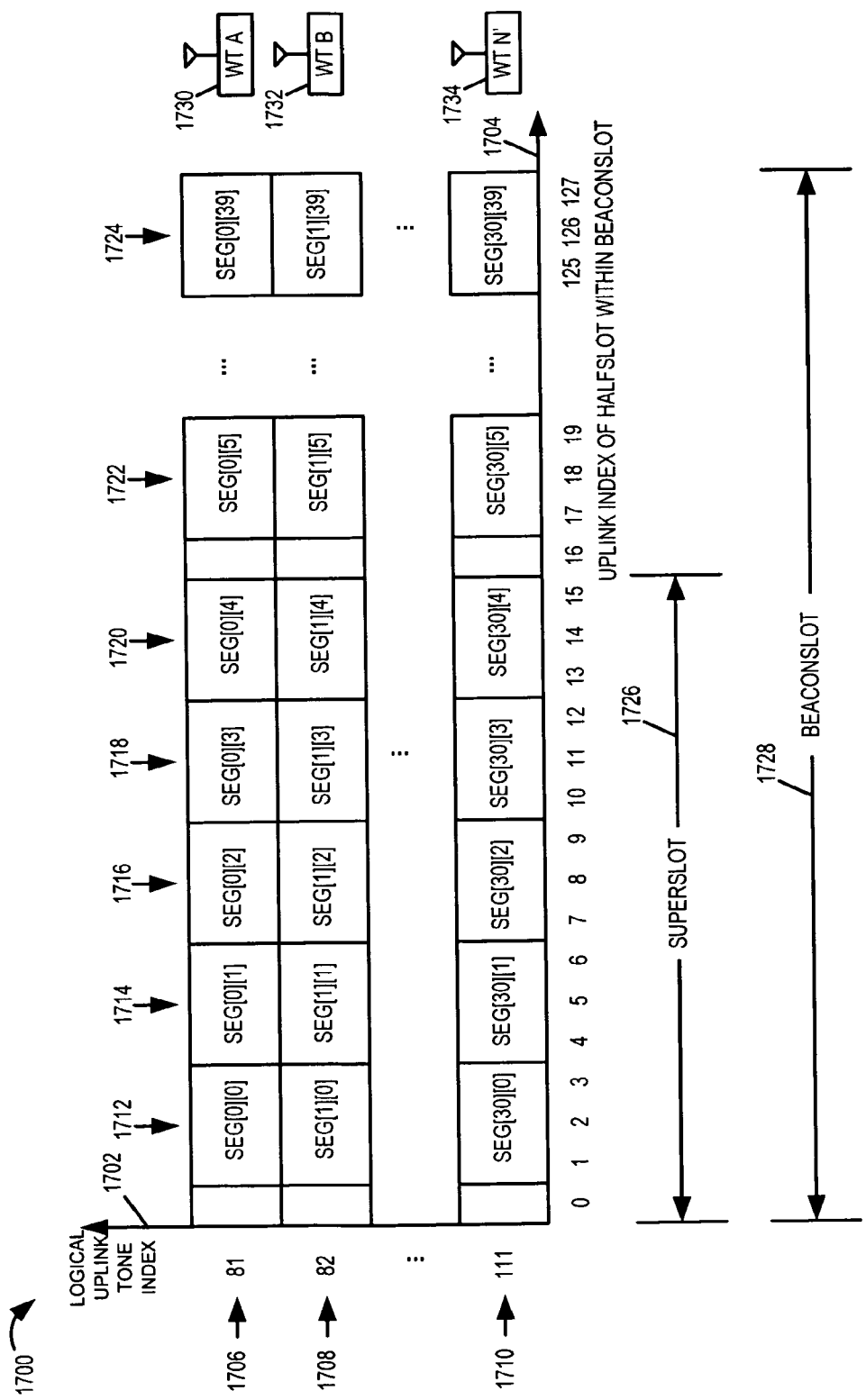
FIG. 17 is a drawing of exemplary uplink dedicated control channel (DCCH) segments in an exemplary uplink timing and frequency structure in an exemplary orthogonal frequency division multiplexing (OFDM) multiple access wireless communications system.

FIG. 17 is a drawing 1700 of exemplary uplink dedicated control channel (DCCH) segments in an exemplary uplink timing and frequency structure in an exemplary orthogonal frequency division multiplexing (OFDM) multiple access wireless communications system. The uplink dedicated control channel is used to send Dedicated Control Reports (DCR) from wireless terminals to base stations. Vertical axis 1702 plots logical uplink tone index while horizontal axis 1704 plots the uplink index of the halfslot within a beaconslot. In this example, an uplink tone block includes 113 logical uplink tones indexed (0, . . . , 112); there are seven successive OFDM symbol transmission time periods within a halfslot, 2 additional OFDM symbol time periods followed by 16 successive half-slots within a superslot, and 8 successive superslots within a beacon slot. The first 9 OFDM symbol transmission time periods within a superslot are an access interval, and the dedicated control channel does not use the air link resources of the access interval.

The exemplary dedicated control channel is subdivided into 31 logical tones (uplink tone index 81 1706, uplink tone index 82 1708, . . . , uplink tone index 111 1710). Each logical uplink tone (81, . . . , 111) in the logical uplink frequency structure corresponds to a logical tone indexed with respect to the DCCH channel (0, . . . , 30).

For each tone in the dedicated control channel there are 40 segments in the beaconslot corresponding to forty columns (1712, 1714, 1716, 1718, 1720, 1722, . . . , 1724). The segment structure repeats on a beaconslot basis. For a given tone in the dedicated control channel there are 40 segments corresponding to a beaconslot 1728; each of the eight superslots of the beaconslot includes 5 successive segments for the given tone. For example, for first superslot 1726 of beaconslot 1728, corresponding to tone 0 of the DCCH, there are five indexed segments (segment [0] [0], segment [0] [1], segment [0][2], segment [0][3], segment [0][4]). Similarly, for first superslot 1726 of beaconslot 1728, corresponding to tone 1 of the DCCH, there are five indexed segments (segment [1][0], segment [1][1], segment [1][2], segment [1][3], segment [1][4]). Similarly, for first superslot 1726 of beaconslot 1728, corresponding to tone 30 of the DCCH, there are five indexed segments (segment [30][0], segment [30][1], segment [30][2], segment [30][3], segment [30][4]).

In this example each segment, e.g., segment [0][0], comprises one tone for 3 successive half-slots, e.g., representing an allocated uplink air link resource of 21 OFDM tone-symbols. In some embodiments, logical uplink tones are hopped to physical tones in accordance with an uplink tone hopping sequence such that the physical tone associated with a logical tone may be different for successive half-slots, but remains constant during a given half-slot.

Each logical tone of the dedicated control channel may be assigned by the base station to a different wireless terminal using the base station as its current point of attachment. For example, logical tone (506, 508, ..., 510) may be currently assigned to (WT A 1730, WT B 1732, ..., WT N" 1734), respectively.

Figure 18:
FIG. 18 is a table of exemplary dedicated control channel reports.

Each uplink DCCH segment is used to transmit a set of Dedicated Control Channel Reports (DCRs). A list of exemplary DCRs is given in table 1800 of FIG. 18. First column 1802 of table 1800 describes abbreviated names used for each exemplary report. The name of each report ends with a number which specifies the number of bits of the DCR. Second column 1804 of table 1800 briefly describes each named report.

FIG. 19 is a table 1900 describing the exemplary format of exemplary 5 bit absolute report of downlink signal to noise ratio (DLSNR5). Column 1902 lists the 32 possible information bit patterns for the report, and column 1904 lists a corresponding reported WT measured downlink pilot channel SNR conveyed by the report. A wireless terminal measures downlink pilot channel SNR, determines the SNR reported value possibility closest to the measured value, and then determines the corresponding 5 bit pattern to be reported in the report. Each report in table 1800 has its own corresponding mapping information.

Figure 20:
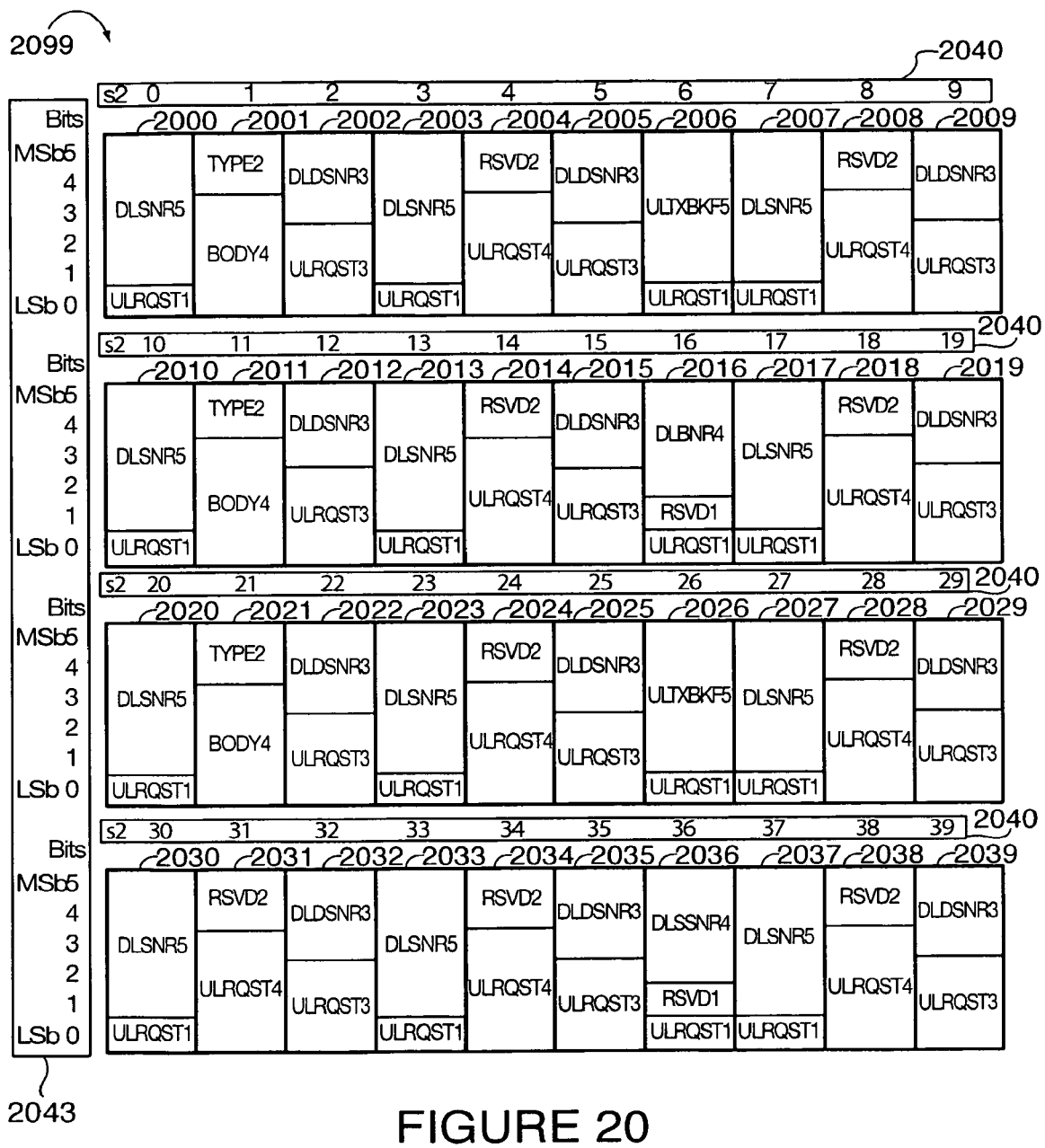
FIG. 20 is a drawing illustrating exemplary control information reporting format information for an exemplary recurring time interval for a given dedicated control channel tone, e.g., corresponding to a wireless terminal allocated to use that DCCH tone.

FIG. 20 is a drawing 2099 illustrating an exemplary reporting format information in an exemplary beaconslot for a given DCCH tone, e.g., corresponding to a wireless terminal. In FIG. 20, each block (2000, 2001, 2002, 2003, 2004, 2005, 2006, 2007, 2008, 2009, 2010, 2011, 2012, 2013, 2014, 2015, 2016, 2017, 2018, 2019, 2020, 2021, 2022, 2023, 2024, 2025, 2026, 2027, 2028, 2029, 2030, 2031, 2032, 2033, 2034, 2035, 2036, 2037, 2038, 2039) represents one segment whose index s2 (0, ..., 39) is shown above the block in rectangular region 2040. Each block, e.g., block 2000 representing segment 0, conveys 6 information bits; each block comprises 6 rows corresponding to the 6 bits in the segment, where the bits are listed from the most significant bit to the least significant bit downwards from the top row to the bottom row as shown in rectangular region 2043.

FIG. 20 illustrates one exemplary reporting format, e.g., a default reporting format. Numerous variations are possible. Some reporting formats may be additional pre-stored reporting formats. Some reporting formats may be custom reporting formats, e.g., tailored for a particular wireless terminal, set of wireless terminals, type of wireless terminal, and/or set of conditions. Some different reporting formats, in some embodiments, use different numbers of information bits/segment, e.g., 8 information bit/per segment instead of 6 information bits/segment. Some different reporting formats, in some embodiments, use different modulation schemes. Some different reporting formats, in some embodiment, have a different set of reports used. Some different reporting formats, in some embodiments, have different orderings and/or frequencies of reports. Some different reporting formats, in some embodiment, intentionally omit certain types of reports. Some different reporting formats, in some embodiments, have a concentration of certain types of reports. Some different reporting formats, in some embodiments, use different sets of segments. Some different reporting formats, in some embodiments, refrain from transmitting of subsets of segments. Some different reporting formats, in some embodiments, have different durations, e.g., different durations of a recurring pattern.

Different wireless terminals may be using different control information reporting formats at the same time. In addition the same wireless terminal may use different control information reporting formats at different times.

Figure 21:
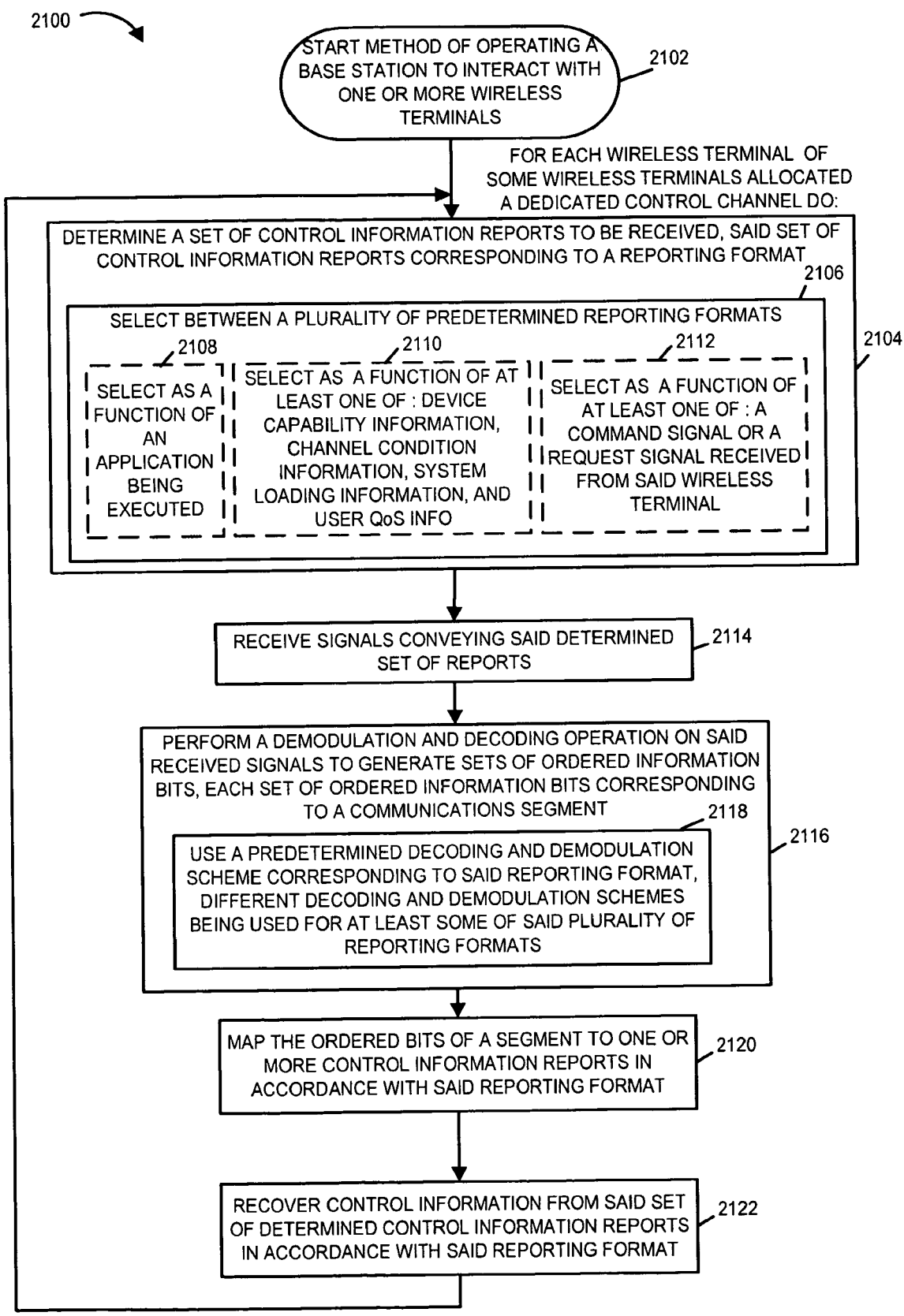
FIG. 21 is a drawing of a flowchart of an exemplary method of operating a base station to interact with one or more wireless terminals.

FIG. 21 is a drawing of a flowchart 2100 of an exemplary method of operating a base station to interact with one or more wireless terminals. Operation starts in step 2102, where the base station is powered on and initialized and proceeds to step 2104, for each wireless terminal of some wireless terminals allocated a dedicated control channel by the base station. At different times different wireless terminals are allocated dedicated control channels by the base station. In addition, in the communications system, some wireless terminal may support a plurality of control information reporting formats, while some less capable wireless terminals may support a single control information reporting format.

In step 2104, the base station determines a set of control information reports to be received, said set of control information reports corresponding to a reporting format. Step 2104 includes sub-step 2106. In sub-step 2106, the base station selects between a plurality of predetermined reporting formats. Sub-step 2106 includes one or more of sub-step 2108, 2110, and 2112. In sub-step 2108, the base station selects the control information reporting format as a function of an application being executed, e.g., by said base station or said wireless terminal or a peer node in a communications session with said wireless terminal. In some embodiments, the application is one of a voice and a data application. In some such embodiments, a reporting format selected in response to a voice application includes a latency report or includes latency information embedded in a traffic channel request report, and a reporting format selected in response to a data application includes less frequent uplink request reports than a reporting format used for voice but more bits per uplink request on average than used for voice. For example, frequently scheduled 1 bit uplink request reports may be used in an exemplary reporting format tailored for a voice application, while less frequently scheduled 3 and/or 4 bit uplink traffic channel request reports may be used in an exemplary reporting format tailored for a data application. In sub-step 2110, the base station selects the control information reporting format as a function of at least one of: device capability information, channel condition information, system loading information, and user quality of service (QoS) information. In sub-step 2112, the base station selects the control information reporting format as a function of at least one of: a command signal or a request signal received from said wireless terminal.

In some embodiments, each of said plurality of predetermined reporting formats specifies a plurality of different types of reports and an ordering of said different types of reports. In some embodiments, the different reporting types includes at least two of a SNR report, a traffic request report, a power information report, an interference report, and a delay report, e.g., a latency report. In some embodiments, the reporting format specifies the control information to be communicated in the different types of reports, e.g., counts of frames of traffic backlog with defined quantization, SNR level in dB with defined quantization, power gain level in dBs with defined quantization, etc.

Operation proceeds from step 2104 to step 2114. In step 2114, the base station receives signals, e.g., dedicated control channel segment OFDM signals, conveying said determined set of reports. Then, in step 2116, the base station performs a demodulation and decoding operation on said received signals to generate sets of ordered information bits, each set of ordered information bits corresponding to a communications segment. Step 2116 includes sub-step 2118.

In sub-step 2118, the base station uses a predetermined decoding and demodulation scheme corresponding to said reporting format, different decoding and demodulation schemes being used for at least some of said plurality of reporting formats. For example, in one exemplary embodiment one exemplary control information reporting format uses a demodulation and decoding scheme which obtains 6 information bits from 21 QPSK modulation symbols corresponding to a dedicated control channel communications segment; while a different exemplary control information format uses a demodulation and decoding scheme which obtains 8 information bits from 21 QPSK modulation symbols corresponding to a dedicated control channel communications segment. Operation proceeds from step 2116 to step 2120.

In step 2110, the base station maps the ordered bits of a segment to one or more control information reports in accordance with said reporting format. For example, corresponding to one exemplary control information reporting format, a first segment in a recurring structure may convey 6 ordered information bits, and bits 1-5 convey a 5 bit downlink SNR report, while bit 0 (LSb) conveys a 1 bit uplink traffic channel request report. Operation proceeds from step 2120 to step 2122.

In step 2122, the base station recovers information from said set of determined control information reports in accordance with said reporting format. For example, the bit pattern, e.g., 01110, of a received SNR report may report a pilot channel SNR measurement value, e.g., 2 dB.

Operation proceeds from step 2122 to step 2104, where the base station determines another set of control information reports to be received by the wireless terminal assuming the wireless terminal is still allocated a dedicated control channel by the base station.

In some embodiments, the received signals, e.g., dedicated control channel segment signals, from multiple wireless terminal using the base station are received concurrently, and the control information reporting format for at least some of the different wireless terminals, at at least some times is different. For example, a first wireless terminal communicating with the base station may be using a control information reporting format tailored for a voice application, and a second wireless terminal communicating with the base station may be using a control information reporting format tailored to delay insensitive data communications, e.g., file transfers.

Figure 22:
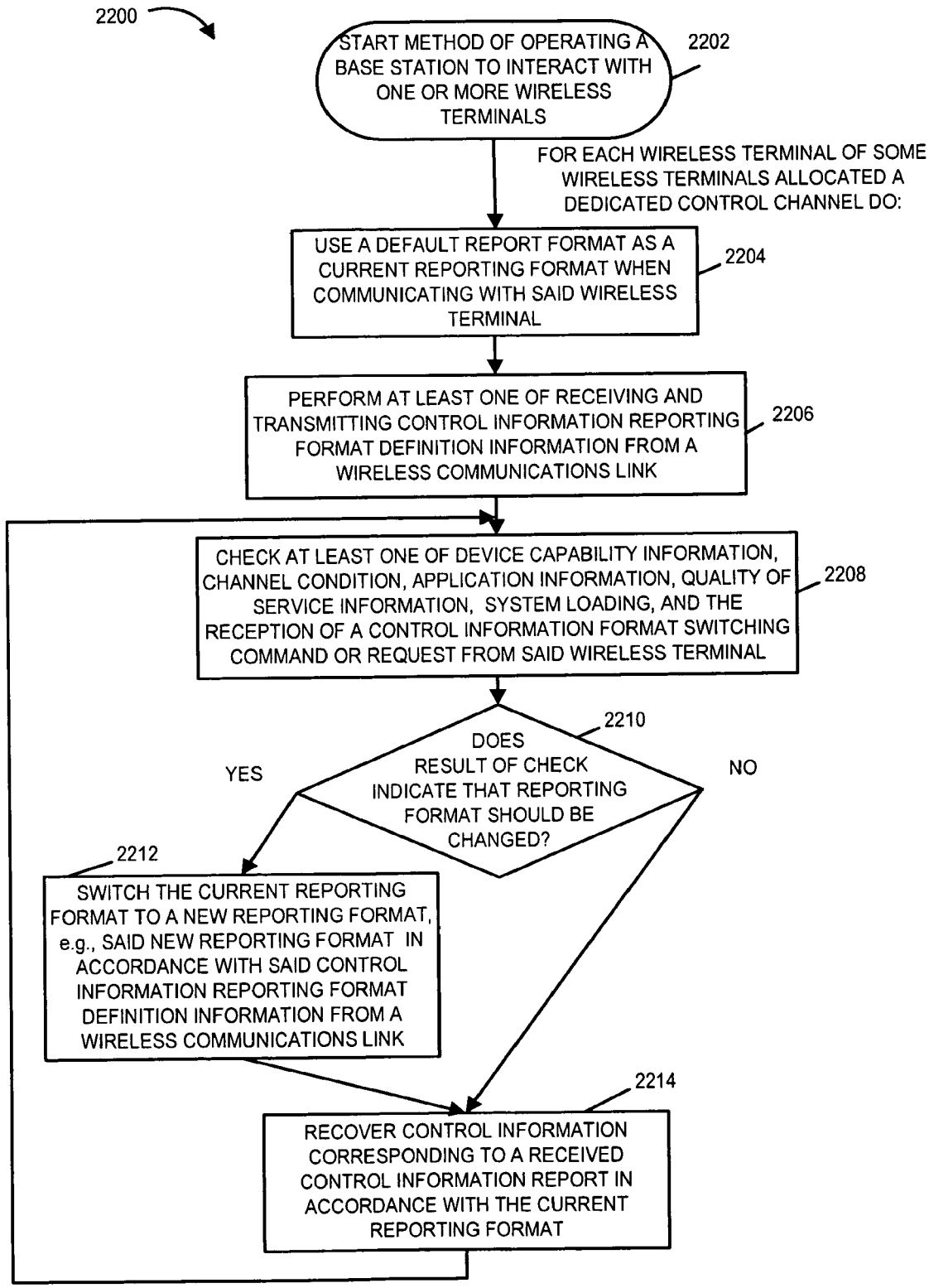
FIG. 22 is a drawing of a flowchart of an exemplary method of operating a base station to interact with one or more wireless terminals.

FIG. 22 is a drawing of a flowchart 2200 of an exemplary method of operating a base station to interact with one or more wireless terminals. For example, the base station and wireless terminal may be part of a multiple access OFDM wireless communications system including a dedicated control channel for uplink control information reports and using dedicated control channel segments. Operation starts in step 2202, where the base station is powered on and initialized. Operation proceeds from start step 2202 to step 2204, for each wireless terminal of some wireless terminals allocated a dedicated control channel by a base station. In step 2204, the base station uses a default format as a current reporting format when communicating with said wireless terminal, e.g., as part of an initial communications with the wireless terminal.

Operation proceeds from step 2204 to step 2206, where the base station performs at least one of receiving and transmitting control information reporting format definition information from a wireless communications link. In some embodiments, a control information reporting format includes reporting format definition information providing definition mapping information to be included in said report to possible report values. In some embodiments, a control information reporting format includes reporting format definition information defining a reporting schedule according to which reports are to be transmitted. In some embodiments, a control information reporting format includes reporting format definition information defining a set of reports which are to be transmitted, e.g., by a wireless terminal to the base station, in accordance with the defined reporting schedule. In some embodiments, a control information reporting format includes reporting format definition information specifying a coding and modulation scheme to be applied to the set of reports.

Then, in step 2208, the base station checks at least one of device capability information, channel condition information, application information, quality of service information, system loading information, and the reception of a control information format switching command or request from said wireless terminal.

In step 2210, the base station decides how to proceed based on the result of the check of step 2208. If the result of the check indicates that the reporting format should be changed, operation proceeds to step 2212; otherwise operation proceeds to step 2214.

In step 2212, the base station switches the current reporting format to a new reporting format, e.g., said new reporting format in accordance with said control information reporting format definition information received or transmitted from a wireless communication link of step 2206. Operation proceeds from step 2212 to step 2214.

In step 2214, the base station recovers control information corresponding to a received control information report in accordance with the current reporting format. Operation proceeds from step 2214 to step 2208, where the base station perform another check.

In some embodiments, reporting format information, e.g., corresponding to customized control information reports, is communicated between a base station and a wireless terminal using the base station as its attachment point. In some embodiments, reporting format information corresponding to a wireless terminal is communicated to and/or stored at a centralized server and/or a home agent node. In some such embodiments, state information corresponding to a control information reporting format, for a wireless terminal is stored, e.g., in a centralized server, home agent node, and/or base station. In some embodiments such stored information can, and sometimes is, retrieved and transferred to a new base station, e.g., as part of a handoff process and/or initialization process when attaching to a new base station.

While described in the context of an OFDM system, the methods and apparatus of various embodiments, are applicable to a wide range of communications systems including many non-OFDM and/or non-cellular systems.

In various embodiments nodes described herein are implemented using one or more modules to perform the steps corresponding to one or more methods, for example, signal processing, beacon generation, beacon detection, beacon measuring, connection comparisons, connection implementations. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a first communications device to interact with a second communications device, the method comprising:
    determining a set of control information reports to be transmitted, said set of control information reports corresponding to a reporting format, wherein the reporting format indicates a set of report definitions identifying a subset of a set of report definition information, wherein each report definition information specifies a type of control information and a control information to bit mapping information to be communicated in a report, and wherein said determining includes selecting the reporting format as a function of an application being executed by one of said first and second communications devices, wherein application type information is used for selecting;
    generating the determined set of control information reports; and
    communicating said generated set of control information reports.

2. The method of claim 1, wherein determining a set of control information reports includes selecting between a plurality of predetermined reporting formats.

3. The method of claim 2, wherein each of said plurality of predetermined reporting formats specifies a plurality of different types of reports and an ordering of said different types of reports.

4. The method of claim 3, wherein said reporting format further specifies the control information to be communicated in said different types of reports.

5. The method of claim 3, wherein said communicating includes:
    multiplexing the generated reports of different types in accordance with said determined reporting format.

6. The method of claim 5, further comprising:
    performing a coding and modulation operation on the multiplexed generated set of reports to generate a set of coded symbols; and
    mapping the coded symbols to segments of a wireless communications channel.

7. The method of claim 6, wherein said step of coding and modulation includes using a predetermined coding and modulation scheme corresponding to the determined reporting format, different coding and modulation schemes being used for at least some of said plurality of reporting formats.

8. The method of claim 2, further comprising repeating said determining, generating, and communicating steps.

9. The method of claim 3, wherein said different report types include at least two of an SNR report, a traffic request report, a power information report, an interference report, and a delay report.

10. The method of claim 1, wherein said application is one of a voice and a data application.

11. The method of claim 10, wherein said reporting format selected in response to a voice application includes a latency report and wherein said reporting format selected in response to a data application includes less frequent uplink request reports than a format used for voice but more bits per uplink request on average than used for voice.

12. The method of claim 1, wherein determining a reporting format is performed as a function of at least one of: device capability information, channel conditions, system loading, and user QoS.

13. The method of claim 1, wherein determining a reporting format is performed as a function of at least one of a command signal or a request signal received from said second communications device.

14. The method of claim 6, wherein said first communications device is a wireless terminal, and wherein said segments are dedicated control channel segments in an orthogonal frequency division multiplexing channel structure.

15. A non-transitory computer readable medium embodying machine executable instructions for controlling a first communications device to implement a method, the method comprising:
    determining a set of control information reports to be transmitted, said set of control information reports corresponding to a reporting format, wherein the reporting format indicates a set of report definitions identifying a subset of a set of report definition information, wherein each report definition information specifies a type of control information and a control information to bit mapping information to be communicated in a report, and wherein said determining includes selecting the reporting format as a function of an application being executed by one of said first and a second communications devices, wherein application type information is used for selecting;
    generating the determined set of control information reports; and
    communicating said generated set of control information reports.

16. The non-transitory computer readable medium of claim 15, further embodying machine executable instructions for selecting between a plurality of predetermined reporting formats as part of said step of determining a set of control information reports.

17. The non-transitory computer readable medium of claim 16, wherein each of said plurality of predetermined reporting formats specifies a plurality of different types of reports and an ordering of said different types of reports.

18. The non-transitory computer readable medium of claim 17, wherein said reporting format further specifies the control information to be communicated in said different types of reports.

19. The non-transitory computer readable medium of claim 17, further embodying machine executable instructions for multiplexing the generated reports of different types in accordance with said determined reporting format as part of said step of communicating said generated set of control information reports.

20. A first communications device in a wireless communications system, the first communications device comprising:
a processor configured to:
determine a set of control information reports to be transmitted, said set of control information reports corresponding to a reporting format, wherein the reporting format indicates a set of report definitions identifying a subset of a set of report definition information, wherein each report definition information specifies a type of control information and a control information to bit mapping information to be communicated in a report, and wherein said determining includes selecting the reporting format as a function of an application being executed by one of said first and a second communications devices, wherein application type information is used for selecting;
generate the determined set of control information reports; and
control communication of said generated set of control information reports.

21. The first communications device of claim 20, wherein said processor is configured to select between a plurality of predetermined reporting formats.

22. A method of operating a first communications device to interact with a second communications device, the method comprising:
determining a set of control information reports to be received, said set of control information reports corresponding to a reporting format, wherein the reporting format indicates a set of report definitions identifying a subset of a set of report definition information, wherein each report definition information specifies a type of control information and a control information to bit mapping information to be communicated in a report, and wherein said determining includes selecting the reporting format as a function of an application being executed by one of said first and second communications devices, wherein application type information is used for selecting;
receiving signals conveying said determined set of control information reports; and
recovering control information from said set of determined control information reports in accordance with said reporting format.

23. The method of claim 22, wherein said application is one of a voice and a data application.

24. The method of claim 23, wherein said reporting format selected in response to a voice application includes a latency report and wherein said reporting format selected in response to a data application includes less frequent uplink request reports than a format used for voice but more bits per uplink request on average than used for voice.

25. The method of claim 22, wherein determining a reporting format is performed as a function of at least one of: device capability information, channel conditions, system loading, and user QoS.

26. The method of claim 22, wherein determining a reporting format is performed as a function of at least one of a command signal or a request signal received from said second communications device.

27. The method of claim 22, wherein said first communications device is a base station and said second communications device is a first wireless terminal, the method further comprising:
determining a second set of control information reports to be received, said second set of information reports corresponding to a second reporting format;
receiving from a second wireless terminal signals conveying said determined second set of control information reports; and
recovering control information from said second set of determined control information reports in accordance with said second reporting format.

28. The method of claim 27, wherein said received signals from said first and second wireless terminals are received concurrently, and wherein said reporting format and said second reporting formats are different.

29. A non-transitory computer readable medium embodying machine executable instructions for controlling a first communication device to implement a method, the method comprising:
determining a set of control information reports to be received, said set of control information reports corresponding to a reporting format, wherein the reporting format indicates a set of report definitions identifying a subset of a set of report definition information, wherein each report definition information specifies a type of control information and a control information to bit mapping information to be communicated in a report, and wherein said determining includes selecting the reporting format as a function of an application being executed by one of said first and a second communications devices, wherein application type information is used for selecting;
receiving signals conveying said determined set of control information reports; and
recovering control information from said set of determined control information reports in accordance with said reporting format.

30. The non-transitory computer readable medium of claim 29, further embodying machine executable instructions for selecting between a plurality of predetermined reporting formats as part of said step of determining a set of control information reports to be received.

31. The non-transitory computer readable medium of claim 30, wherein each of said plurality of predetermined reporting formats specifies a plurality of different types of reports and an ordering of said different types of reports.

32. The non-transitory computer readable medium of claim 29, wherein said reporting format further specifies the control information to be communicated in said different types of reports.

33. The non-transitory computer readable medium of claim 30, further embodying machine executable instructions for:
performing a demodulation and decoding operation on said received signals to generate sets of ordered information bits, each set of ordered information bits corresponding to a communication segment; and
mapping the ordered bits of a segment to one or more control information reports.

34. A first communications device operable in a wireless communications system, the first communications device comprising:
a processor configured to:
determine a set of control information reports to be received, said set of control information reports corresponding to a reporting format, wherein the reporting format indicates a set of report definitions identifying a subset of a set of report definition information, wherein each report definition information specifies a type of control information and a control information to bit mapping information to be communicated in a report, and wherein said determining includes selecting the reporting format as a function of an application being executed by one of said first and a second communications devices, wherein application type information is used for selecting;

control reception of signals conveying said determined set of control information reports; and recover control information from said set of determined control information reports in accordance with said reporting format.

35. The first communications device of claim 34, wherein said processor is configured to select between a plurality of predetermined reporting formats.

36. The first communications device of claim 35, wherein each of said plurality of predetermined reporting formats specifies a plurality of different types of reports and an ordering of said different types of reports.

37. The first communications device of claim 36, wherein said reporting format further specifies the control information to be communicated in said different types of reports.

38. The communications device of claim 37, wherein said processor is configured to:

control demodulation and decoding operations on said received signals to generate sets of ordered information bits, each set of ordered information bits corresponding to a communication segment; and map the ordered bits of a segment to one or more control information reports.

* * * * *